US009767371B2

United States Patent
Ai et al.

(10) Patent No.: US 9,767,371 B2
(45) Date of Patent: Sep. 19, 2017

(54) SYSTEMS AND METHODS FOR IDENTIFYING TRAFFIC CONTROL DEVICES AND TESTING THE RETROREFLECTIVITY OF THE SAME

(71) Applicant: Georgia Tech Research Corporation, Atlanta, GA (US)

(72) Inventors: Chengbo Ai, Smyrna, GA (US);
Yichang Tsai, Smyrna, GA (US);
Zhaohua Wang, Suwanee, GA (US);
Anthony Joseph Yezzi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/129,655

(22) PCT Filed: Mar. 27, 2015

(86) PCT No.: PCT/US2015/023146
§ 371 (c)(1),
(2) Date: Sep. 27, 2016

(87) PCT Pub. No.: WO2015/149009
PCT Pub. Date: Oct. 1, 2015

(65) Prior Publication Data
US 2017/0193312 A1    Jul. 6, 2017

Related U.S. Application Data

(60) Provisional application No. 61/971,126, filed on Mar. 27, 2014.

(51) Int. Cl.
*G06K 9/00* (2006.01)
*G06K 9/46* (2006.01)
(Continued)

(52) U.S. Cl.
CPC ......... *G06K 9/00818* (2013.01); *G06F 13/16* (2013.01); *G06F 13/20* (2013.01);
(Continued)

(58) Field of Classification Search
CPC .. G06K 9/00791; G06K 9/00818; G08G 1/00; G09F 2007/1878; G09F 2009/3055;
(Continued)

(56) References Cited

U.S. PATENT DOCUMENTS 3,631,619 A * 1/1972 Campbell ........ G08G 1/096716
40/427
6,363,161 B2 * 3/2002 Laumeyer .......... G06K 9/00818
382/104
(Continued)

FOREIGN PATENT DOCUMENTS

WO    2013/128427 A1    9/2013
WO    2013/175022 A1    11/2013

OTHER PUBLICATIONS

The International Search Report for International Application No. PCT/US2015/023146 mailed Jun. 29, 2015.
(Continued)

*Primary Examiner* — Manav Seth
(74) *Attorney, Agent, or Firm* — Troutman Sanders LLP; Ryan A. Schneider

(57) ABSTRACT

Systems and methods for identifying traffic control devices from images, and systems and methods for assessing the retro reflectivity of traffic control devices. The identification of traffic control devices can be accomplished using a lighting-dependent statistical color model. The identification of traffic control devices can be accomplished using an active contour or active polygon method.

45 Claims, 53 Drawing Sheets

(51) Int. Cl.
*G06K 9/62* (2006.01)
*G06T 7/11* (2017.01)
*G06F 13/20* (2006.01)
*G08G 1/00* (2006.01)
*G06F 13/16* (2006.01)
*G09F 9/305* (2006.01)

(52) U.S. Cl.
CPC ......... *G06K 9/4604* (2013.01); *G06K 9/4652* (2013.01); *G06K 9/6267* (2013.01); *G06T 7/11* (2017.01); *G08G 1/00* (2013.01); *G09F 2009/3055* (2013.01)

(58) Field of Classification Search
CPC ... G09F 2013/0472; G09F 13/16; G09F 13/20
See application file for complete search history.

(56) References Cited

U.S. PATENT DOCUMENTS

| | | | | |
|---|---|---|---|---|
| 7,466,841 | B2* | 12/2008 | Bahlmann | G06K 9/00818 382/103 |
| 7,566,851 | B2* | 7/2009 | Stein | B60Q 1/143 250/205 |
| 8,374,390 | B2* | 2/2013 | Stroila | G06K 9/00818 382/103 |
| 8,983,136 | B2* | 3/2015 | Liu | G06K 9/00818 382/104 |
| 9,269,001 | B2* | 2/2016 | R | G06K 9/00818 |
| 9,476,705 | B2* | 10/2016 | Stroila | G01S 17/89 |
| 2004/0086153 | A1* | 5/2004 | Tsai | G06K 9/3233 382/104 |
| 2006/0155427 | A1* | 7/2006 | Yang | G08G 1/07 701/1 |
| 2011/0081081 | A1* | 4/2011 | Smith | G06K 9/00818 382/170 |
| 2013/0077830 | A1* | 3/2013 | Liu | G06K 9/00818 382/104 |
| 2013/0201334 | A1* | 8/2013 | C | G06K 9/00818 348/148 |

OTHER PUBLICATIONS

The Written Opinion of the International Searching Authority for International Patent Application No. PCT/US2015/023146 mailed Jun. 29, 2015.

* cited by examiner

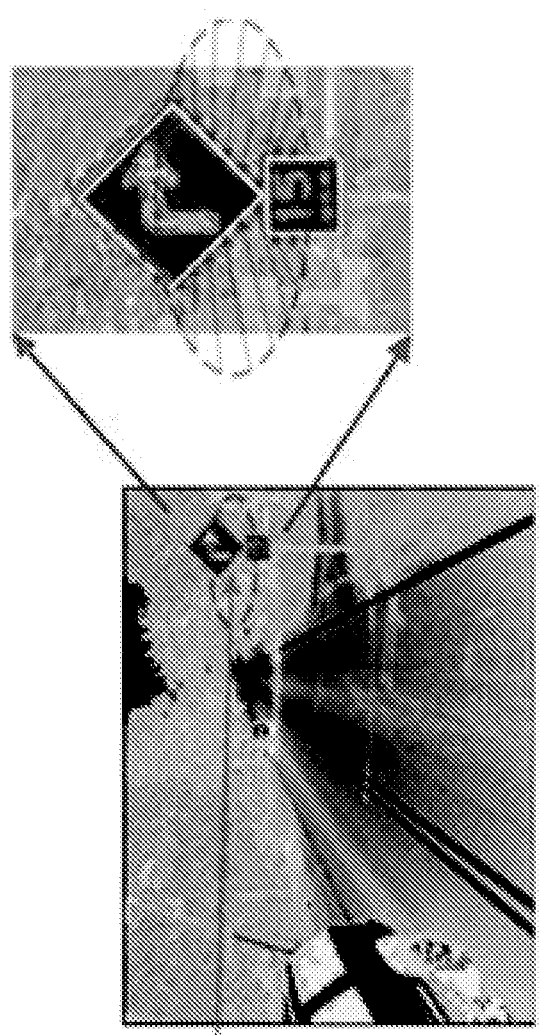
FIG. 11C
FIG. 11B
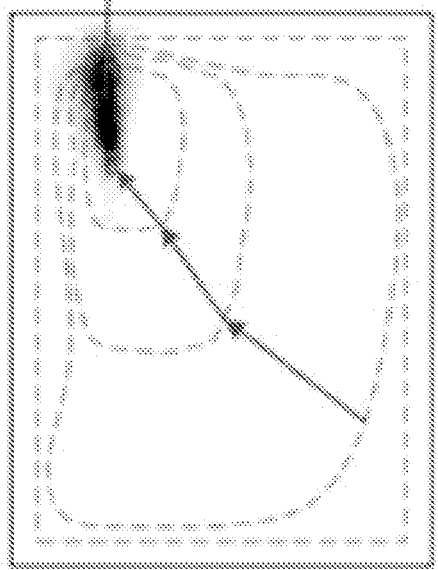
FIG. 11A

SYSTEMS AND METHODS FOR IDENTIFYING TRAFFIC CONTROL DEVICES AND TESTING THE RETROREFLECTIVITY OF THE SAME

CROSS-REFERENCE TO RELATED APPLICATIONS

This application claims priority to, and the benefit under 35 U.S.C. §119(e), of U.S. Provisional Patent Application No. 61/971,126, filed 27 Mar. 2014, the entire contents and substance of which are hereby incorporated by reference as if fully set forth herein.

Some references, which can include patents, patent applications, and various publications, are cited in a reference list and discussed in the disclosure provided herein. The citation and/or discussion of such references is provided merely to clarify the description of the present invention and is not an admission that any such reference is "prior art" to any aspects of the present invention described herein. All references cited and discussed in this specification are incorporated herein by reference in their entireties and to the same extent as if each reference was individually incorporated by reference.

TECHNICAL FIELD

This disclosure relates to systems and methods for identifying traffic control devices, including traffic signs, from images. This disclosure also relates to systems and methods for testing the retroreflectivity condition of traffic control devices, including traffic signs.

BACKGROUND

Traffic signs are one of the most important assets for transportation systems. They provide vital guidance to road users regarding traffic regulation, warnings, destination information, and temporary road condition information. Because of the vital role traffic signs play in roadway safety and information conveyance, they must be managed effectively by state departments of transportation (DOTs) using a traffic sign management system. A traffic sign management system is a coordinated program of policies and procedures that ensure that the highway agency provides a sign system that meets the needs of the user most cost-effectively within available budget and constraints. It contains the four primary components. The first component is to inventory traffic signs, which collects the locations and attributes of every individual traffic sign. The second component is condition assessment, which determines the performance adequacy of inventoried signs by assessing retroreflectivity and identifying visual defects. The third component is performance evaluation, which evaluates a traffic sign system's performance and predicts the performance and life of an individual sign or a group of signs in the system based on the collected condition data. The fourth component is decision-making, which generates maintenance strategies, methods, and prioritizations based on the performance evaluation outcomes and available budget, and generates the needed annual budget based on expected safety requirements. Traffic sign inventory and condition assessment are the two most important components in a traffic sign management system. Management actions can only be effectively carried out with reliable inventory and condition assessment information.

During traffic sign inventory, detailed traffic sign information, including sign locations and attributes (e.g. type, dimension, lateral offset, etc.), is recorded and used to build a comprehensive traffic sign inventory database. Among all traffic sign information in a sign inventory database, identifying where the traffic signs are (i.e. traffic sign detection) is the first and most critical step, without which all the remaining sign attribute information cannot be acquired or populated in the database. However, most transportation agencies do not even have the information about where their traffic signs are along the road, not to mention the detailed traffic sign attribute information. There is a need to develop methods to cost-effectively and reliably locate traffic signs first so that the remaining detailed traffic sign information can be populated and the subsequent management operations can be successfully carried out, e.g. condition assessment, performance evaluation, etc.

During traffic sign condition assessment, the traffic signs that do not meet requirements are identified by insufficient retroreflectivity and/or visual surface defects that interfere with traffic signs' displayed information. Among all the traffic sign conditions, traffic sign retroreflectivity condition is the most critical one for nighttime driving safety. There is an urgent need to develop methods to cost-effectively and reliably evaluate traffic sign retroreflectivity condition.

Traditionally, traffic sign detection and retroreflectivity condition assessments have used manual methods in state DOTs. However, manual methods require field engineers to physically inspect and record the information of each individual traffic sign, which takes excessive time, consumes great amounts of labor, and sometimes puts field engineers in dangerous situations. To overcome the drawbacks of manual methods, some effort has been made to develop automated methods for both traffic sign detection and retroreflectivity condition assessment using video log images. However, the performance of these methods still needs to be improved so that they can be practically applied in state DOTs' practices. In recent years, emerging sensing technologies, e.g. computer vision, mobile light detection and ranging (LiDAR), etc. have advanced greatly so that current image-based automatic methods have been improved, and new traffic sign detection and retroreflectivity condition assessment methods have become possible. Consequently, this study focuses on the two key needs in the inventory and condition assessment components of a traffic sign management system: 1) developing an enhanced traffic sign detection methodology to improve the productivity of an image-based sign inventory for state DOTs, and 2) exploring and developing a new traffic sign retroreflectivity condition assessment methodology to cost-effectively and reliably assess traffic sign retroreflectivity conditions using the emerging computer vision and mobile LiDAR technologies.

Retroreflectivity is a critical attribute of a traffic sign for nighttime visibility. It can be defined as the ratio of the luminance that is redirected from a sign's surface to the luminance originating from a vehicle's headlight (ASTM, 2011). A LiDAR system can collect the retro-intensity values in a way similar to the measurement of traffic sign retroreflectivity. A retro-intensity value can be acquired with each LiDAR point. A retro-intensity value represents the ratio of the energy redirected from the object to the energy emitted from the LiDAR sensor. Thus, the retro-intensity values can be correlated with traffic sign retroreflectivity conditions. Such a correlation can potentially be used to conduct an automatic traffic sign retroreflectivity condition assessment.

In doing so, it may be advantageous to provide systems and methods that can associate color data of the traffic sign with the raw LiDAR point cloud data so that multiple colors for the same traffic sign may be assessed separately as to whether they meet the manual of uniform traffic control devices (MUTCD) requirements. Furthermore, it may also be advantageous to provide systems and methods that can assess the population of the retro-intensity values associated with the same traffic sign at the same beam distance and incidence angle, despite differences in beam distances and incidence angles that arise during raw retro-intensity value acquisition.

SUMMARY

Generally, embodiments of the disclosed methods include: 1) automatically clustering the raw LiDAR point cloud data to generate the populations of retro-intensity values for different traffic sign colors; 2) normalizing the retro-intensity values based on the beam distance and incidence angle to make a consistent assessment of the traffic sign; and 3) establishing the relationship between the retro-intensity values and the retroreflectivity conditions.

Some aspects of the present disclosure relate to a method for identifying a traffic sign, comprising classifying an image as having a lighting condition, segmenting the image into a color used for traffic signs using a statistical color model specific to the lighting condition, and detecting a shape in the image corresponding to the traffic sign. In some embodiments, the color used for traffic signs is a MUTCD standard color. In some embodiments, classifying the image further comprises classifying the image as underexposed where a mean pixel brightness value of the image is below an undersaturation threshold. In some embodiments, classifying the image further comprises classifying the image as overexposed where a mean pixel brightness value of the image is above an oversaturation threshold. In some embodiments, classifying the image further comprises classifying the image as adverse lighting if the difference between a mean pixel brightness of the image and a median pixel brightness of the image is over an adverse lighting threshold. In some embodiments, classifying an image further comprises classifying the image as normal if: a mean pixel brightness value of the image is above an undersaturation threshold, a mean pixel brightness value of the image is below an oversaturation threshold, and a difference between a mean pixel brightness of the image and median pixel brightness of the image is below an adverse lighting threshold.

In some embodiments, images having a lighting condition of adverse lighting are divided into a region having an overexposed condition, and a region having an underexposed condition, by generating a threshold surface, comparing the threshold surface to the image to create a thresholded image, identifying candidate regions of the image, and applying a morphological open and close operation to the candidate regions of the image. In some embodiments, generating a threshold surface is accomplished using an anti-geometric heat equation. In some embodiments, segmenting an image further comprises calculating, for a plurality of pixels, a local pixel level homogeneity value for one of a hue, saturation, and value, normalizing the local pixel level homogeneity value, and generating a probability distribution by applying an artificial neural network specific to a lighting condition, having input values of hue, saturation, value, and one or more of hue homogeneity, saturation homogeneity, and value homogeneity. In some embodiments the artificial neural network is a functional link network.

In some embodiments, the detecting step is performed by an differential equation based shape detection algorithm. In some embodiments, the differential equation based shape detection algorithm comprises a region-based energy function. In some embodiments, the differential equation based shape detection algorithm comprises an active contour algorithm. In some embodiments, the active contour function comprises a probability distribution function sub-energy component that represents the probability of a sign image occurring in each pixel. In some embodiments, the active contour function comprises a statistical color model sub-energy component represents the probability of a traffic sign color occurring in each pixel of the image. In some embodiments, the active contour function comprises a global contour length sub-energy component with a maximum contour length. In some embodiments, the maximum contour length is calculated as a function of a total perimeter of the image. In some embodiments, the differential equation based shape detection algorithm comprises an active polygon algorithm. In some embodiments, the active polygon contour algorithm comprises a generalized Hough transform. In some embodiments, the generalized Hough transform comprises calculating an R-table corresponding to the shape of a traffic sign, detecting the center where the maximum similarity is obtained compared to the R-table, and solving the region-based energy function for the optimal value.

Some aspects of the present disclosure relate to a method of assessing the retroreflectivity condition of a traffic sign comprising receiving, at a processor and from a LiDAR sensor, a plurality of LiDAR data points, each LiDAR data point in the plurality of LiDAR data points relating to a location on the face of the traffic sign, each LiDAR data point comprising 3D position information and a set of retro-intensity data, wherein each set of retro-intensity data comprises a retro-intensity value, a distance value, and an angle value, determining, for each LiDAR data point, an incidence angle value, receiving a plurality of image data points, wherein each image data point represents a portion of a traffic sign image, each image data point comprising color data, and 2D location data representing a location on the face of the traffic sign, associating each of a plurality of LiDAR data points with a corresponding image data point, wherein 2D location data of a particular image data point corresponds to a location on the face of the traffic sign from which a particular LiDAR data point associated with the particular image data point relates, grouping each LiDAR data point into one or more color clusters based on the associated color data, normalizing, for each color cluster of LiDAR data points, each retro-intensity value based on the corresponding distance value and incidence angle value, and determining, for each color cluster of LiDAR data points, whether the normalized retro-intensity values indicate a retroreflectivity above a predetermined threshold.

In some embodiments, the 3D position information comprises latitude data, longitude data and elevation data. In some embodiments, each retro-intensity value represents a ratio of energy redirected from the traffic sign to the energy emitted from the LiDAR sensor. In some embodiments, the distance value is a value that is representative of the distance between the traffic sign and the LiDAR sensor at the time of the measurement of the LiDAR data point. In some embodiments, the angle value represents a LiDAR beam angle with respect to the level of the LiDAR sensor. In some embodiments, the portion of the traffic sign image comprises a pixel. In some embodiments, the color data represents the color of the portion of the traffic sign image. In some embodiments, the 2D location data represents the location of the portion of the traffic sign image on a face of the traffic sign.

In some embodiments, determining whether the normalized retro-intensity values indicate a retroreflectivity above a predetermined threshold based on the color comprises determining a median value the normalized retro-intensity values for a color cluster of LiDAR data points, and comparing the median value to a predetermined threshold associated with the color of the color cluster of the median value. In some embodiments, the predetermined threshold based on the color represents the minimum acceptable level of retroreflectivity for a particular color. In some embodiments, the particular color is a MUTCD color. In some embodiments, the method further comprises determining whether the condition of the traffic sign meets a minimum standard of retroreflectivity. In some embodiments, the incidence angle value is determined from the direction of a LiDAR beam from the LiDAR sensor relative to the normal direction of a face of the traffic sign.

Some aspects of the present disclosure relate to methods of evaluating a traffic sign, comprising identifying the traffic sign by any method disclosed herein for identifying traffic signs, and assessing a retroreflectivity of the traffic sign by a method of assessing a retroreflectivity of a traffic sign disclosed herein.

Some aspects of the present disclosure relate to a system for identifying a traffic sign, comprising at least one memory operatively coupled to at least one processor and configured for storing data and instructions that, when executed by the at least one processor, cause the system to classify an image as having a lighting condition, segment the image into a color used for traffic signs using a statistical color model specific to the lighting condition, and detect a shape in the image corresponding to the traffic sign. In some embodiments, the color used for traffic signs is a MUTCD standard color. In some embodiments, classifying the image further comprises classifying the image as underexposed where a mean pixel brightness value of the image is below an under-saturation threshold. In some embodiments, classifying the image further comprises classifying the image as overexposed where a mean pixel brightness value of the image is above an over-saturation threshold. In some embodiments, classifying the image further comprises classifying the image as adverse lighting if the difference between a mean pixel brightness of the image and a median pixel brightness of the image is over an adverse lighting threshold. In some embodiments, classifying an image further comprises classifying the image as normal if a mean pixel brightness value of the image is above an under-saturation threshold, a mean pixel brightness value of the image is below an over-saturation threshold, and a difference between a mean pixel brightness of the image and median pixel brightness of the image is below an adverse lighting threshold.

In some embodiments, images having a lighting condition of adverse lighting are divided into a region having an over-exposed condition, and a region having an under-exposed condition, by generating a threshold surface, comparing the threshold surface to the image to create a thresholded image, identifying candidate regions of the image, and applying a morphological open and close operation to the candidate regions of the image. In some embodiments, generating a threshold surface is accomplished using an anti-geometric heat equation. In some embodiments, segmenting an image further comprises calculating, for a plurality of pixels, a local pixel-level homogeneity value for one of a hue, saturation, and value, normalizing the local pixel-level homogeneity value, and generating a probability distribution by applying an artificial neural network specific to a lighting condition, having input values of hue, saturation, value, and one or more of hue homogeneity, saturation homogeneity, and value homogeneity. In some embodiments, the artificial neural network is a functional link network.

In some embodiments, the detecting step is performed by an differential equation based shape detection algorithm. In some embodiments, the differential equation based shape detection algorithm comprises a region-based energy function. In some embodiments, the differential equation based shape detection algorithm comprises an active contour algorithm. In some embodiments, the active contour function comprises a probability distribution function sub-energy component that represents the probability of a sign image occurring in each pixel. In some embodiments, the active contour function comprises a statistical color model sub-energy component represents the probability of a traffic sign color occurring in each pixel of the image. In some embodiments, the active contour function comprises a global contour length sub-energy component with a maximum contour length. In some embodiments, the maximum contour length is calculated as a function of a total perimeter of the video log image. In some embodiments, the differential equation based shape detection algorithm comprises an active polygon algorithm. In some embodiments, the active polygon contour algorithm comprises a generalized Hough transform. In some embodiments, the generalized Hough transform comprises calculating an R-table corresponding to the shape of a traffic sign, detecting the center where the maximum similarity is obtained compared to the R-table, and solving the region-based energy function for the optimal value.

Some aspects of the present disclosure relate to a system for assessing the retroreflectivity condition of a traffic sign comprising at least one memory operatively coupled to at least one processor and configured for storing data and instructions that, when executed by the at least one process, cause the system to receive a plurality of LiDAR data points obtained from a LiDAR sensor, each LiDAR data point in the plurality of LiDAR data points relating to a location on the face of the traffic sign, each LiDAR data point comprising 3D position information and a set of retro-intensity data, wherein each set of retro-intensity data comprises a retro-intensity value, a distance value, and an angle value, determine, for each LiDAR data point, an incidence angle value, receive a plurality of image data points, wherein each image data point represents a portion of a traffic sign image, each image data point comprising color data, and 2D location data representing a location on the face of the traffic sign, associate each LiDAR data point with an image data point corresponding to a 2D location on the traffic sign, wherein each 2D location represents the location on the face of the traffic sign from which each respective LiDAR point was obtained, group each of a plurality of LiDAR data points with a corresponding image data point, wherein 2D location data of a particular image data point corresponds to a location on the face of the traffic sign from which a particular LiDAR data point associated with the particular image data point relates, normalize for each color cluster of LiDAR data points, each retro-intensity value based on the corresponding distance value and incidence angle value, and determine, for each color cluster of LiDAR data points, whether the normalized retro-intensity values indicate a retroreflectivity above a predetermined threshold.

In some embodiments, the 3D position information comprises latitude data, longitude data and elevation data. In some embodiments, each retro-intensity value represents a ratio of energy redirected from the traffic sign to the energy emitted from the LiDAR sensor. In some embodiments, the distance value is a value that is representative of the distance between the traffic sign and the LiDAR sensor at the time of the measurement of the LiDAR data point. In some embodiments, the angle value represents a LiDAR beam angle with respect to the level of the LiDAR sensor. In some embodiments, the portion of the traffic sign image comprises a pixel. In some embodiments, the color data represents the color of the portion of the traffic sign image. In some embodiments, the 2D location data represents the location of the portion of the traffic sign image on a face of the traffic sign.

In some embodiments, determining whether the normalized retro-intensity values indicate a retroreflectivity above a predetermined threshold based on the color comprises determining a median value the normalized retro-intensity values for a color cluster of LiDAR data points, and comparing the median value to a predetermined threshold associated with the color of the color cluster of the median value. In some embodiments, the predetermined threshold based on the color represents the minimum acceptable level of retroreflectivity for a particular color. In some embodiments, the particular color is a MUTCD color. In some embodiments, the method further comprises determining whether the condition of the traffic sign meets a minimum standard of retroreflectivity. In some embodiments, the incidence angle value is determined from the direction of a LiDAR beam from the LiDAR sensor relative to the normal direction of a face of the traffic sign.

Some aspects of the present disclosure relate to systems for evaluating a traffic sign, comprising identifying the traffic sign by any system for identifying traffic signs disclosed herein, and assessing a retroreflectivity of the traffic sign by any system for assessing a retroreflectivity of a traffic sign disclosed herein.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 11A-C depicts contour evolvement of an image containing a road sign using an active-contour function of an embodiment.

DETAILED DESCRIPTION

Figure 1:
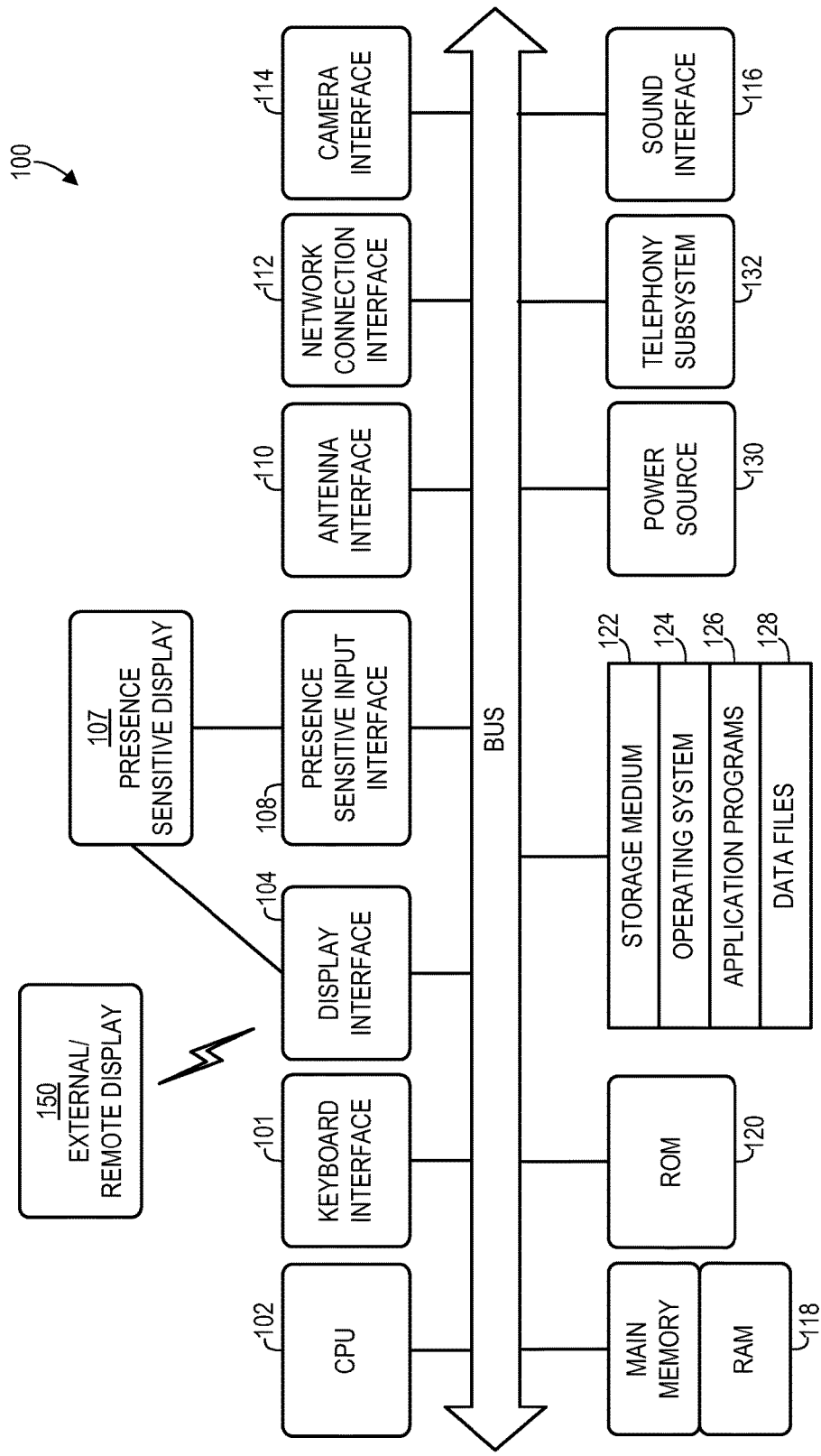
FIG. 1 depicts a block diagram of illustrative computing device architecture 100, according to an example embodiment.

Some embodiments of the disclosed technology will be described more fully hereinafter with reference to the accompanying drawings. This disclosed technology can, however, be embodied in many different forms and should not be construed as limited to the embodiments set forth therein.

In the following description, numerous specific details are set forth. However, it is to be understood that embodiments of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described can include a particular feature, structure, or characteristic, but not every embodiment necessarily includes the particular feature, structure, or characteristic. Further, repeated use of the phrase "in one embodiment" does not necessarily refer to the same embodiment, although it can.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device can be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device can be a processor, controller, or a central processing unit (CPU). In yet other instances, a computing device can be a set of hardware components.

Various aspects described herein can be implemented using standard programming or engineering techniques to produce software, firmware, hardware, or any combination thereof to control a computing device to implement the disclosed subject matter. A computer-readable medium can include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave can be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications can be made to this configuration without departing from the scope or spirit of the claimed subject matter.

Various systems, methods, and computer-readable mediums are disclosed, and will now be described with reference to the accompanying figures.

FIG. 1 depicts a block diagram of illustrative computing device architecture 100, according to an example embodiment. As desired, embodiments of the disclosed technology can include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 104 that acts as a communication interface and provides functions for rendering video, graphics, images, and texts on the display. In certain embodiments of the disclosed technology, the display interface 104 can be directly connected to a local display, such as a touch-screen display associated with a mobile computing device. In another example embodiment, the display interface 104 can be configured for providing data, images, and other information for an external/remote display that is not necessarily physically connected to the mobile computing device. For example, a desktop monitor can be utilized for mirroring graphics and other information that is presented on a mobile computing device. In certain some embodiments, the display interface 104 can wirelessly communicate, for example, via a Wi-Fi channel or other available network connection interface 112 to the external/remote display.

In an example embodiment, the network connection interface 112 can be configured as a communication interface and can provide functions for rendering video, graphics, images, text, other information, or any combination thereof on the display. In one example, a communication interface can include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 can include a keyboard interface 106 that provides a communication interface to a keyboard. In one example embodiment, the computing device architecture 100 can include a presence-sensitive display interface 107 for connecting to a presence-sensitive display. According to certain some embodiments of the disclosed technology, the presence-sensitive display interface 107 can provide a communication interface to various devices such as a pointing device, a touch screen, a depth camera, etc. which can or can not be associated with a display.

The computing device architecture 100 can be configured to use an input device via one or more of input/output interfaces (for example, the keyboard interface 106, the display interface 104, the presence sensitive display interface 107, network connection interface 112, camera interface 114, sound interface 116, etc.) to allow a user to capture information into the computing device architecture 100. The input device can include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device can be integrated with the computing device architecture 100 or can be a separate device. For example, the input device can be an accelerometer, a magnetometer, a digital camera, a microphone, and an optical sensor.

Example embodiments of the computing device architecture 100 can include an antenna interface 110 that provides a communication interface to an antenna; a network connection interface 112 that provides a communication interface to a network. In certain embodiments, a camera interface 114 is provided that acts as a communication interface and provides functions for capturing digital images from a camera. In certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data can be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the transmission and receipt of sound over a telephone network. The constituent devices and the CPU 102 communicate with each other over a bus 134.

According to an example embodiment, the CPU 102 has appropriate structure to be a computer processor. In one arrangement, the CPU 102 can include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data can be stored in the RAM 118, where the data can be accessed by the computer CPU 102 during execution. In one example configuration, the device architecture 100 includes at least 125 MB of RAM, and 256 MB of flash memory.

The storage medium 122 itself can include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system can be tangibly embodied in storage medium 122, which can comprise a machine-readable storage medium.

According to one example embodiment, the term computing device, as used herein, can be a CPU, or conceptualized as a CPU (for example, the CPU 102 of FIG. 1). In this example embodiment, the computing device can be coupled, connected, and/or in communication with one or more peripheral devices, such as display. In another example embodiment, the term computing device, as used herein, can refer to a mobile computing device, such as a smartphone or tablet computer. In this example embodiment, the computing device can output content to its local display and/or speaker(s). In another example embodiment, the computing device can output content to an external display device (e.g., over Wi-Fi) such as a TV or an external computing system.

In some embodiments of the disclosed technology, the computing device can include any number of hardware and/or software applications that are executed to facilitate any of the operations. In some embodiments, one or more I/O interfaces can facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., can facilitate user interaction with the computing device. The one or more I/O interfaces can be utilized to receive or collect data and/or user instructions from a wide variety of input devices. Received data can be processed by one or more computer processors as desired in various embodiments of the disclosed technology and/or stored in one or more memory devices.

One or more network interfaces can facilitate connection of the computing device inputs and outputs to one or more suitable networks and/or connections; for example, the connections that facilitate communication with any number of sensors associated with the system. The one or more network interfaces can further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

The disclosed technology includes video log images as an input for some embodiments of the technology. Video log images can be frames taken from a video recorded by a vehicle travelling along a road. Alternatively, video log images can be still images taken from vehicles, or either video or still images taken while not in a vehicle. By way of a non-limiting example, a video log image can be a photo taken from a mobile device. In general, video log images are any digital images that can contain a traffic sign.

Traffic Sign Detection and Color Segmentation

Figure 2:
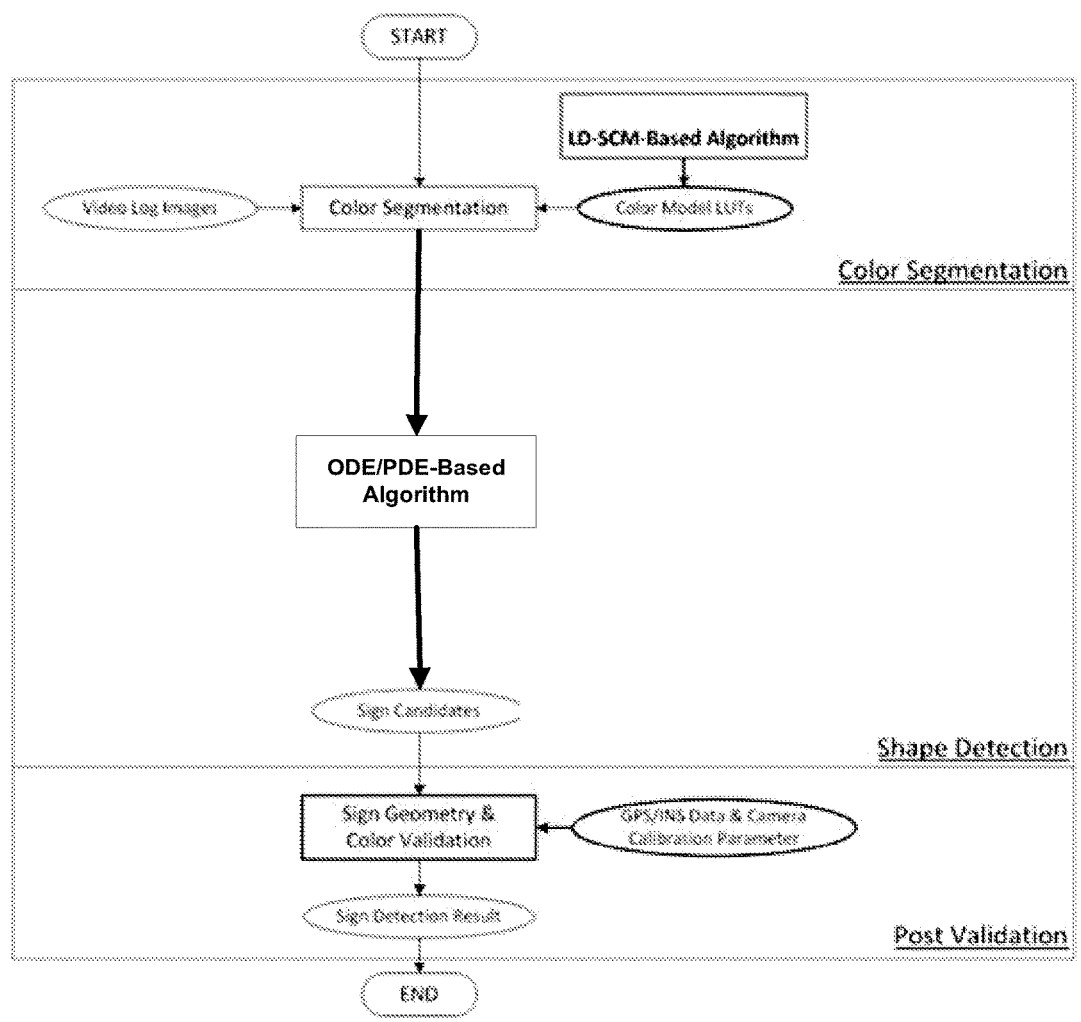
FIG. 2 is a flow chart depicting a color segmentation, shape detection, and post-validation steps in accordance with an embodiment.

In some embodiments, the disclosed traffic sign detection method can be based on the fundamental features of traffic signs defined in the Manual on Uniform Traffic Control Devices (MUTCD). In some embodiments, the traffic sign detection method can consist of three steps: 1) color segmentation, 2) shape detection, and 3) post validation. In some embodiments, the traffic sign detection method can follow the general framework of Tsai et al., 2009, with modifications. In some embodiments, the color segmentation step can conduct a pixel-wise color classification on an image, such as a frame from a video log. In some embodiments, the shape detection step can detect polygons using extracted image edges and contours. In some embodiments, the post validation step can verify each of the detected sign candidates using traffic sign geometry and color constraints. FIG. 2 shows a flow of the enhanced automatic traffic sign detection method in accordance with an embodiment. In some embodiments, the LD-SCM-based color segmentation algorithm can enhance the performance in the color segmentation step. In some embodiments, the ODE/PDE-based shape detection algorithm can enhance the performance in the shape detection step.

Lighting conditions can vary in video log images because the images can be captured under varying weather conditions, in varying driving directions, at varying times of the day, and using varying camera configurations. FIGS. 3A-D shows the four typical lighting conditions in video log images, including over-exposure (FIG. 3A), normal (FIG. 3B), under-exposure (FIG. 3C) and adverse lighting (FIG. 3D). These lighting conditions can distort the representation of colors captured in video log images. In some embodiments, an image lighting condition classification model can identify four typical lighting conditions, including adverse lighting conditions. In some embodiments, a separate Statistical Color Model (SCM) can be used for each lighting condition. In some embodiments, each SCM can be established using local homogeneity features. In some embodiments, artificial neural networks (ANN) are then formulated to calculate the probability that each pixel is of each MUTCD color. By selecting the corresponding SCMs for video log images under different lighting conditions, the images can be segmented into different MUTCD colors to support the subsequent shape detection step.

Figure 4:
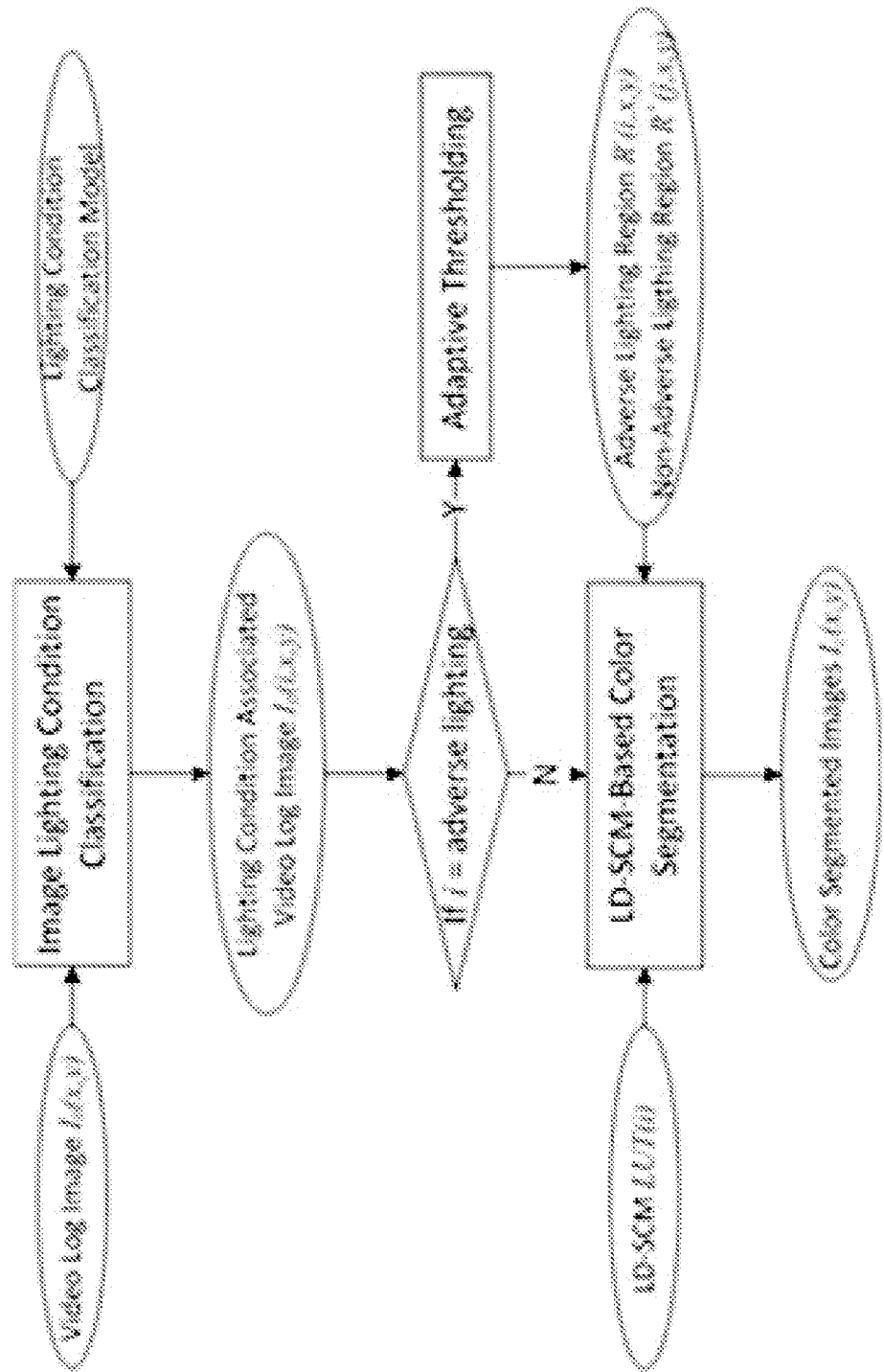
FIG. 4 is a flow chart depicting an image classification and segmentation process in accordance with an embodiment.

FIG. 4 shows a flow of a LD-SCM-based color segmentation algorithm in accordance with an embodiment. The input video log image $I_0(x, y)$ can be first classified into one of the four lighting conditions using the developed image lighting condition model, represented by an additional index i for each pixel. i is a four-bit index $[B_{over} B_{norm} B_{under} B_{adv}]$. For example, an over-exposure pixel will be [H S V [1000]], an under-exposure pixel will be [H S V [0010]], a normal pixel without adverse lighting condition will be [H S V [0100]], and a normal pixel with adverse lighting condition will be [H S V [0101]]. The output lighting condition associated video log image $I_0(i, x, y)$ can be then input into the LD-SCM-based color segmentation. The corresponding look-up table of the LD-SCM, i.e. LUT(i), can be selected for color segmentation. In some embodiments, where the lighting condition of the image is identified as an adverse lighting condition, an adaptive thresholding method can be applied to the image to identify the adverse lighting region R−(i, x, y) and non-adverse lighting region R+(i, x, y), where two LD-SCM LUTs, i.e. LUT(i) and LUT(j), are applied for segmentation. In some embodiments, the LUT associated with the over-exposure lighting condition can be applied to the non-adverse lighting region, while the LUT associated with the under-exposure lighting condition can be applied to the adverse lighting region. As is recognized by a person having ordinary skill in the art, other SCM's can be applied to the adverse and non-adverse lighting regions, such as separate SCM's unique to each, or one of the normal SCM, over-exposure SCM, or under-exposure SCM. After the color segmentation, the segmented images will be input into the subsequent shape detection step.

Lighting Condition Detection

In some embodiments, a lighting condition can be identified as one of (1) over-exposure condition, (2) under-exposure condition, (3) normal lighting condition and (4) adverse-lighting. FIG. 3A-D shows the examples of these four lighting conditions.

Figure 3A:
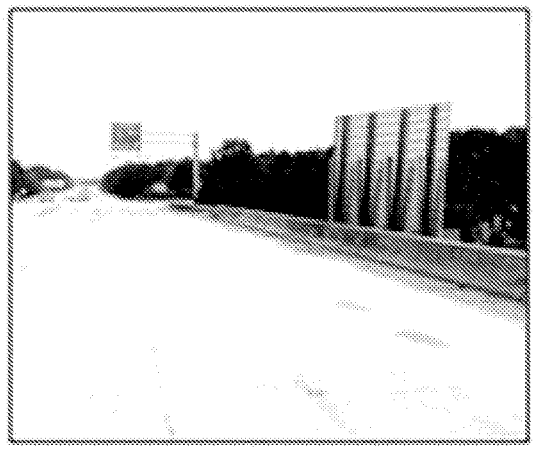
FIG. 3A is an example of an image having a lighting condition of over-exposure.

An over-exposure condition, as shown in FIG. 3A, can be a scene in which light sources are so strong that most of the pixels in the image are over-saturated with a general high intensity value. In such cases, most of the colors are distorted to be close to the white color, especially the light MUTCD sign colors of yellow and fluorescent-yellow-green (FYG).

Figure 3B:
FIG. 3B is an example of an image having a lighting condition of normal.

A normal lighting condition, as shown in FIG. 3B, can be a scene in which light sources are adequately applied to the whole image region, and the objects captured in the image truthfully reflect their real color.

Figure 3C:
FIG. 3C is an example of an image having a lighting condition of under-exposure.
Figure 3D:
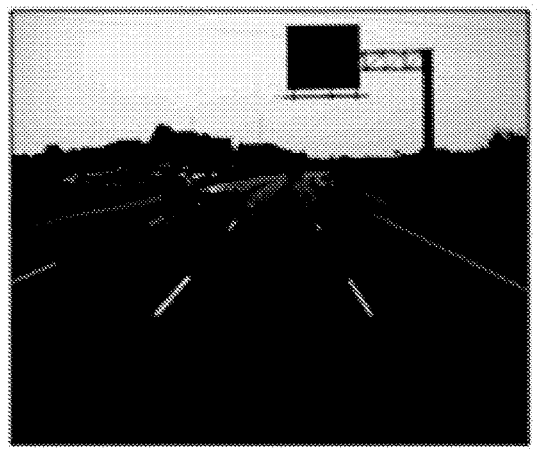
FIG. 3D is an example of an image having a lighting condition of adverse lighting.

An under-exposure condition, as shown in FIG. 3C, can be a scene in which light sources are not sufficient, so that most of the pixels in the under-exposed image are dimmed with a general low intensity value. In such cases, most of the colors can be distorted to be close to the black color, especially the sign colors of red, blue, and green.

An adverse-lighting condition, as shown in FIG. 3D, can be a scene in which light sources are located behind the traffic signs. For the adverse-lighting case, the pixels in the image can be grouped into two clusters with general low and high intensity values, respectively. The adverse-lighting region typically contains pixels that are under-exposed (low intensity value), while the non-adverse-lighting region typically contains pixels that are over-exposed (high intensity value).

In some embodiments, a simple lighting condition model using only a mean value and a median value of the video log image can be employed. In the case of normal lighting conditions, the brightness level of all pixels follows a steady distribution throughout the whole color, and the average intensity is not overwhelmingly large or small. In the cases of over-exposure conditions, the mean value of the brightness levels tends to reside in the large-value section, while in the cases of the under-exposure condition; the mean value of the brightness levels tends to reside in the small-value section. Therefore:

$$B_{over}=1 \text{ while } B_{mean}>B_{ThreshA}, B_{under}=1 \text{ while } B_{mean}<B_{ThreshB}, \text{ otherwise, } B_{norm}=1 \quad (1)$$

where $B_{over}$, $B_{under}$ and $B_{norm}$ are the indices indicating if the current video log image can be under over-exposure, under-exposure, or normal conditions, respectively, while $B_{threshA}$ and $B_{threshB}$ are the upper and lower bounds of the image intensity.

In the case of normal lighting conditions, the brightness level of all pixels follows a steady distribution throughout the whole color and brightness ranges of each image. Therefore, the mean value differs little from the median value. To the contrary, in the cases of adverse lighting conditions, the median value of the brightness levels tends to reside in the small-value section and, consequently, it differs much from the average value of the whole array of all pixels. Therefore:

$$B_{Adv}=1 \text{ while } |B_{mean}-B_{median}|>D_{Thresh}, \text{ Otherwise, } B_{Adv}=0 \quad (2)$$

where $B_{b1}$ can be the index indicating if the current video log image can be in an adverse lighting condition, and $D_{Thresh}$ can be the minimum value determining whether or not the current video log image can be in adverse lighting condition.

In some embodiments, the thresholds $D_{Thresh}$, $B_{ThreshA}$ and $B_{ThreshB}$ are predetermined. In some embodiments, a calibrating dataset can be used to calibrate these thresholding values. To use a calibrating data set, a large number of images can be examined by human operators, and classified as belonging to a specific lighting condition. The calculations above can be run, and the thresholds adjusted until the method generates acceptably accurate results. A subjective labeling process can be used to label each image of the calibrating data set as one of the defined lighting conditions. The thresholds can then be determined based on the labeling outcome. Once the threshold values are determined, no repetitive labeling work can be required.

Lighting-Dependent Statistical Color Models (LD-SCM)

In some embodiments, the LD-SCM model for traffic sign color segmentation can use statistical information of the nine MUTCD defined sign colors. In addition, the model includes a local homogeneity feature to create new input for the LD-SCM. Further, the method can incorporate the image lighting condition to create different LD-SCM models for the corresponding lighting conditions. The former feature can help to reduce the impact of the local color non-homogeneity on the color model caused by the local noise, while the latter feature can help reduce the impact of the color distortion caused by lighting condition changes.

In some embodiments, each pixel of a video log image can be identified as an element of a larger homogenous region corresponding to an object, such as a traffic sign. In some embodiments, color segmentation can label the pixel with the correct color index and associate the pixel with a larger homogenous region corresponding to an object. In these embodiments, instead of treating each pixel individually, a local homogeneity feature can be proposed to create an input for the LD-SCM representing local color homogeneity. In some embodiments, the HSV color space can be used to extract the pixel-level color feature. In these embodiments, HSV color space can effectively separate color information and intensity information. Assuming $I_{ij}=(H_{ij}, S_{ij}, V_{ij})$ represent the three color components of a pixel at the location of (i, j) in an M×N image, the following two steps describe an embodiment of the process.

In some embodiments, the first step can be to construct a local image window. For each pixel, a size d×d window can be centered at (i, j) for the computation of the pixel-level color feature. The window size can influence the computation of the local homogeneity value. The window should be big enough to allow enough local information to be involved in the computation of the local homogeneity for the center pixel of the window. Furthermore, using a larger window in the computation of the local homogeneity increases the smoothing effect and makes the derivative operations less sensitive to noise. A 5×5 size can be selected in this study to avoid large computation time and maintain the representativeness of the homogeneity and robustness to noise.

In some embodiments, the second step can be to compute the pixel color feature. Homogeneity can be determined by the standard deviation and discontinuity of each color component. The standard deviation of color component $\sigma_{ij}^k$ (k=H, S, V) can be calculated as $$\sigma_{ij}^k = \sqrt{\frac{1}{d^2}\sum_{m=i-\left(\frac{d-1}{2}\right)}^{i+\left(\frac{d-1}{2}\right)}\sum_{n=j-\left(\frac{d-1}{2}\right)}^{j+\left(\frac{d-1}{2}\right)}(x_{ij}^k - \mu_{ij}^k)^2} \quad (3)$$

Where $$\mu_{ij}^k = \frac{1}{d^2}\sum_{m=i-\left(\frac{d-1}{2}\right)}^{i+\left(\frac{d-1}{2}\right)}\sum_{n=j-\left(\frac{d-1}{2}\right)}^{j+\left(\frac{d-1}{2}\right)} x_{ij}^k \quad (4)$$

The discontinuity of the color component $e_{ij}^k$ (k=H, S, V) can be computed by edge values. In some embodiments, the edge values are computed using a Sobel operator:

$$e_{ij}^k = \sqrt{G_x^{k2} + G_y^{k2}} \quad (5)$$

where $G_x^k$ and $G_y^k$ are the edge components in x and y directions for each color component, respectively.

In some embodiments, the third step can normalize the data. To maintain the computation consistency, the computed values for both standard deviation and the discontinuity measurement should be normalized between 0 and 1:

$$\sum_{ij}^k = \frac{\sigma_{ij}^k}{\sigma_{max}^k}, E_{ij}^k = \frac{e_{ij}^k}{e_{max}^k} \quad (6)$$

where $\sigma_{max}^k=\max\{\sigma_{ij}^k\}$ $e_{max}^k=\max\{e_{ij}^k\}$. Therefore, the local color homogeneity can be represented as $C_{ij}^k$ (k=H, S, V), which can be also within the range between 0 and 1. The more uniform the local region surrounding a pixel can be, the larger the local color homogeneity value associated with the pixel.

$$C_{ij}^k = 1 - \Sigma_{ij}^k \cdot E_{ij}^k \quad (7)$$

Through such computation, the HSV values for each pixel can be transformed into the local color homogeneity values, i.e. $(C_{ij}^H, C_{ij}^S, C_{ij}^V)$, not only retaining the original HSV information, but also incorporating the local neighboring homogeneity information.

Figure 5:
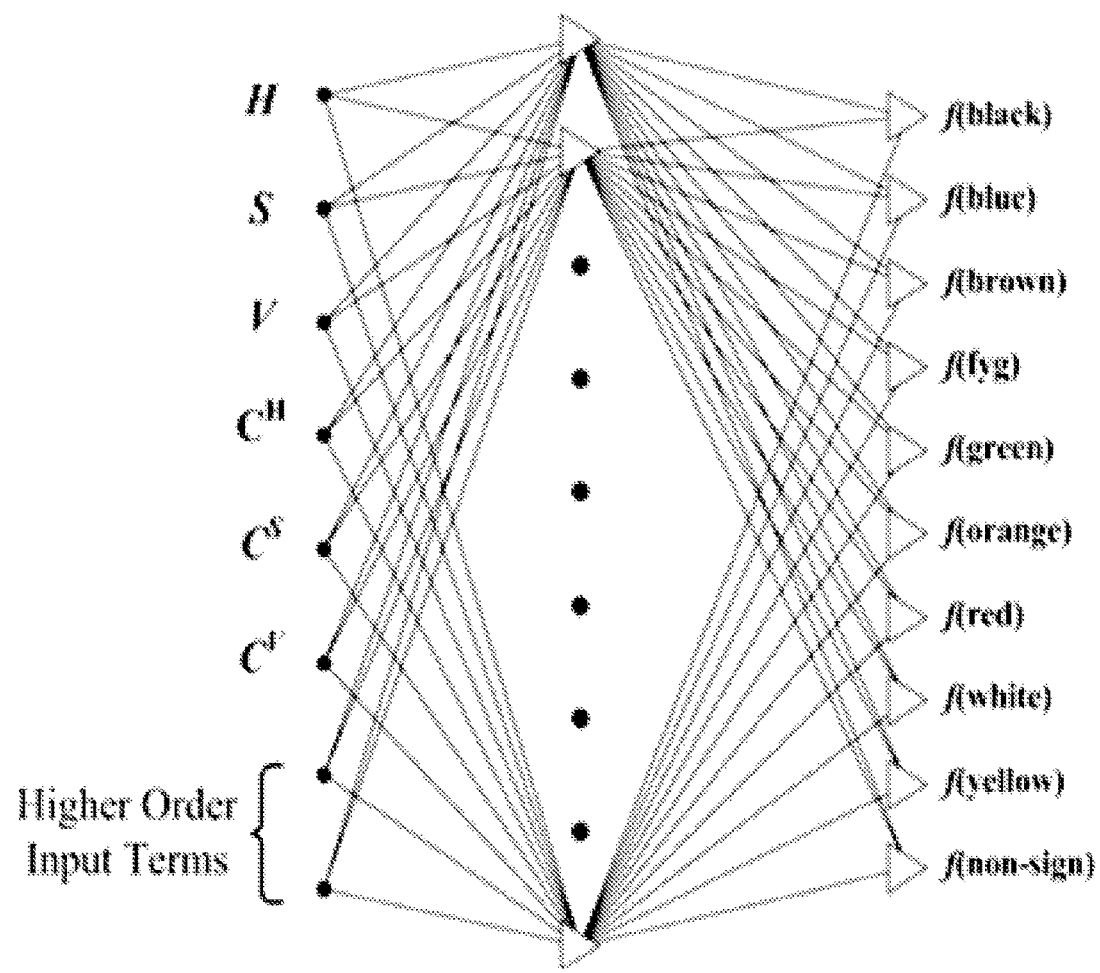
FIG. 5 is a diagram depicting a functional-link artificial neural network for performing color segmentation in accordance with an embodiment.

An objective of the SCM can be to establish an estimation function to fill up the missing reference values for the complete 24-bit RGB color space. The estimation function interpolates the probability density functions (PDFs) for each MUTCD defined color. To serve such objective, an Artificial Neural Network (ANN) can be used to create the MUTCD SCM estimation function. The ANN can be implemented using a functional link network (FLN) architecture. FIG. 5 shows the formulation of the ANN architecture, where the higher order input terms can be computed based on the formulation by Tsai et al (2009). These higher order input terms can effectively remove the hidden layer of the neural network to enhance computational efficiency. As is recognized by persons of ordinary skill in the art, other ANN systems can be used that do not require higher order terms, but can include a hidden layer of neural nodes. However, to incorporate the local pixel-level homogeneity feature proposed in previous subsection, both (H, S, V) and $(C_{ij}^H, C_{ij}^S, C_{ij}^V)$ are input into the ANN, together with their corresponding high-order input terms. Therefore, both the local pixel-level color information and the local pixel-level homogeneity information can be integrated into the training process.

Figure 6A:
FIG. 6A is an image of a "Road Work Ahead" sign having a lighting condition of under-exposure.
Figure 6B:
FIG. 6B is the image of FIG. 6A segmented into MUTCD colors with a lighting-dependent statistical color model for under-exposed images in accordance with an embodiment.
Figure 6C:
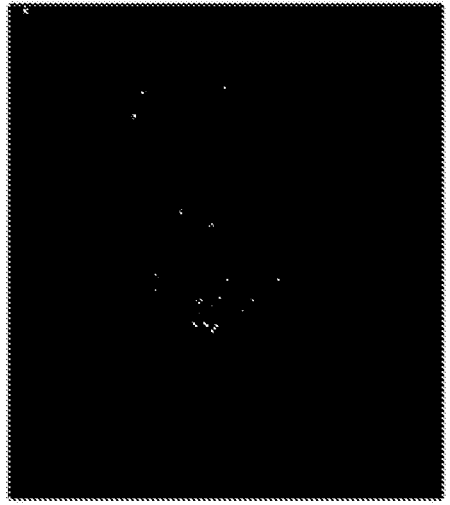
FIG. 6C is the image of FIG. 6A segmented into MUTCD colors with a lighting-dependent statistical color model for normal lighting in accordance with an embodiment.

For each lighting condition, a separate LD-SCM using the ANN training process can be created. Therefore, for each pixel associated with different lighting conditions, three representations of the LD-SCM can be used for segmentation, namely LD-SCM$_{OE}$ (for over-exposed lighting conditions), LD-SCM$_{UE}$ (for under-exposed lighting conditions), and LD-SCM$_{NL}$ (for normal lighting conditions). FIG. 6A-C shows an image captured in the under-exposure lighting condition and the segmentation results to demonstrate the different performance using different LD-SCMs. When applying LD-SCM$_{NL}$, almost all the pixels (in both sign region and background region) are incorrectly segmented as black. Instead, when applying LD-SCM$_{UE}$, the pixels are correctly segmented as yellow and green for the sign region and background region, respectively.

In some embodiments, three LUTs are created for LD-SCM$_{OE}$, LD-SCM$_{UE}$, and LD-SCM$_{NL}$ separately to accelerate the processing speed of color segmentation. Instead of running through the model and conducting color space transformation for each individual pixel, the LUTs are created, and the corresponding probabilities can be hard-coded in the LUT for each color. To practically implement the LUTs, 8 bits can be assigned to each color component, i.e. representing the (H, S, V) as in [0, 255] levels, while 3 bits can be assigned to each homogeneity indices, i.e. representing the $(C_{ij}^H, C_{ij}^S, C_{ij}^V)$ as in [0, 7] levels.

Adverse Lighting Conditions

Figure 7:
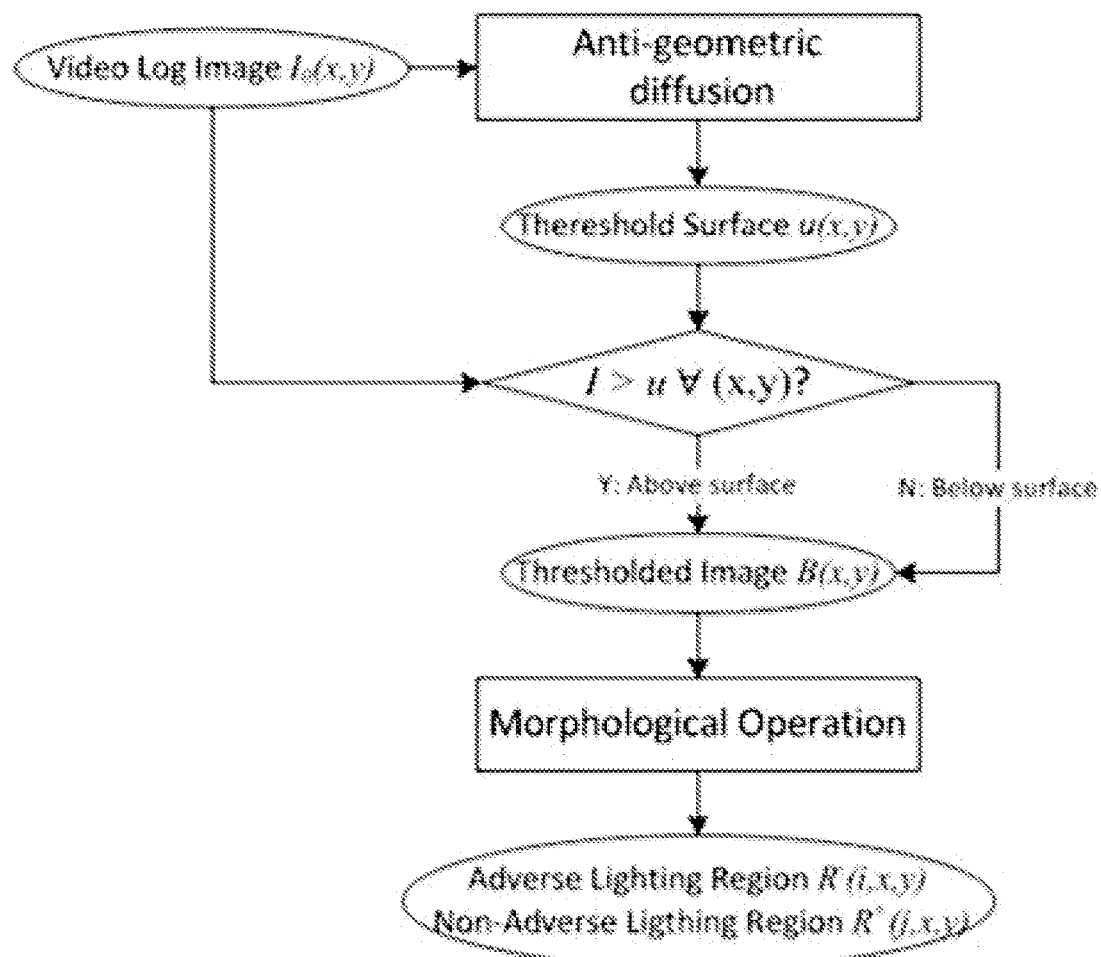
FIG. 7 is a flow chart depicting an adaptive thresholding method for adverse lighting region identification in accordance with an embodiment.

Video log images captured under adverse lighting conditions can contain two peaks in the intensity histograms, one peak with high-intensity values (i.e. non-adverse lighting region, typically over-exposed) and one with low-intensity values (i.e. adverse lighting region, typically under-exposed). The objective of the adverse lighting region identification can be to cluster the image into two regions using adaptive thresholding so that different LD-SCM models can be applied to minimize the color distortion due to different lighting conditions. FIG. 7 shows the flow of the proposed adaptive thresholding method for adverse lighting region identification. The video log image can be first diffused using an anti-geometric heat equation to produce a threshold surface (i.e. diffused image u(x, y)). By comparing the video log image and the threshold surface, the regions that are above the threshold surface can be in a non-adverse lighting regions, while the regions that are below the threshold surface can be adverse lighting regions. In some embodiments, morphological open and close operations can be applied to candidate regions to remove the isolated noise points in the regions. The outputs of the operations can be respectively indexed as the adverse lighting region R⁻(x, y) and non-adverse lighting region R⁺(x, y).

A standard adaptive thresholding technique can be to generate a threshold surface over the whole image domain and binarize the image by determining whether the intensity of a pixel can be below or above the threshold surface. The most frequently used method can be to blur the image with a designed Gaussian low-pass filter to smooth the image (equivalent to a linear heat equation). In some embodiments, an anti-geometric heat equation can be introduced to diffuse the image. By applying such an equation, only the diffusion in the normal direction of the edge can be preserved, while the diffusion in the tangential direction can be omitted.

Assuming the edge in the image can be decomposed into two orthogonal directions, normal direction η and tangential direction ξ, the directions in terms of the first derivatives of the image $I_x$ and $I_y$ can be written as $$\eta = \frac{(I_x, I_y)}{\sqrt{I_x^2 + I_y^2}}, \xi = \frac{(-I_y, I_x)}{\sqrt{I_x^2 + I_y^2}} \quad (8)$$

As the Laplacian operator is rotationally invariant, the linear heat equation can be rewritten by replacing the second order derivatives in x and y directions into in η and ξ.

$$\frac{\partial I}{\partial t} = \nabla \cdot (\nabla I) = I_{\eta\eta} + I_{\xi\xi} \quad (9)$$

To minimize the impact of edges in creating the threshold surface, the component in the tangential direction can be omitted, i.e. ξ direction. Therefore, the anti-geometric heat equation can be constructed, whose diffusion occurs deliberately across the boundaries of image features.

$$\frac{\partial I}{\partial t} = \nabla \cdot (\nabla I) = I_{\eta\eta} = \frac{I_x^2 I_{xx} + 2I_x I_y I_{xy} + I_y^2 I_{yy}}{I_x^2 + I_y^2} \quad (10)$$

Figure 8C:
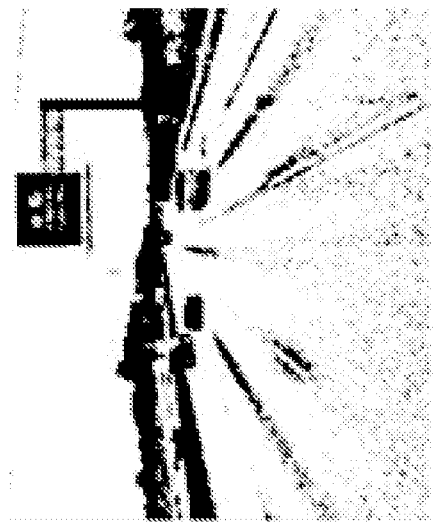
FIG. 8C is the image of FIG. 8A after an adverse lighting adaptive thresholding operation.
Figure 8B:
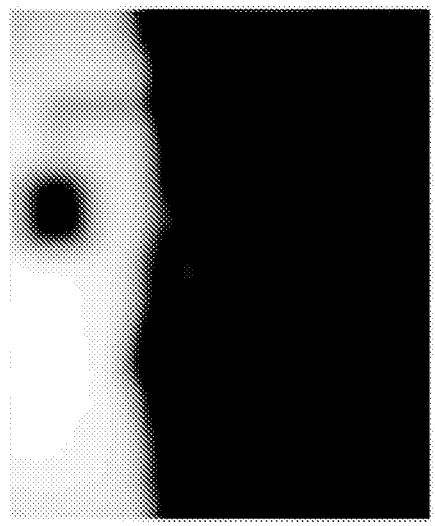
FIG. 8B is a threshold surface calculated using the image of FIG. 8A.
Figure 8A:
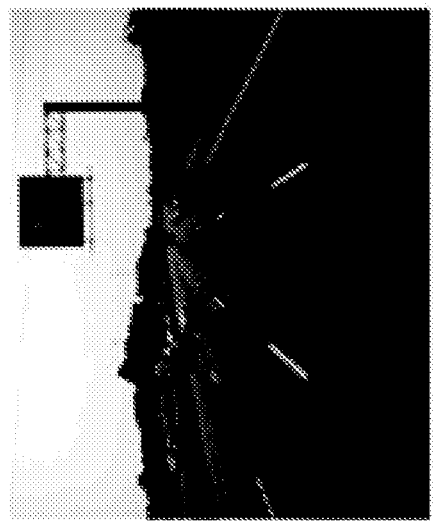
FIG. 8A is an image of a road sign.

FIG. 8A shows an image captured under adverse lighting conditions and FIG. 8B shows the adaptive thresholding result using dt=0.2 and total 100 steps. By applying the anti-geometric heat equation to the image for diffusion, it can be observed that the equation successfully identifies the adverse lighting region in the image, as shown in FIG. 8C.

Figure 9A:
FIG. 9A is the image of FIG. 8C
Figure 9B:
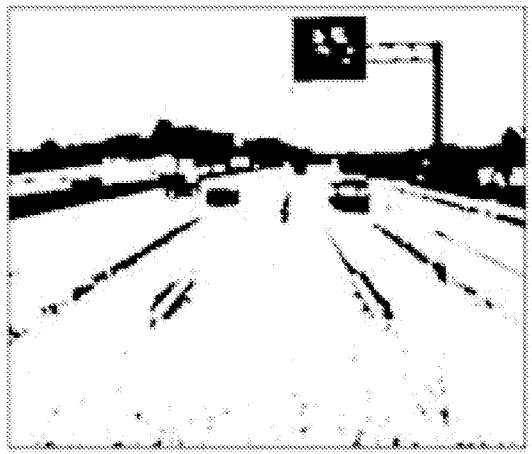
FIG. 9B is the image of FIG. 9A after a morphological open and close operation.

A morphological open and close operation can be applied to the thresholded image so that the small spikes and holes will be removed. FIG. 9A-B shows the final results after the morphological operations. The bright regions are corresponded to the non-adverse lighting regions, while the dark regions are corresponded to the adverse lighting regions. Different LS-SCMs will be applied to the two identified regions respectively.

A cluttered background can be captured in the video log images for traffic sign inventory, as in many other outdoor scenes. Different man-made objects, vegetation, and casting shadows of these objects are captured in the images to produce cluttered backgrounds. FIG. 9A-B shows two examples of a cluttered background. A cluttered background can pose a challenge for most of the shape detection algorithms using edge-based operation because the cluttered background not only contains false edges but they intersect with the true edges that potentially destructs the shape feature of traffic signs. In this section, an ODE/PDE-based shape detection algorithm can be used to address the identified challenge. In this section, a region-based energy function can be formulated to minimize the impact of false edges produced by a cluttered background. Both the standard region-based active contour and region-based active polygon can be formulated to fit the energy function, and the optimal solution can be suggested. A generalized Hough transform model for different MUTCD defined traffic sign shapes can be created to locate the initialization of the active polygon.

Shape Detection

This section develops and presents two formulations, active contour (AC), and active polygon (AP), using the region-based energy functional and compares their outcomes to choose the one most suitable for traffic sign detection.

A region-based curve evolution model can define the energy function based on the statistics from image regions rather than gradient. The intent of introducing such energy function can be to minimize the impact of the false edges (gradients) due to the cluttered background. The region-based energy function can consist of four components, including 1) the arc-length component, 2) the area component, 3) the inside energy and 4) the outside energy.

$$F(c_1, c_2, C) = \mu \cdot \text{Length}(C) + \nu \cdot \text{Area}(\text{inside}(C)) + \lambda_1 \int_{\text{inside}(C)} |u_0(x, y) - c_1|^2 dx dy \lambda_1 + \lambda_2 \int_{\text{outside}(C)} |u_0(x, y) - c_2|^2 dx dy \quad (11)$$

Where $c_1$ and $c_2$ are the average intensity levels inside and outside of the contour, $\lambda_1$, $\lambda_2$, μ and γ are fixed parameters that need calibration. The solution of the minimization problem can be the solution for the specific object detection problem in the image domain.

$$\text{in } f_{c_1,c_2,C} F(c_1, c_2, C) \quad (12)$$

Active Contour Formulation

Active contour can be first formulated to implement the region-based energy function. The original region-based energy function can be customized to fit the need for detection of traffic signs with 1) appropriate initialization location for the video log image and 2) fast convergence to trace the traffic sign shape. To achieve this, a hybrid active contour (HAC) method can incorporate three sub-energy components: location probability distribution function (PDF) sub energy, SCM sub energy, and global contour length sub energy. An energy function in accordance with an embodiment can be formulated as shown below:

$$E = \lambda \cdot \left[ \int_R (I_{PDF} - u_{PDF})^2 \, dA + \int_{R^c} (I_{PDF} - v_{PDF})^2 \, dA \right] + \quad (13)$$
$$(1 - \lambda) \cdot \left[ \int_R (I_{SCM} - u_{SCM})^2 \, dA + \int_{R^c} (I_{SCM} - v_{SCM})^2 \, dA \right] + \mu |c|$$

Where
$I_{SCM}$ is the color-segmented video-log images,
$I_{PDF}$ is the location PDF bitmap;
$\lambda$ is a scaling parameter to balance the two sub energy components 1 and 2;
$\mu$ is a scaling parameter to control the sub energy component 3; and
u and v are the average intensity inside and outside of the contour respectively.
The suffix indicates that the intensity value is from the color-segmented video-log image (SCM) or the location PDF bitmap (PDF).

Sub Energy Component 1:
Location PDF energy. The Location PDF can be a 2-D probability density function that can be spatially represented by a gray level bitmap in the range of a video log image, shown as FIG. 10. It can be one of the traffic sign spatial distribution characteristics that has been identified and incorporated into the energy function to speed up active contour convergence speed. The Location PDF bitmap shown in FIG. 10 can be created using 1500 video log images containing traffic signs collected by the city of Nashville by manually extracting the sign boundary. The pixels inside of the boundary are marked as black and outside of the boundary are marked as white. By cumulating the entire 1500 manually marked images, normalizing them into gray level scale and smoothing, the location PDF can be generated. The dark area indicates the locations with the high sign occurrence frequency (i.e. an image location with high likelihood of having a sign). This component can be formulated using the location PDF bitmap and can control the evolvement of a contour at an early stage. This enables the initial contour to quickly converge to the area with a high sign occurrence frequency with a larger contour evolving step size. Component 2 can be designed to trace the detailed traffic sign boundary with a smaller contour evolving step size as described below:

Sub Energy Component 2:
SCM energy. SCM can be a 2-D probability density function that can be spatially represented by a gray level image in the range of the video log image shown in FIG. 11, i.e. short for LD-SCM in this subsection. It can be another important traffic sign characteristic in a 2-D image. The image can be called a color-segment image, which indicates that each pixel of the image represents the likelihood of a standard MUTCD color. The dark area indicates the locations with a high likelihood of a certain color. There can be ten color-segmented images produced in the procedure of color segmentation using SCM, as shown in FIG. 4. This component can be formulated over one of the ten color-segmented images. For example, a yellow color-segmented image can be used in FIG. 11 because it can be a yellow warning sign. This component controls the contour's evolvement at the later stage and enables the contour to trace the detailed traffic sign boundary with a smaller contour-evolving step size.

Sub Energy Component 3:
Global contour length energy. Global contour length can be represented as the pixel length of the contour. This component can be used to establish a termination criterion at the later stage that prevents the contour from being over-evolved. A termination criterion of a contour length not exceeding ½ of the perimeter of a video log image can be used because a traffic sign in a video log image can be typically less than ¼ of the entire image.

By constructing the three sub energy components, the key characteristics of a traffic sign in a video log image are incorporated into the HAC energy function formulation. The contour evolves to minimize the formulated energy function and converges when the energy can be minimized. The contour evolvement can be divided into a global evolvement at an early stage and a local evolvement at a later stage.

Figure 10:
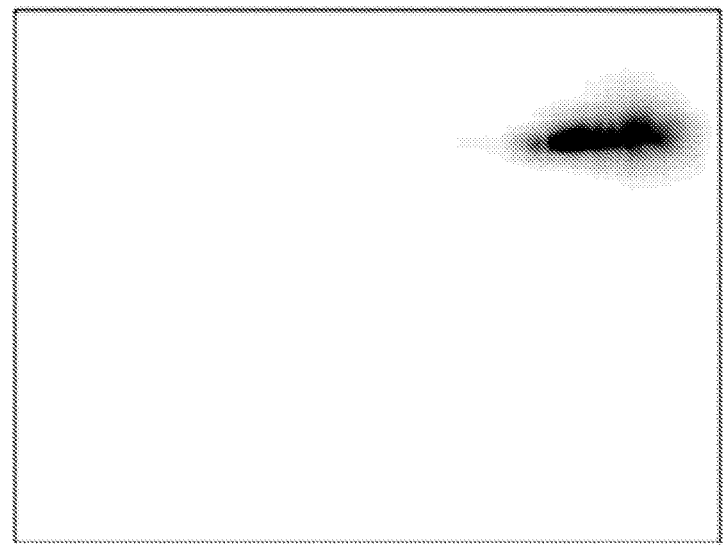
FIG. 10 is a location probability distribution function of finding a road sign in a video log image created using 1500 video log images with traffic signs.

In some embodiments, based on location PDF, the contour can converge at an early stage to the location at which a traffic sign can be mostly likely to occur in a video log image (i.e. dark area in the location PDF bitmap), shown as FIG. 10. The arrows show one of the contour pixels progressing directions with the contour evolvement (i.e. shrinking to the rough location globally) in this stage to quickly identify the rough location of a traffic sign at a larger step size. After the sign location can be identified roughly, at the later stage, the detailed sign boundary can be traced (as shown in FIG. 10) using a smaller contour-evolving step size. The arrows show the contour pixels progressing directions with the contour evolvement (i.e. deformation and tracing the boundary locally) at this stage. The contour inside the traffic sign area can be pulled by the energy outward and the contour outside the traffic sign area can be pushed by the energy inward until an accurate boundary is obtained. The sign boundary can be accurately traced with fast convergence speed using the proposed two-stage, contour-evolving process based on unique traffic sign characteristics.

The formulated energy in HAC can be implemented using a level set method. In some embodiments, the level set method can be the one described in Chan & Vese, 2001. The energy function can be rewritten using the Heaviside function H as $$E(u_{SCM}, v_{SCM}, u_{PDF}, v_{PDF}, \phi) = \quad (14)$$
$$\lambda \cdot \left[ \int_R |I_{PDF} - u_{PDF}|^2 H(\phi) \, dA + \int_{R^c} |I_{PDF} - v_{PDF}|^2 (1 - H(\phi)) \, dA \right] +$$
$$(1 - \lambda) \cdot \left[ \int_R |I_{SCM} - u_{SCM}|^2 H(\phi) \, dA + \int_{R^c} |I_{SCM} - v_{SCM}|^2 (1 - H(\phi)) \, dA \right] + \mu \int_R |\nabla(H(\phi))|$$

where
$\phi$ is the level set function, where $\phi = 0$ is used to guarantee each point of the contour evolves in its normal direction. In some embodiments, the level set function can be the one described in Osher & Sethian, 1988;
H is the Heaviside function, which can be used to differentiate the inside and outside of the contour.

The objective of the implementation can be to minimize the energy function E with respect to $u_{SCM}$, $u_{PDF}$, $v_{SCM}$, $v_{PDF}$ and $\phi$. Keeping $\phi$ fixed and minimizing the energy function with respect to the constants $u_{SCM}$, $u_{PDF}$, $v_{SCM}$ and $v_{PDF}$, these constants can be expressed using Equation (14).

$$u_X = \frac{\int_{R_X} I_X H(\phi) \, dA}{\int_{R_X} H(\phi) \, dA} \quad v_X = \frac{\int_{R_X^c} I_X (1 - H(\phi)) \, dA}{\int_{R_X^c} (1 - H(\phi)) \, dA} \quad (15)$$

$X = SCM, PDF$

Keeping $u_{SCM}$, $u_{PDF}$, $v_{SCM}$ and $v_{PDF}$ fixed and minimizing the energy function with respect to φ, φ can be expressed using the equation below, where an artificial time t can be introduced for the energy decent direction.

$$\frac{\partial \phi}{\partial t} = \tag{16}$$
$$\delta_\varepsilon(\phi)[-\lambda|I_{PDF} - u_{PDF}|^2 + \lambda|I_{PDF} - v_{PDF}|^2 - (1-\lambda)|I_{SCM} - u_{SCM}|^2 +$$
$$\lambda|I_{SCM} - v_{SCM}|^2] + \mu div\left(\frac{\nabla \phi}{|\nabla \phi|}\right) = 0$$

where $\delta_\varepsilon = H_\varepsilon$, that $H_\varepsilon$ is a $C^1$-approximation of H, which is a classical approximation function.

Introducing the location PDF sub-energy component can let the contour quickly evolve to the location where a traffic sign can be most likely to occur. In order to accelerate the contour convergence, the step sizes can be varied based on location PDF area. When the evolving contour intersects with the location PDF area, with 95% probability having a sign, the evolving speed can reduce from 5 pixels per step size to 1 pixel per step size. Changing the evolving speed can enable a faster contour convergence with a larger step size when it can be outside the location PDF area and a detailed traffic sign boundary trace with a small step size when reaching the location PDF area with high probability having a sign.

μ is defined as the scaling factor to balance the energy between the contour shape and its boundary length. 0.1 can be used for the μ value as recommended in the region-based active contour method. λ is the scaling factors to balance the importance of the energy value contributed from the location PDF and the energy contributed from the color segmented image using the SCM. It can be between 0 and 1. With λ close to 1, the contour demonstrates the evolving behavior globally (in the whole image) to converge the contour quickly, controlled by the location PDF. With λ close to 0, the contour demonstrates the evolving behavior locally (in the traffic sign area) to trace the boundary accurately, controlled by the SCM. The values of λ can be adaptively selected to balance the contour converging speed and the contour accuracy. Based on our trial and error test, the value of 0.85 can achieve a reasonable outcome in obtaining the sign boundary.

Active Polygon Formulation

Figure 12B:
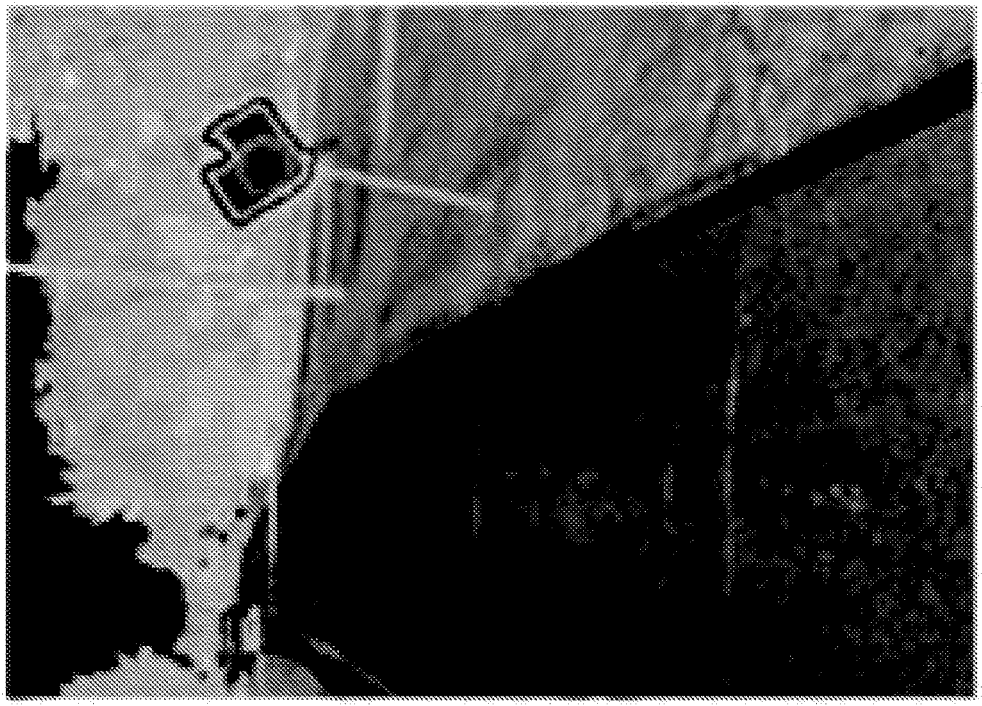
FIG. 12B shows the result of an unconstrained active contour function on the image of FIG. 12A, depicting a false-negative case caused by over-evolution of the curve.
Figure 12A:
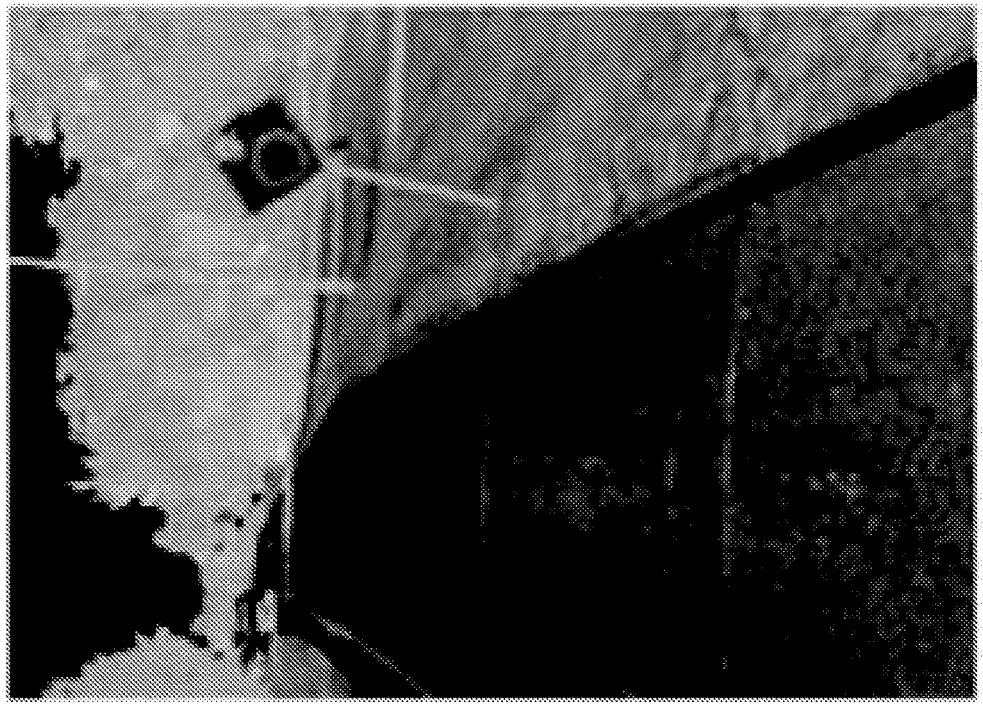
FIG. 12A is a color-segmented image of a road sign for a single color.
Figure 13A:
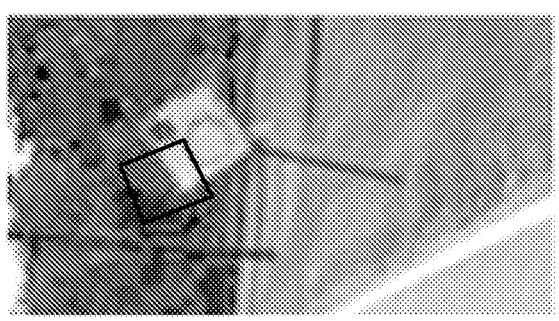
FIG. 13A-E depict the evolution steps of an active polygon function in accordance with an embodiment on an image of a road sign.
Figure 13B:
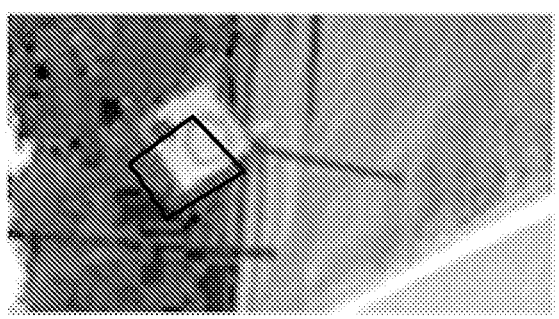
Figure 13C:
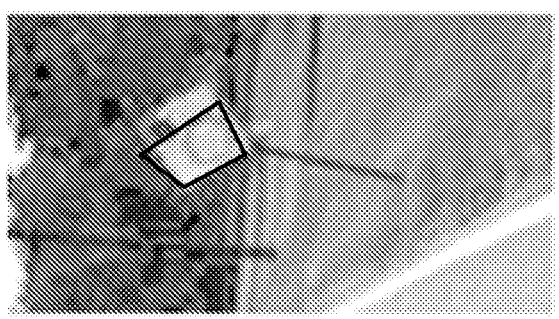
Figure 13D:
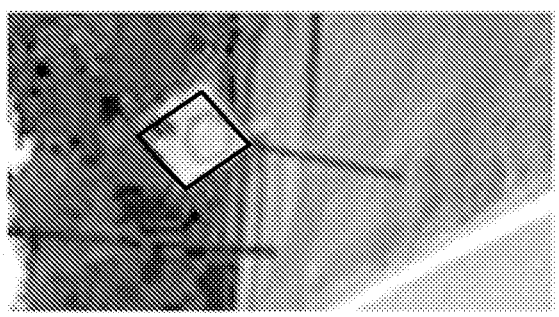
Figure 13E:
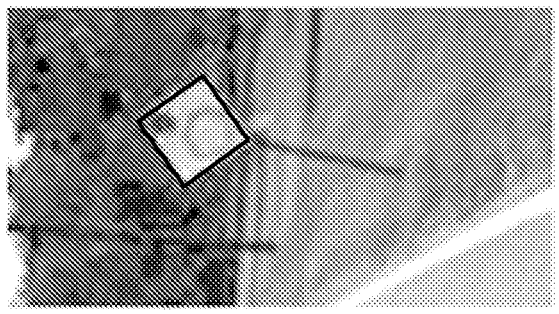

In some embodiments, an active polygon can be formulated to compare the performance of the ones obtained from the active contour. Although the active contour formulation, in general, obtains good detection results, there are several cases in which the formulated unconstrained active contour using the region-based energy does not converge to the boundary of the traffic signs. FIG. 12A-B shows an example where the unconstrained active contour intrudes the pictogram of the traffic sign. Many of these cases are caused by to the unconstrained contours over-evolving over traffic signs that are imperfectly color segmented. A constrained active contour method can improve the performance in these cases. This method can follow the formulated energy to trace the traffic sign boundary, while simultaneously maintaining geometrical shape. In addition, by maintaining the geometrical shape of the active contour, the processing time can be significantly reduced.

In some embodiments, a constrained version of region-based active contour, i.e. region-based AP, can be used to achieve the above-mentioned objective and improve the performance of the shape detection algorithm. The region-based AP algorithm follows the same methodology as the unconstrained active contour, but by adding additional constraints, the constructed shape only evolves with a limited number of vertices rather than arbitrarily evolving each contour point.

The principle of formulating an active polygon initially can be similar to formulating an active contour where the contour evolves following the gradient flow associated with the energy E. Instead of evolving each point of the contour following the gradient flow at each point, the goal can be to design flows to move the "contour" by its vertices. The general form of contour C: [a b] ⊂ R→$R^2$ around some region R ⊂ $R^2$, in which the integrand ƒ consists of a function ƒ: $R^2$→R is written as below:

$$E(C) = \int\int_R f(x, y) dxdy = \oint_{C=\partial R} \langle F, N \rangle ds, \tag{17}$$

where N denotes the outward unit normal to C, ds the Euclidean arc-length, and where F=($F^1$, $F^2$) is chosen so that ∇·F=ƒ. By parameterization of the curve where C(a)=C(b) using p∈[a, b]:

$$E(C) = \int_a^b \langle F, N \rangle \|C_p\| dp = \int_a^b \langle F, JC_p \rangle dp, \text{ where} \tag{18}$$

$$J = \begin{bmatrix} 0 & 1 \\ -1 & 0 \end{bmatrix}, \text{ and } N\|C_p\| = JC_p. \tag{19}$$

For the proposed active polygon, v denotes a Cartesian coordinate of any vertex; therefore, the gradient flow can be associated with E, the derivative of E with respect to v. In some embodiments, the gradient flow can follow the method described in either Chun and Yuille (1996) and Yezzi et al. (2002).

$$E_v(C) = \int_a^b f(C_v, JC_p) dp \tag{20}$$

When considering C as a closed polygon V instead of a smooth curve with a fixed number of vertices {$V_1$, $V_2$, . . . , $V_n$}={($x_i$, $y_i$), i=1, 2, . . . n}. Therefore, C can be parameterized by p∈[0, n] as $$C(p, V) = L(p - \lfloor p \rfloor, V_{\lfloor p \rfloor}, V_{\lfloor p \rfloor + 1}) \tag{21}$$

Where ⌊p⌋ denotes the largest integer which can be not greater than p, and where L(t, A, B)=(1−t)A+tB parameterized between 0 to 1 the line from A to B with constant speed, where A and B denote the end points of a polygon edge. Following such a parameterization, the gradient descent flow can be $$\frac{\partial V_k}{\partial t} = \int_0^1 pf(L(p, V_{k-1}, V_k)) dp N_{k,k-1} + \tag{22}$$
$$\int_0^1 (1-p)f(L(p, V_k, V_{k+1})) dp N_{k+1,k}$$

Where $N_{k,k-1}$ (resp. $N_{k+1,k}$) denotes the outward unit normal of edge ($V_{k-1}$-$V_k$) (resp. ($V_k$-$V_{k+1}$)). In some embodiments, the parameterization can follow the method described in Unal et al. Such a gradient descent flow essentially indicates that each of the vertices can be controlled by the images values along two adjacent edges ($V_{k-1}$-$V_k$) and ($V_k$-$V_{k+1}$). The motion of each vertex can be based on a weighted combination of the unit normal only at the polygon's edge points. The PDE problem as defined in an unconstrained active contour formulation can be converted to an ODE problem by individually solving the ODE for each vertex for the proposed active polygon. FIG. 13A-E illustrates how the active polygon evolves over a video log image. The detected diamond shape maintains its geometrical shape even when there can be a slight part of the legend merged into the background.

Polygon Initialization

An objective of polygon initialization can be to identify rough locations that have the highest likelihood of being each traffic sign type. Since traffic signs are man-made objects with well-defined geometrical shapes specified in the MUTCD with a limited number of types, it can be straightforward to find the polygon initialization by taking advantage of such strong geometry features. Therefore, a generalized Hough transform (GHT) can be introduced for the polygon initialization. In some embodiments, the GHT method described in D. H. Ballard, "Generalizing the Hough Transform to Detect Arbitrary Shapes", Pattern Recognition, Vol. 13, No. 2, p. 111-122, 1981 can be used.

Figure 14:
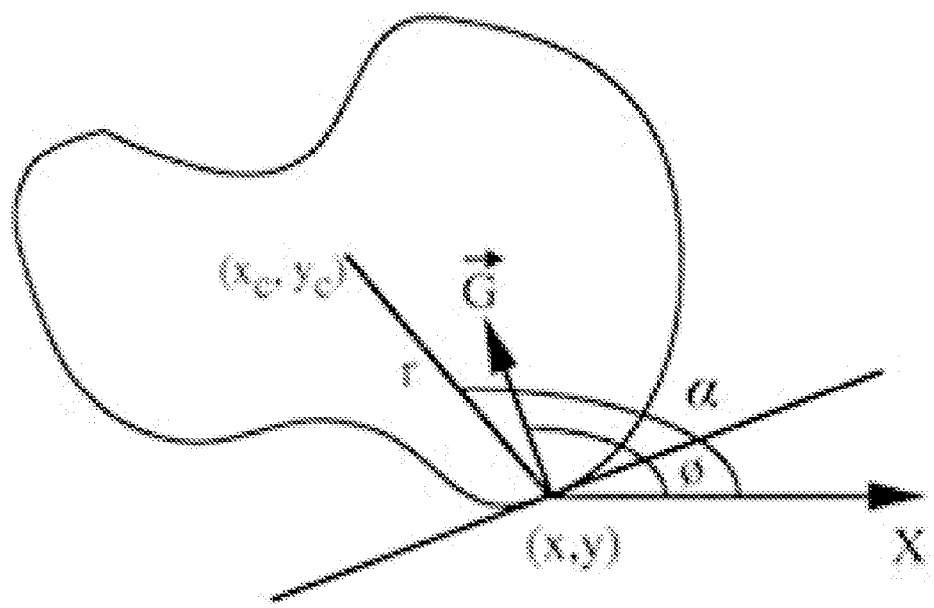
FIG. 14 is an illustration of the R-Table establishment for each $\phi$ and edge point (x, y).

The GHT algorithm can be a two-step algorithm containing an R-table establishment step and a detection step. The R-table establishment step can be to create a template table that contains the complete specification of the exact shape of the target object. For the arbitrary shape shown in FIG. 14, select the centroid ($x_c$, $y_c$) as a reference point;

Connect the reference point and the boundary point (x, y).

Figure 15:
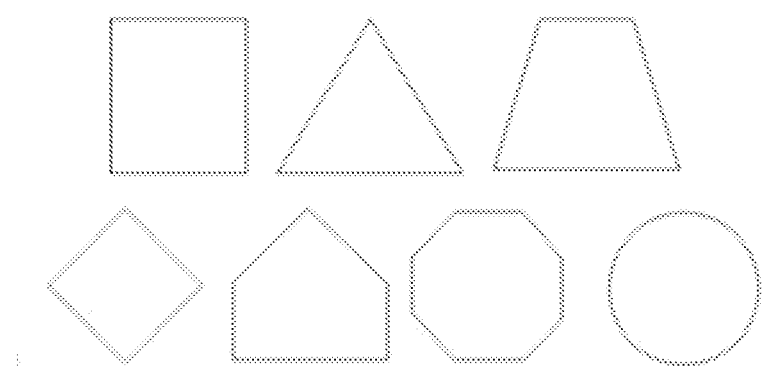
FIG. 15 is an illustration of different MUTCD defined traffic sign shapes.

Compute the angle $\phi$ (i.e. the angle between the normal of the boundary point (x, y), G, and the horizontal direction, X);

Store the corresponding parameters r (i.e. distance between the reference point and the boundary point) and $\alpha$ (i.e. the angle between the line linking ($x_c$, $y_c$) and (x, y) and the horizontal direction) as a function of $\phi$;

The R-table represents the complete specification of the exact shape of the target object. For different traffic sign shapes, different R-tables should be prepared individually. There are seven different convex traffic sign shapes that are defined in the MUTCD as shown in FIG. 15, including, triangle, rectangle, trapezoid, diamond, pentagon, octagon, and circle. Nine different R-tables are created for sign detection purposes.

In some embodiments, the detection step can be to find the object center where the maximal similarity can be identified based on the complete specification of the target object. The pseudo-code below shows the process of shape detection step. As the orientation and scale of traffic signs captured in the video log images can be changed due to different capture distances, angles or the condition changes of the signs themselves, the orientation and scale factors are introduced. Quantize the parameter space:

$$P[x_{c_{min}} \ldots x_{c_{max}}][y_{c_{min}} \ldots y_{c_{max}}][\theta_{min} \ldots \theta_{max}][s_{min} \ldots s_{max}]$$

For each edge point (x, y)

Using gradient angle $\phi$, retrieve all the ($\alpha$, r) values from the R-table For each ($\alpha$, r), compute the candidate reference points:

$x' = r \cos(\alpha)$ $y' = r \sin(\alpha)$

For ($\theta = \theta_{min}$; $\theta \leq \theta_{max}$; $\theta$++)
For (s = $s_{min}$; s $\leq s_{max}$; s++)

$x_c = x - (x' \cos(\theta) - y' \sin(\theta))s$ $y_c = y - (x' \sin(\theta) - y' \cos(\theta))s$ ++$P[x_c][y_c][\theta][s]$ Possible locations of the object are given by local maxima in $P[x_c][y_c][\theta][s]$.

Figure 16C:
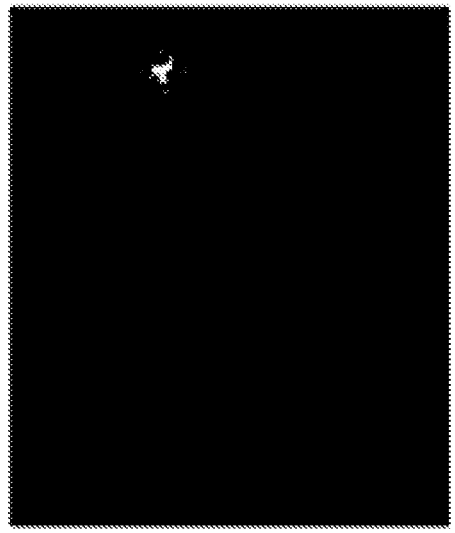
FIG. 16C is an illustration of an initial polygon found using the generalized Hough transform accumulator of FIG. 16B.
Figure 16B:
FIG. 16B is an illustration of the results of a generalized Hough transform accumulator in accordance with an embodiment applied to the image of FIG. 16A.
Figure 16A:
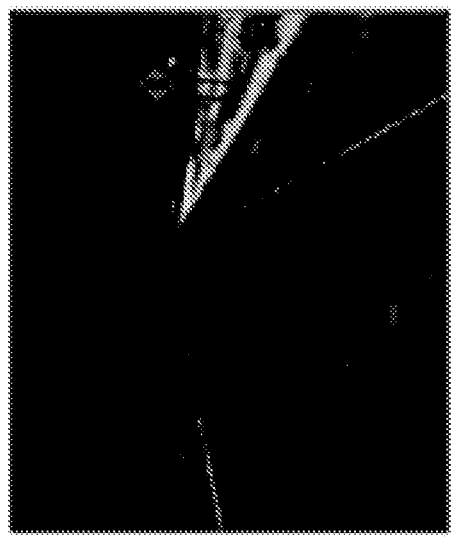
FIG. 16A is a color-segmented image of a roadway, containing a road sign.

FIG. 16A-C shows an example of the result finding a diamond-shaped polygon initialization location. The initialization shown in FIG. 16C will be used as the starting shape of the proposed active polygon algorithm. The exact shape of the traffic sign will be extracted.

Retroreflectivity Condition Assessment

Figure 17:
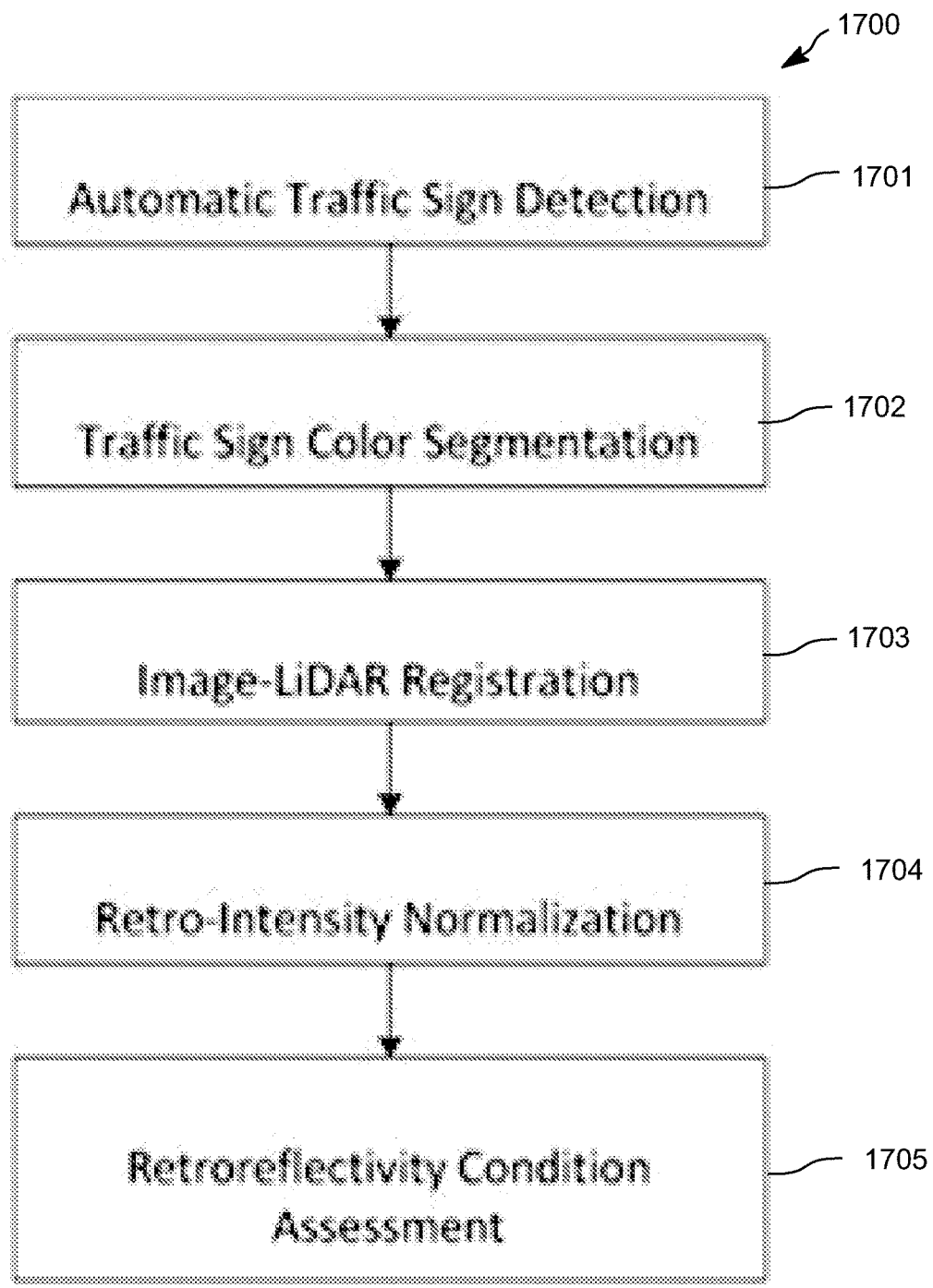
FIG. 17 is a flowchart depicting a generalized automatic traffic sign detection and retroreflectivity assessment method in accordance with an embodiment.

According to an embodiment, the retroreflectivity condition of a traffic sign can be assessed using mobile LiDAR and computer vision. FIG. 17 shows a flow chart of an example method 1700 of assessing the retroreflectivity condition of a traffic sign, in accordance with an embodiment. Aspects of steps 1701 and 1702 have been previously described in greater detail above with respect to traffic sign detection and color segmentation. Step 1702 can comprise automatically extracting regions of interest ("ROIs") from a video log of images of a traffic sign. Step 1702 can comprise segmenting different traffic sign colors for each extracted ROI from Step 1701. Step 1703 can comprise registering or associating the LiDAR point cloud with the corresponding image pixels from the color segmented ROIs of steps 1701 and 1702 so that each LiDAR point can be associated with a color and/or location on the surface of the traffic sign. In various embodiments, the LiDAR points can be grouped into clusters based on the color. For example, in the case of a stop sign, there can be a cluster of all LiDAR points associated with the red background of the sign, and another cluster of all LiDAR points associated with the white text of the sign. Step 1704 can comprise normalizing each retro-intensity value for each color cluster based on the beam distance and the incidence angle. In various embodiments, a series of LiDAR measurements can be obtained from a LiDAR sensor mounted on a moving vehicle, and thus, the each LiDAR point in a color cluster can have a different beam distance value and angle value. A LiDAR measurement or data point can include a variety of information such as a timestamp, 3D position information (e.g., latitude, longitude, elevation), a retro-intensity value, a distance value and an angle value. An incidence angle value, representing the angle of the surface of the traffic sign relative to the orientation of the LiDAR beam can be determined. In some embodiments, it may be necessary to normalize the beam distances and incidence angles across each cluster of LiDAR points so that that retro-intensity of the LiDAR points can be compared without differences in the beam distance or incidence angle creating distortions in the comparison. Lastly, step 1705 can comprise quantitatively assessing the traffic sign retroreflectivity condition by comparing a median value of the population of the normalized retro-intensity values with a predefined threshold that defines PASS or FAIL conditions. This step can be performed for each color cluster, as different colors can have different minimum thresholds of retroreflectivity. Although embodiments of disclosure are described herein with respect to steps 1701-1705, this description is not meant to be limiting, as these steps may be performed in any order or with additional steps.

Traffic Sign-Associated LiDAR Point Extraction

In some embodiments, a LiDAR sensor can be used to obtain LiDAR data from a traffic sign by emitting a beam of energy that reflects off of the traffic sign back to the LiDAR sensor for detection. LiDAR data can comprise a series of LiDAR points which represent portions of the traffic sign that were impacted by the beam emitted by the LiDAR sensor. A 3D LiDAR point can contain position information and a corresponding retro-intensity value. In some embodiments, the position information can comprise the two-dimensional location of the LiDAR point on the traffic sign, the beam distance and the angle of incidence between the LiDAR sensor and the traffic sign. The beam distance can represent the distance between the LiDAR sensor and the traffic sign.

In some embodiments, the LiDAR data may not include the prior traffic sign location information (such as the GPS coordinates of the sign) or traffic sign color information. Thus, it can be desirable to associate the LiDAR data or LiDAR points with the traffic sign location information in a 2D coordinate system and the traffic sign color information that may have been determined separately as described above. Associating the LiDAR data with previously determined location (2D coordinates) and color data may enable the LiDAR points corresponding to positions of the same color on the traffic sign to be grouped together. In some embodiments, the retro-intensity values of LiDAR points of the same color can then be compared to a predetermined threshold associated with a level of retroreflectivity for that color to determine whether the color meets a minimum standard of retroreflectivity. According to some embodiments, by determining whether each color of the traffic sign meets a minimum standard of retroreflectivity it can be determined whether the traffic sign passes or fails a minimum retroreflectivity standard. For example, in some embodiments, minimum retroreflectivity standards can be determined by the MUTCD.

Figure 18:
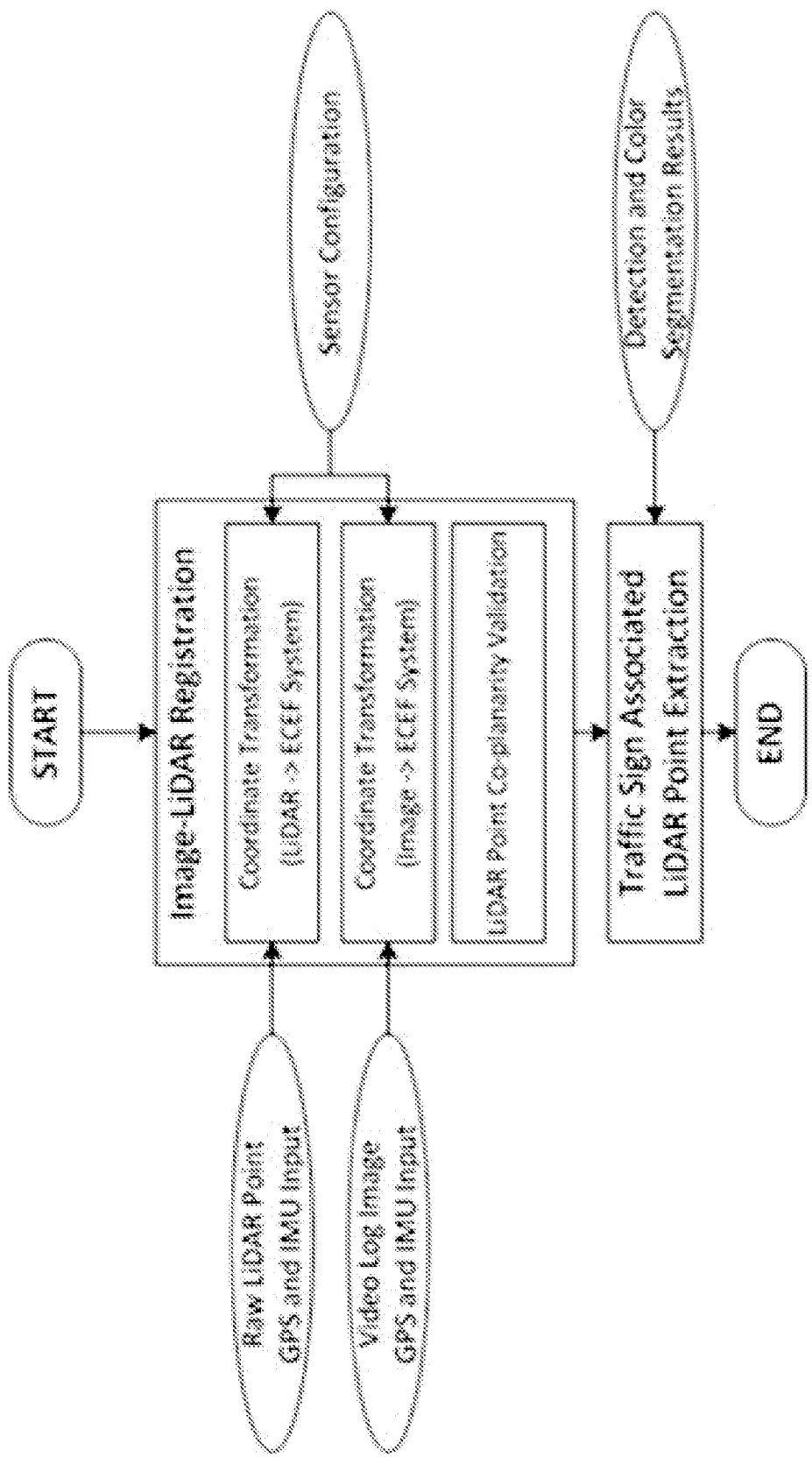
FIG. 18 is a flowchart further depicting a step of the method depicted in FIG. 17.

FIG. 18 shows a flowchart of an embodiment of a traffic sign-associated LiDAR point extraction method. In some embodiments, a camera calibration can be conducted to obtain the intrinsic camera parameters and to establish the camera homography. In some embodiments, a transformation matrix from GPS coordinates and image coordinates can be obtained from the camera homography and sensor configuration. According to some embodiments, the camera homography and the sensor configuration will remain substantially the same during data collection. In some embodiments, this can allow a feature-free image-LiDAR registration to be achieved using only the transformation matrix. In some embodiments, traffic sign-associated LiDAR points for each sign can be extracted from an image after the detected traffic sign's location in the image and the corresponding color segmentation results have been determined. According to some embodiments, the extracted sign-associated LiDAR points for each traffic sign can be projected as a 2D image containing retro-intensity information.

Feature-Free Image-LiDAR Registration Method

In some embodiments, a transformation matrix between a 2D image coordinate system and a 3D LiDAR sensor collection system can be obtained by the process of image-LiDAR registration. In some embodiments, the process of image-LiDAR registration can comprise associating each LiDAR point with a traffic sign detection result and its corresponding color. In some embodiments, registering LiDAR point clouds with satellite/airborne imagery using feature matching techniques between a 3D point cloud and a 2D image using control points or unique objects that are visible in both data can be accomplished by the method of Mishra & Zhang (2012). However, feature-matching-based registration methods can be computationally expensive and can require re-registration for different datasets. Thus, in some embodiments of the current disclosure, an image-LiDAR registration can be carried out using only the sensor position transformation, camera calibration, and point cloud co-planarity, as shown in FIG. 18. FIG. 18 shows a flowchart of an embodiment of a traffic sign-associated LiDAR point extraction method. Camera calibration can be conducted to obtain the intrinsic camera parameters and to establish the camera homography. Using the camera homography and the existing sensor configuration, the transformation matrix from GPS coordinates and image coordinates can be obtained. As the camera homography and the sensor configuration are the same during the data collection, an image-LiDAR registration can be achieved using only the transformation matrix. With the detected traffic sign's location in the image and the corresponding color segmentation results, traffic sign-associated LiDAR points for each sign can be extracted.

Figure 19:
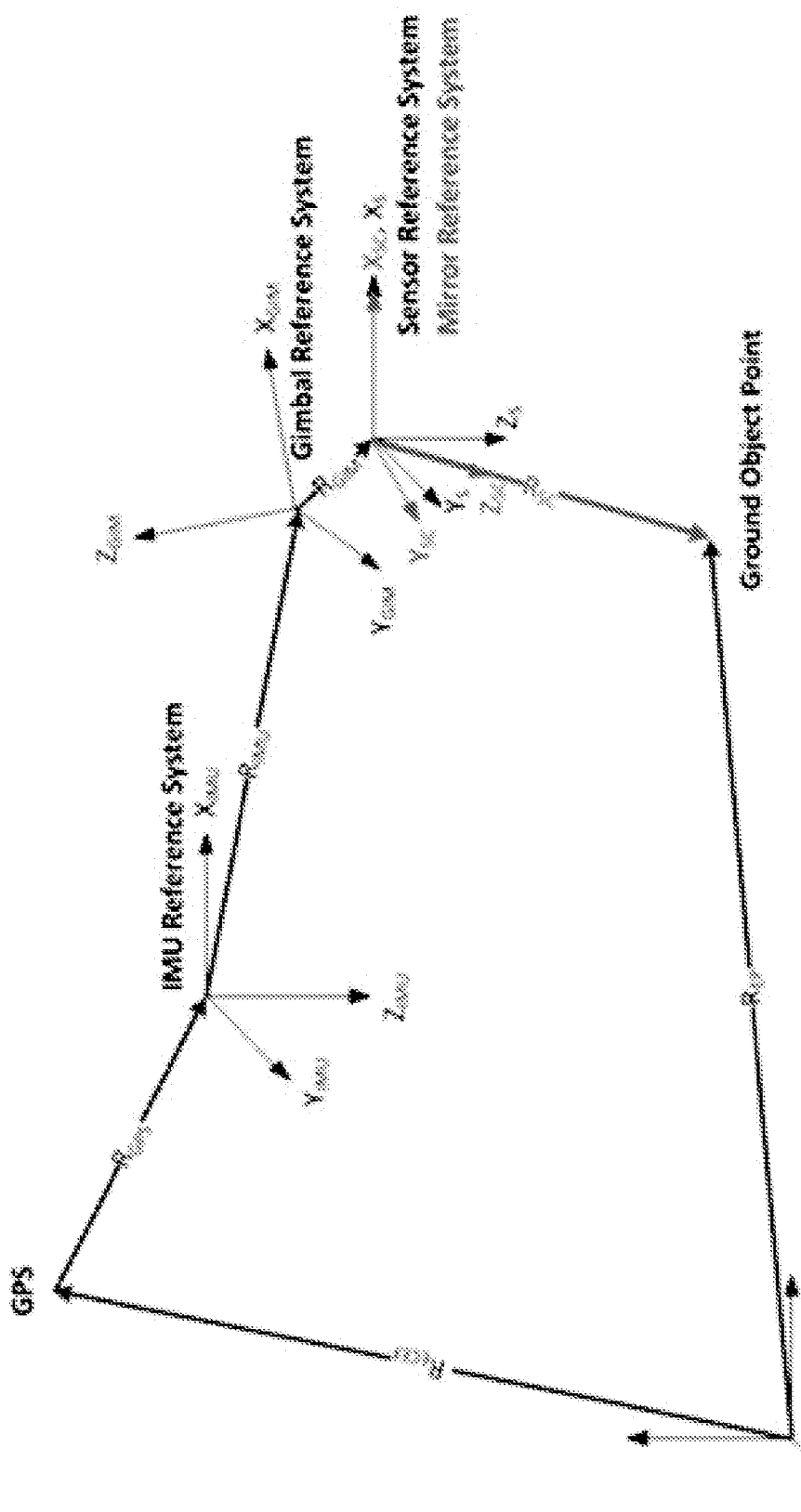
FIG. 19 is a diagram of the translations and rotations between the LiDAR and the ECEF reference systems in accordance with an embodiment.

In some embodiments of the current disclosure, a LiDAR system can obtain one or more measurements from a LiDAR sensor. The LiDAR sensor measurements can include the distance between the LiDAR sensor center to the object (e.g., a traffic sign) and the offset angle between the laser beam and the center scanning beam. In some embodiments, it can be desirable to obtain 3D coordinates in the Earth-Centered, Earth-Fixed (ECEF) reference datum (e.g., WGS-84). FIG. 19 shows an illustration of translations and rotations obtained from sensor observation and configuration constants for LiDAR pulse measurement that can be used for direct geo-positioning of an object. In some embodiments, direct geo-positioning of an object can be achieved by following the method described in NGA, (2009).

In some embodiments, the coordinates of a sensed object point in a geocentric ECEF coordinate system can be obtained from the following equation:

$$R_{EP} = R_{ECEF} + M_{ECEF} \cdot M_{ELL} \cdot M_{VER} \cdot (M_{PLA} \cdot (M_{GIM} \cdot M_{SEN} \cdot (R_{SCA} + R_{GIM}) + R_{INS} + R_{GPS})) \qquad (23)$$

where $R_{SCA}$ is the vector from the scanner to the ground point in the scanner reference frame, $R_{GIM}$ is the vector from the gimbal center of rotation to the sensor in the gimbal reference frame, $R_{INS}$ is the vector from the IMU to the gimbal center of rotation in the platform reference frame, $R_{GPS}$ is the vector from the GPS antenna phase-center to the IMU in the platform reference frame, $R_{ECEF}$ is the vector from the ECEF origin to the GPS antenna phase-center in the ECEF reference, $R_{EP}$ is the vector from the ECEF origin to the ground point in the ECEF reference frame, $M_{SEN}$ is the rotation matrix from scanner reference frame to sensor reference frame, $M_{GIM}$ is the rotation matrix from the sensor reference frame to the gimbal reference frame, $M_{PLA}$ is the rotation matrix from the gimbal reference frame to the platform reference frame, $M_{VER}$ is the rotation matrix from the platform reference frame to the local-vertical reference frame, $M_{ELL}$ is the rotation matrix from the local-vertical reference frame to the ellipsoid-tangential (NED) reference frame, and $M_{ECEF}$ is the rotation matrix from the NED reference frame to the ECEF reference frame.

In the equation, M represents the rotation matrix between different reference coordinate systems, while R represents the translation between different reference coordinate systems. Specifically, $R_{SCA}$ and $M_{SEN}$ are the readings obtained from the LiDAR sensor for each scanning point, while $M_{VER}$ is the reading obtained from the IMU sensor for each scanning point, and the $R_{ECEF}$ is the reading obtained from the GPS for each scanning point. According to some embodiments, the remaining values can be obtained from the sensor configuration on the data collection vehicle (i.e. lever arms) and the simple geo-referencing system conversion (i.e. $M_{ELL}$ and $M_{ECEF}$).

In some embodiments, GPS coordinates (i.e. ECEF coordinates) can be obtained for each LiDAR point by applying the above equation for each LiDAR point. In some embodiments, these 3D coordinates can be input into a camera coordinate system to obtain the corresponding image coordinates.

Figure 20:
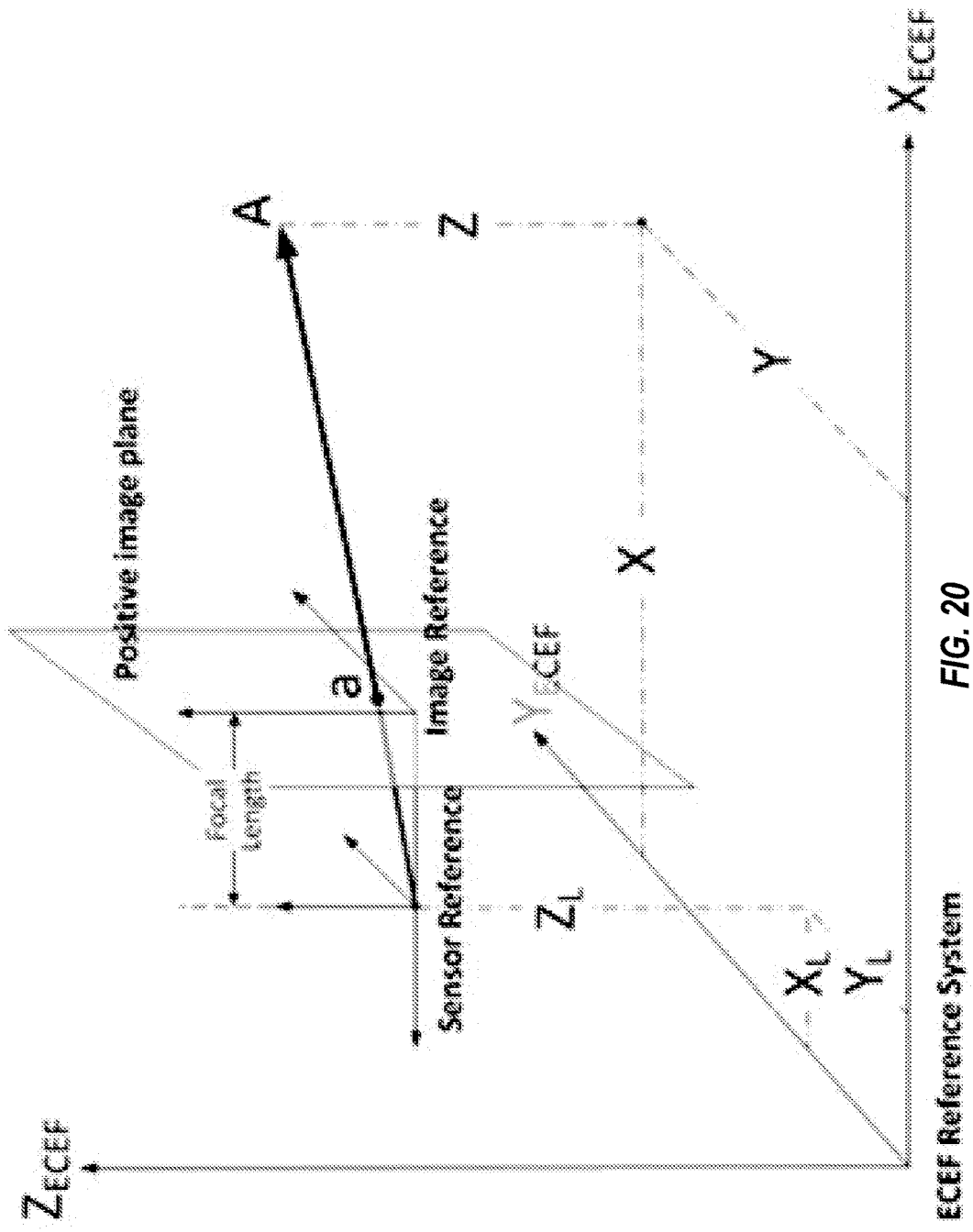
FIG. 20 is a diagram of the collinearity relationship between the object in the ECEF and the camera reference systems.

In some embodiments, a sensor of a camera system can measure color intensity information obtained by the camera (i.e. lens and the photometric device). In some embodiments, the ECEF coordinate can be projected to the camera coordinate system through the use of a 3D-to-2D translation and rotation matrix. In some embodiments, a transformation matrix can be obtained from a simple linear model using a collinearity equation. FIG. 20 shows an illustration of an exemplary embodiment of the collinearity between an object in the ECEF reference system and the camera reference system. As shown in the example in FIG. 20, the camera perspective center L, an arbitrary object point A, and its corresponding image point captured in the image plane can be collinear. Accordingly, vectors from the perspective center L to the image point and the object point can be directly proportional. According to some embodiments, the vector components must be defined with respect to the same coordinate system in order to associate each component of these vectors. In some embodiments, ECEF coordinates can be projected to the camera coordinate system by following the method described in NGA, (2009). Thus, according to some embodiments, the association between the object point A and the image point a can be defined as:

$$a = kMA \quad (24)$$

where k is the scalar multiplier and M is the orientation matrix of the camera that incorporates the camera rotation angles in three directions (i.e. roll, pitch and yaw) with respect to the vehicle local-vertical reference frame and the rotation angles between the vehicle local-vertical reference system to the ECEF reference system. Referring back to the example shown in FIG. 20, the collinearity condition can be represented as shown below:

$$\begin{bmatrix} x & 0 \\ y & - & 0 \\ 0 & f \end{bmatrix} = kM \begin{bmatrix} X & X_L \\ Y & - & Y_L \\ Z & Z_L \end{bmatrix} \quad (25)$$

Where (x, y) are the image coordinates of a, (X, Y, Z) and ($X_L$, $Y_L$, $Z_L$) are the coordinates of the object A and the camera perspective center L, respectively. According to some embodiments, subscripts can be used to represent the transformation matrix M, and thus the collinearity equation can be represented as:

$$\begin{bmatrix} x & 0 \\ y & - & 0 \\ 0 & f \end{bmatrix} = k \begin{bmatrix} m_{11} & m_{12} & m_{13} \\ m_{21} & m_{22} & m_{23} \\ m_{31} & m_{32} & m_{33} \end{bmatrix} \begin{bmatrix} X & X_L \\ Y & - & Y_L \\ Z & Z_L \end{bmatrix} \quad (26)$$

Although the earlier derivation expressed coordinates with regard to the image plane ("negative" plane), the image point a in the example shown in FIG. 20 can be represented by coordinates (x, y) whose relation is simply a mirror of the image plane. Thus, the components of a can have opposite signs of their mirror components (x, y) as follows:

$$\bar{x} = -(x - x_0)$$
$$\bar{y} = -(y - y_0) \quad (27)$$

where ($x_0$, $y_0$) is the image coordinates for the image center. According to some embodiments, upon solving the collinearity equation for a given object, the object's ECEF ground coordinates (X, Y, Z) can be related to its image coordinates (x, y) by the following equation:

$$x = x_0 - f \cdot \left[ \frac{m_{11}(X - X_L) + m_{12}(Y - Y_L) + m_{13}(Z - Z_L)}{m_{31}(X - X_L) + m_{32}(Y - Y_L) + m_{33}(Z - Z_L)} \right] \quad (28)$$

$$y = y_0 - f \cdot \left[ \frac{m_{21}(X - X_L) + m_{22}(Y - Y_L) + m_{23}(Z - Z_L)}{m_{31}(X - X_L) + m_{32}(Y - Y_L) + m_{33}(Z - Z_L)} \right]$$

where $x_0$, $y_0$ and $f$ can be derived from an intrinsic camera calibration process as in the following matrix:

$$M_{in} = \begin{bmatrix} -f/s_x & 0 & x_0 \\ 0 & -f/s_y & y_0 \\ 0 & 0 & 0 \end{bmatrix} \quad (29)$$

where $s_x$ and $s_y$ are the pixel size of the camera in x and y directions. According to some embodiments, these parameters can be obtained based on the actual camera sensor scale and the corresponding resolution.

It should be understood that there may be other image registration methods and techniques that may be used in connection with the disclosed invention, as many approaches are known. See, e.g. Tsai 1987; Zhang 2000; NGA 2009. Some embodiments of the present disclosure can use the approach described in Zhang (2000) or Tsai (1987). According to some embodiments, the camera calibration results $M_{in}$ can be obtained before the data collection is conducted.

In some embodiments, the transformation matrix M can provide the alignment between the camera coordinate system and the ECEF coordinate system. Therefore, the matrix is simple: the rotation matrices provided for the LiDAR system, where the only difference is that instead of using the $M_{PLA}$ for the LiDAR system, simply apply the camera orientation angles.

$$M = M_{ECEF} \cdot M_{ELL} \cdot M_{VER} \cdot M_{PLA} \quad (30)$$

For the camera position ($X_L$, $Y_L$, $Z_L$), following the same line of thought as shown in FIG. 20 sets the range vector $R_{SCA}$ to be zero and the $R_{GIM}$ to be the vector between the camera sensor and its corresponding support frame $R_{CAM}$. Therefore, the camera position in the ECEF reference system can be represented as $$R_L = R_{ECEF} + M_{ECEF} \cdot M_{ELL} \cdot M_{VER} \cdot (M_{PLA} \cdot R_{CAM} + R_{INS} + R_{GPS}) \quad (31)$$

Figure 21B:
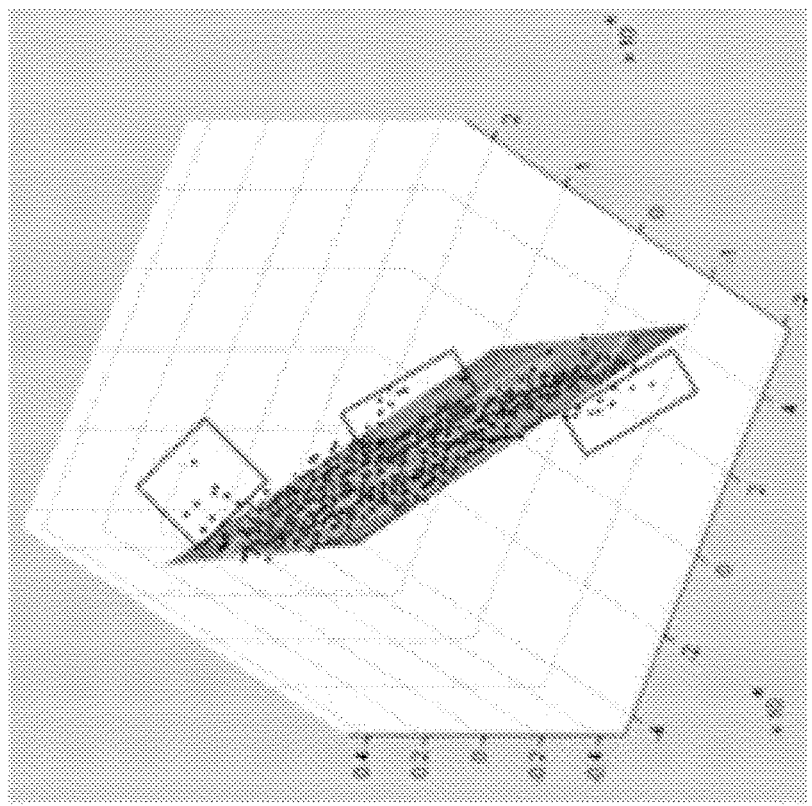
FIGS. 21A-B are images showing an example of LiDAR measurement error, highlighting "abnormal" points.
Figure 21A:
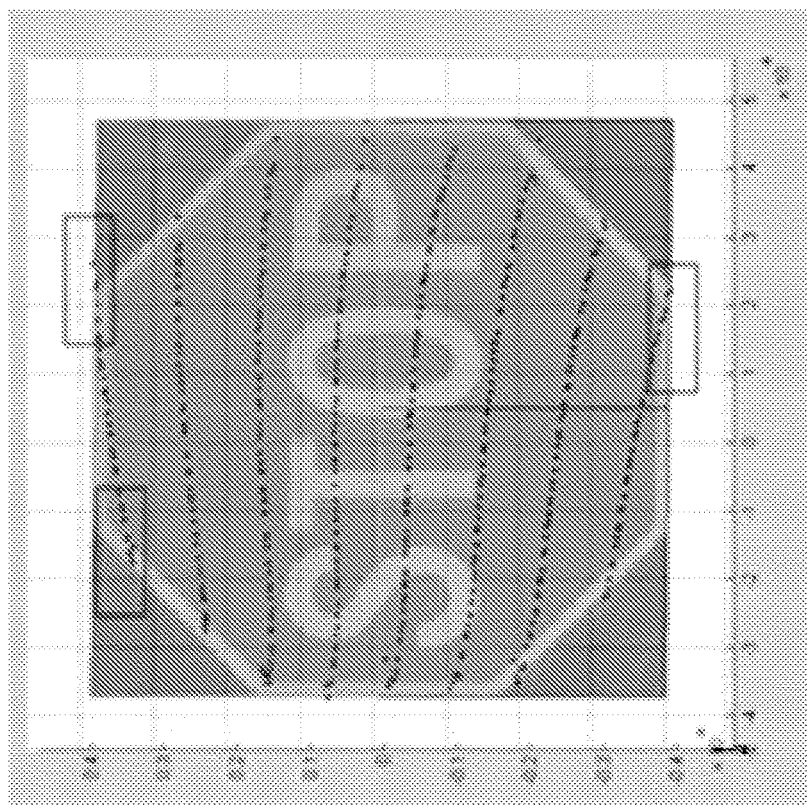

According to some embodiments, both the ECEF coordinates of an object computed from the LiDAR measurements and the transformation equation described above can be used to associate each LiDAR point with an image pixel (x,y). Generally, the registration or association between the LiDAR points and image will be reliable given accurate camera calibration and measurements of the offsets and poses among different sensors (i.e., mobile LiDAR, cameras, IMU and GPS). However, in some cases, there can be instances in which some points can be falsely computed from the sensor. FIG. 21 shows an example embodiment of such a LiDAR measurement error. Generally, many of these error points can occur at the edge of traffic signs due to the partial reflection of the laser beam. According to some embodiments, the retro-intensity values within such error points can be significantly smaller than the typical point reflected from the traffic sign surface. Although these points can be registered with image pixels that are associated with the detected traffic signs, in an embodiment the retro-intensity values within these abnormal points can be excluded from a subsequent condition assessment of the retroreflectivity of the traffic sign.

Accordingly, in some embodiments a co-planarity validation process can be used to eliminate these abnormal points. For example, in some embodiments, for each traffic sign associated LiDAR point cloud, principle component analysis (PCA)-based traffic sign surface plane estimation can first be conducted to regenerate the traffic sign surface. According to some embodiments, the following equations can be used for PCA computation for the optimal normal of the given data, i.e. each traffic sign associated LiDAR point cloud. The solution can be obtained from the three eigenvectors. In some embodiments, the eigenvalues can represent the three axes of the point cloud, while the eigenvalues can denote the square sum of points deviating along the corresponding axis. Thus, according to some embodiments, the eigenvector corresponding to the smallest eigenvalue can be the normal direction of the best-fit plane.

$$C = \frac{1}{k}\sum_{i=1}^{k}(p_i - \bar{p})\cdot(p_i - \bar{p})^T, C\cdot\vec{v}_j = \lambda_j\cdot\vec{v}_j, j \in \{0, 1, 2\} \quad (32)$$

where k is the number of points in the point cloud $p_i$, $\bar{p}$ is the centroid of the cluster, $\lambda_j$ is the j-th eigenvalue of the covariance matrix C and $\vec{v}_j$ is the j-th eigenvector.

According to some embodiments, the PCA approach can utilize all the data within the cloud for plane estimation, including the "abnormal points." Thus, in some embodiments, the "abnormal points" can still impact the surface estimation results. In some embodiments, the robust estimation approach proposed by Daniels, et al. (2007) can be used to minimize the impact of the "abnormal points" on the final surface estimation results. In some embodiments, after the first estimation using PCA, the distances from the points to the initial plane can be computed. In some embodiments, if a distance is within 2 times of the standard deviation, the point can maintain its weight. Otherwise, it can be assigned a lower weight for recalculating the optimal plane. According to some embodiments, the following equation can be used to determine the weights:

$$\omega = \begin{cases} 1 & \text{where } |V| \leq 2\sigma \\ e^{-c\cdot V^2} & \text{where } |V| > 2\sigma \end{cases} \quad (33)$$

Where V is the residual for each point, c is a constant for calibration, and p is the weight of each point that will be contributing to the optimal plane. According to some embodiments, c=100. In some embodiments, an optimal plane using PCA and the adjusted weights can be derived using a robust estimation approach. In some embodiments, all of the points with a distance that is greater than 2 cm from the derived plane, i.e. the LiDAR ranging measurement precision, from the regressed surface can be rejected from the subsequent condition assessment steps.

Traffic Sign-Associated LiDAR Point Extraction

Figure 22B:
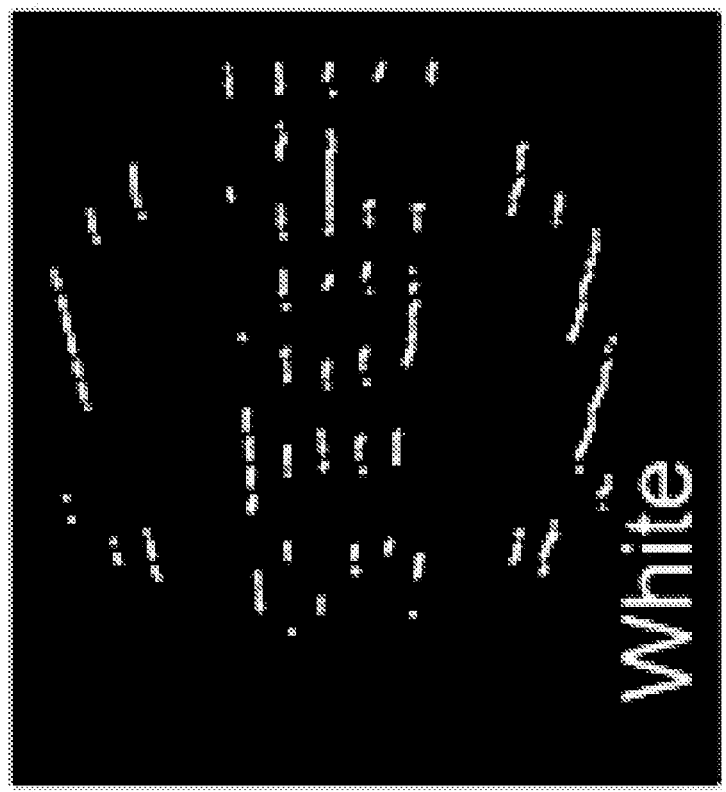
FIGS. 22A-B are images of the result of a stop sign after sign associated LiDAR point cloud retrieval.
Figure 22A:
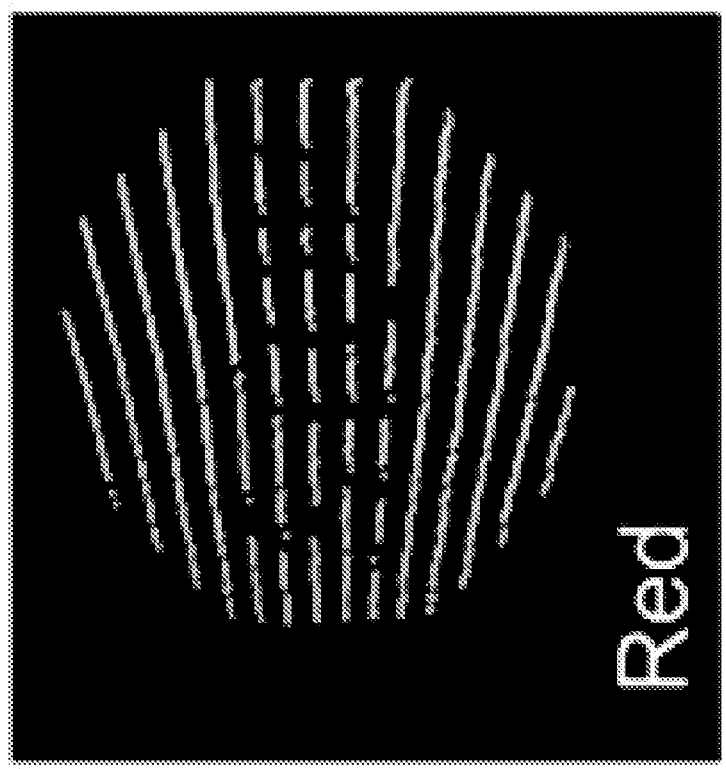

As previously discussed, according to various embodiments of the disclosure, LiDAR points can be associated with traffic sign detection results. In some embodiments, after establishing the registration between the LiDAR point cloud and video log of traffic sign images, the traffic sign-associated LiDAR points can be identified and indexed with different traffic sign colors by inputting the traffic sign detection results from video log images from the previously described steps of automatic traffic sign detection and traffic sign color segmentation (i.e., image coordinates for the traffic sign bounding box). According to some embodiments, each detected ROI can be associated with a population of LiDAR points. Within each ROI, each pixel (x,y) can be segmented as one traffic sign color. For example, for a stop sign, the pixels can be segmented as red and white. In some embodiments, the population of LiDAR points can be further indexed based on the corresponding segmentation color. For example, FIG. 22A-B shows an exemplary embodiment of a stop sign wherein the LiDAR points have been indexed based on the corresponding segmentation color. In this case, the LiDAR points associated with red portions of the stop sign have been separated into a first group or color cluster and the LiDAR points associated with the white portions of the stop sign have been separated into a second group or color cluster. According to embodiments of the present disclosure, after the LiDAR points have been separated into one or more color clusters, the retroreflectivity condition of color cluster can be separately assessed. However, according to some embodiments, it can first be necessary to normalize the LiDAR retro-intensity values for each color cluster before the retroreflectivity condition of the sign can be accurately assessed.

LiDAR Retro-Intensity Value Normalization

According to some embodiments, it can be desirable to normalize the LiDAR retro-intensity values in order to establish the relationship between the raw retro-intensity values obtained by the LiDAR system and key data collection factors that can impact the retro-intensity values. Normalizing the LiDAR retro-intensity values can allow for a more consistency and/or accuracy in the retroreflectivity condition assessment performed in subsequent steps. The LiDAR beam distance and the LiDAR incidence angle are two factors that can impact the retro-intensity values, and thus, in some embodiments these factors can be desirable to normalize. These factors are described in more detail in Voegtle & Wakaluk (2009).

LiDAR Retro-Intensity Normalization Models

Various attributes can impact the LiDAR retro-intensity, such as beam distance, incidence angle, atmosphere distortion, and surface structure. In the field of mobile LiDAR application (e.g., traffic sign retroreflectivity condition assessment), factors such as atmospheric distortion and surface structure can have minimal impact on retro-intensity, and thus in some embodiments, only the beam distance and incidence angle can be taken into account.

Studies on airborne LiDAR sensors, (e.g. Kamermann (1993) and Pfeifer et al. (2007)) have introduced a general energy receiving model for laser scanning systems:

$$I_A = IR^a e^{2bR} \cos^c(\vartheta) e^d \quad (34)$$

where I is the measured intensity, and R is the distance between the sensor and the object $\vartheta$, the incidence angle and a, b, c, d are constant parameters to be calibrated. The exponent 2bR can concern the attenuation by the two way propagation of the laser beam. The term c can model the type of reflectivity and d can normalize the whole value to be 1. In some embodiments of mobile LiDAR, the atmosphere attenuation can be ignorable, and thus the equation can be further simplified as follows:

$$I_A = IR^a \cos^c(\vartheta) e^d \tag{35}$$

In some embodiments, the classic light illumination model using an empirical Phong surface model (including ambient light, diffused reflection light, and specular reflection light) can be incorporated in the general formula:

$$I_A = I_a k_a + I_{in}[k_d \cos(\vartheta) + k_s \cos^n(\theta)] \tag{36}$$

Some embodiments can use the light illumination model described in Foley et al. (1995). In some embodiments, for retroreflective material, the specular reflection angle can always be zero, as the incidence beam can always be parallel to the reflecting beam. In some embodiments, the ambient lighting can be ignored (LiDAR operates in the near-infrared spectrum) and considering $k_a + k_d + k_s = 1$, the equation can be simplified as $$I_A = IR^a / [(1 - k_s) \cos(\vartheta) + k_s] \tag{37}$$

In some embodiments of the present disclosure, for the LiDAR retro-intensity value, which is the ratio between the emitted energy from the sensor and the received energy reflected from the surface, the retro-intensity value from mobile LiDAR can be be modeled as $$\rho = I / I_A = [(1 - k_s(\vartheta)) \cos(\vartheta) + k_s(\vartheta)] \cdot R^{-a} = f(\vartheta) \cdot g(R) \tag{38}$$

where $$f(\vartheta) = (1 - k_s(\vartheta)) \cos(\vartheta) + k_s(\vartheta) \text{ and } g(R) = R^{-a} \tag{39}$$

In some embodiments, depending on different traffic sign sheeting material, the specular light can be a function of incidence angles, i.e. $k_s(\vartheta)$. Such a function can require calibration to determine the detailed values at each incidence angle. According to some embodiments, the specular function can be a second order function with respect to the incidence angle.

Figure 23B:
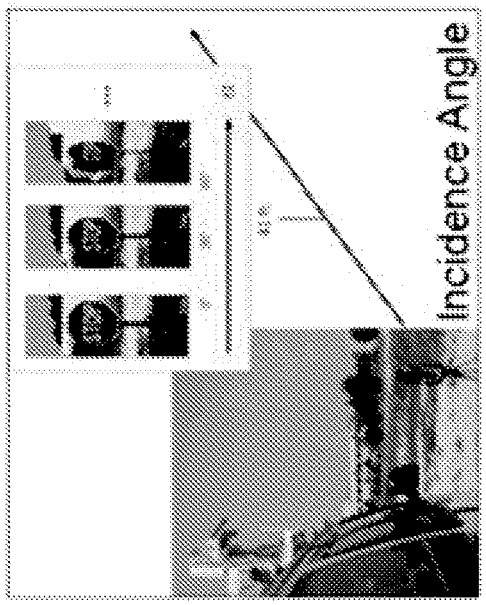
FIG. 23B is a diagram showing images of a stop sign at various angles of incidence, and the calibration curve for retro-intensity measurements made by a LiDAR unit in accordance with an embodiment.
Figure 23B:
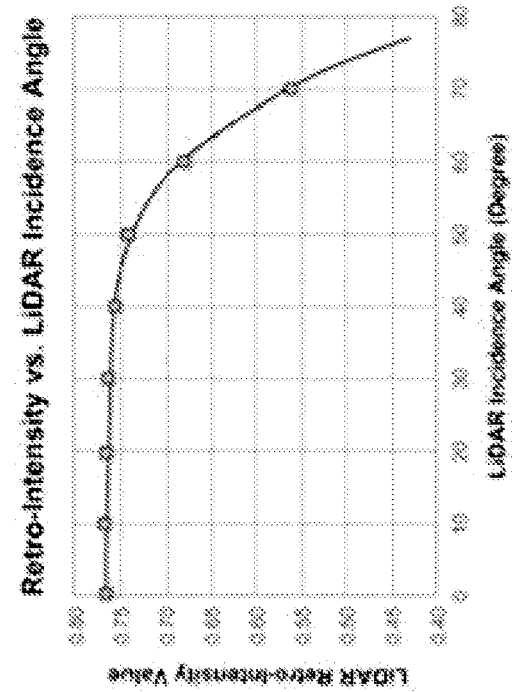
Figure 23A:
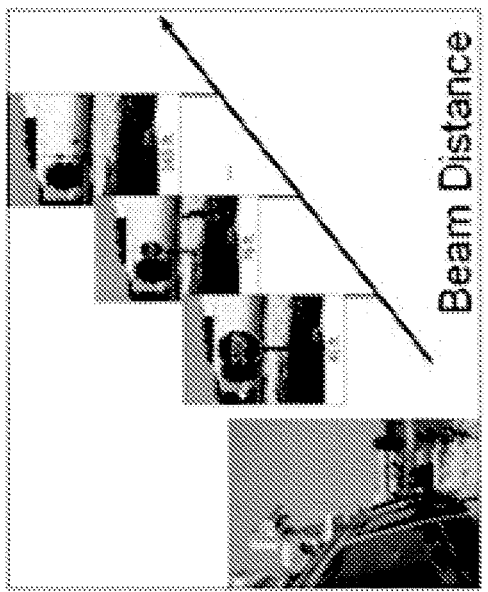
FIG. 23A is a diagram showing images of a stop sign at various distances, and the calibration curve for retro-intensity measurements made by a LiDAR unit in accordance with an embodiment.
Figure 23A:
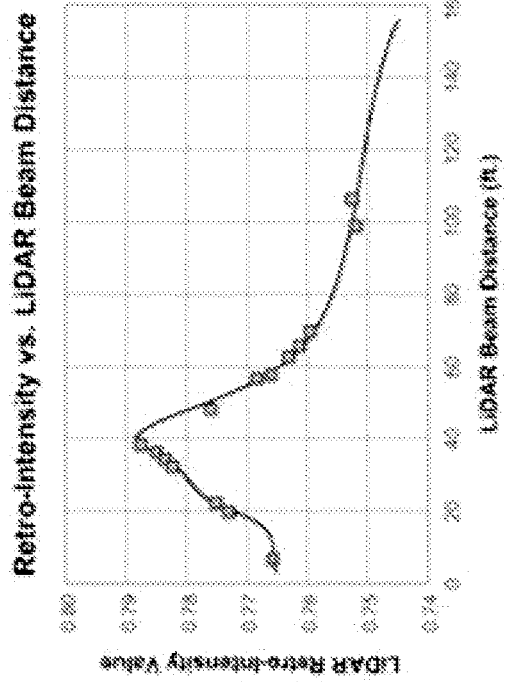

In various embodiments, the relationship between the retro-intensity, the beam distance, and the incidence angle by calibrating function $k_s(\vartheta)$, can be obtained in lab tests. For example, FIG. 23A, shows a beam distance test where the position of the testing traffic sign was manually changed to simulate different beam distances, while the LiDAR sensor was stationary and adjusted at a fixed orientation. FIG. 23B shows an incidence angle test where the orientation of the tested traffic sign was manually rotated from 0° to 80°, and the LiDAR sensor was stationary and adjusted at the fixed beam distance. As shown in FIGS. 23A-B, the collected LiDAR data can be processed to obtain the retro-intensity relationships as functions of the beam distance and of the incidence angle.

Figure 24:
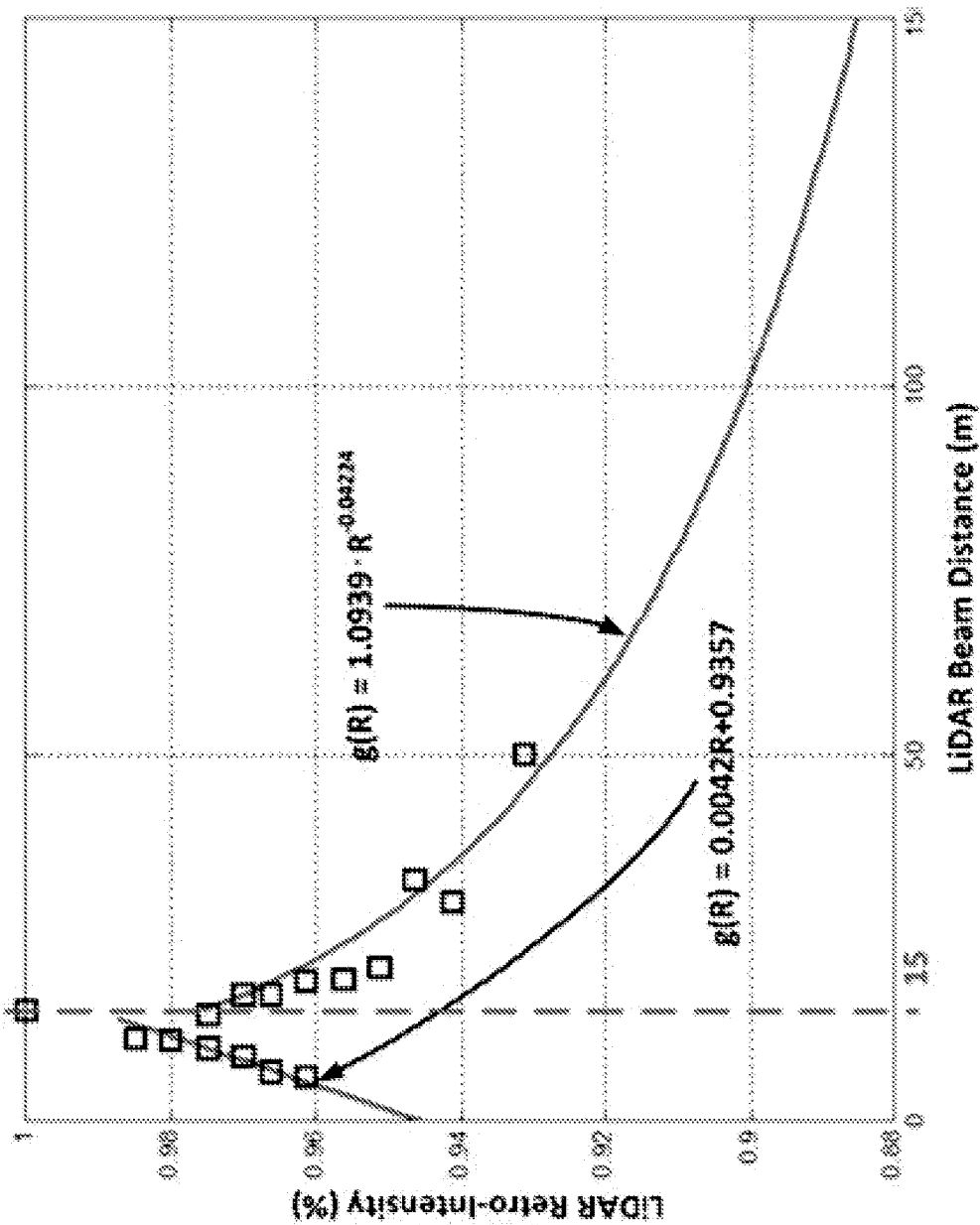
FIG. 24 is a graph showing the relationship between LiDAR retro-intensity and beam distance.

In this example, for beam distance, by fitting the collected data to the exponential model with respect to the beam distance, it can be seen that the data points with beam distances greater than 15 m (approx. 50 ft.) fit the exponential model very well, while the points with beam distances less than 15 m fit the exponential model poorly. Further investigation identified that the specific model used for the field test (i.e. RIEGL LMS-Q120i) contains a range-dependent amplification of the laser signal when the range is smaller than 15 m. Therefore, the beam distance model for the specific LiDAR model is modified based on the internal configuration. FIG. 24 shows the regression results for the relationship between the LiDAR retro-intensity and the beam distance of the example shown in FIG. 23A. In this example, g(R) can be expressed as:

$$g(R) = \begin{cases} 1.0939 \cdot R^{-0.04224} & \text{when } R > 15 \\ 0.0042R + 0.9357 & \text{when } R \leq 15 \end{cases} \tag{40}$$

Figure 25A:
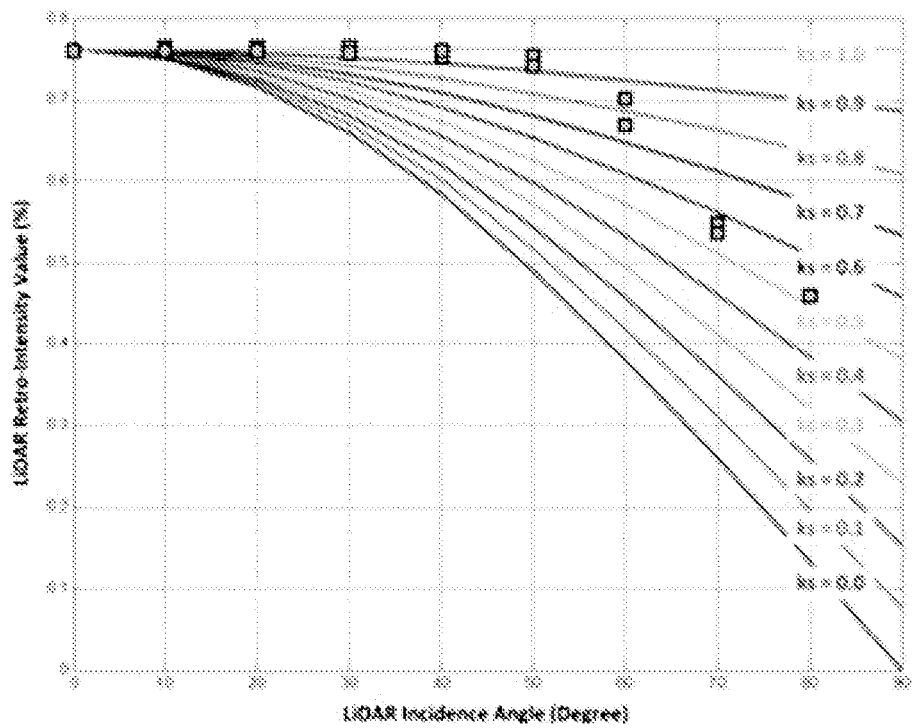
FIG. 25A is a graph showing the relationship between retro-intensity and incidence angle.
Figure 25B:
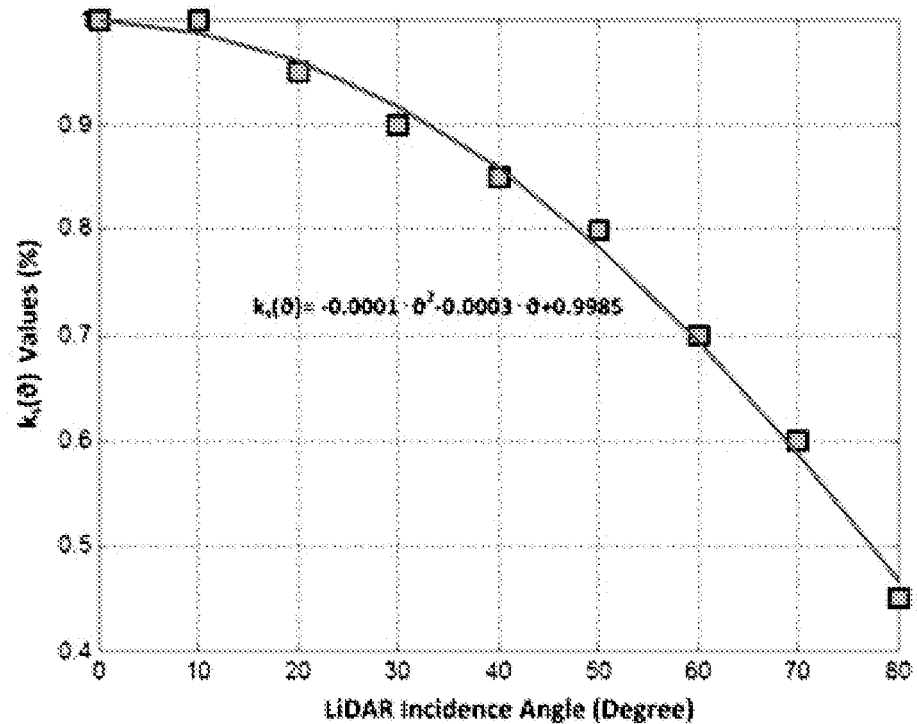
FIG. 25B is a graph showing the relationship between $k_s(\theta)$ and incidence angle.

For incidence angle, different $k_s$ values can be tested to better fit the $k_s(\vartheta)$ with the observed retro-intensity values in response to a different incidence angle. FIG. 25A shows an illustration of different $k_s$ values and the observed retro-intensity values from an exemplary test. FIG. 25A shows the $k_s$ value in response to a different incidence angle. By using a second order polynomial regression, the function of $k_s(\vartheta) = -0.0001 \cdot \vartheta^2 - 0.0003 \cdot \vartheta + 0.9985$ can be derived. Therefore, according to some embodiments, the incidence angle model can be represented as:

$$f(\vartheta) = (0.0015 - 0.0001 \cdot \vartheta^2 + 0.0003 \cdot \vartheta)$$
$$\cos(\vartheta) - 0.0001 \cdot \vartheta^2 - 0.0003 \cdot \vartheta + 0.9985 \tag{41}$$

In some embodiments, the normalization function can be derived by combining the model established for the beam distance and the incidence angle. The raw retro-intensity values acquired by the LiDAR system can be normalized using the generated retro-intensity normalization. In the example embodiment described above, the curves can be generated using Type 1 sheeting. However, it should be understood that different sheeting types and different LiDAR models can introduce different retro-intensity relationships than the relationships shown in this example. Thus, it can be desirable to generate additional curves for various different types of sheeting and LiDAR models. It should be understood that the numbers, curves, and graphs described herein represent examples of one or more embodiments of the present disclosure, but are not intended to limit the disclosure in any way.

Figure 26:
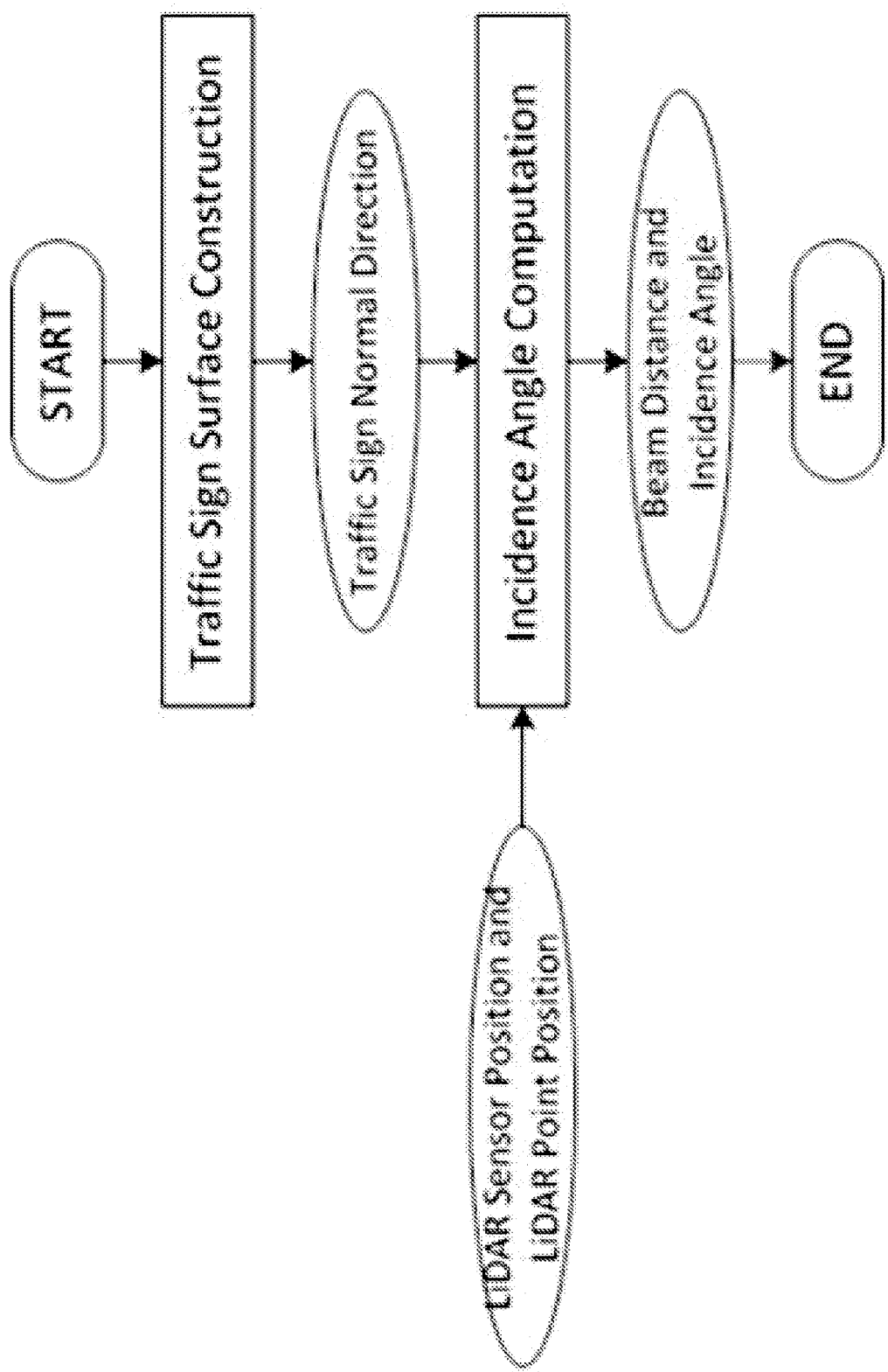
FIG. 26 is a flow chart illustrating a method for determining LiDAR point beam distance and incidence angle in accordance with an embodiment.

Beam Distance and Incidence Angle Computation for Sign Associated LiDAR Point Cloud According to various embodiments, to conduct the LiDAR retro-intensity value normalization, the beam distance and incidence angle for each LiDAR point can be obtained. FIG. 26 shows an exemplary embodiment of a method for obtaining the beam distance and incidence angle for one or more LiDAR points.

In some embodiments, based on the results of the traffic sign-associated LiDAR point extraction described above, the LiDAR point cloud that is associated with each detected traffic sign can be extracted. According to some embodiments, using the LiDAR point cloud, the normal direction of the corresponding traffic sign surface can be obtained using the PCA method in the ECEF reference system, as previously described above. In some embodiments, the LiDAR sensor position and the position for each LiDAR point within the corresponding point cloud can be obtained based on the processes previously described above. Accordingly, in some embodiments, the direction of each laser beam can be obtained in the ECEF reference system. Thus, in some embodiments, the incidence angle of the each LiDAR point can be obtained using the following equation:

$$\alpha = \arccos\left(\frac{\langle \vec{p}, \vec{n} \rangle}{\|\vec{p}\| \|\vec{n}\|}\right) \tag{42}$$

where $\vec{p}$ is the direction of the laser beam, $\vec{n}$ is the normal direction of the traffic sign surface, and $\langle \vec{p}, \vec{n} \rangle$ is the product of the two direction vector. In some embodiments, the beam distance can be directly read from the LiDAR point data. According to some embodiments, the obtained beam distance and incidence angle, the retro-intensity value corresponding to this LiDAR point can be normalized using the normalization equation derived from above.

Traffic Sign Retroreflectivity Condition Assessment

In various embodiments, the retroreflectivity condition of a traffic sign can be assessed based on the population of the normalized retro-intensity values (obtained as described above) for each color of a detected traffic sign. According to some embodiments, a model that represents the relationship between the retroreflectivity values measured using a retroreflectometer and the normalized retro-intensity values can be utilized in determining the retroreflectivity condition of a traffic sign based on the measured retro-intensity values.

Figure 27:
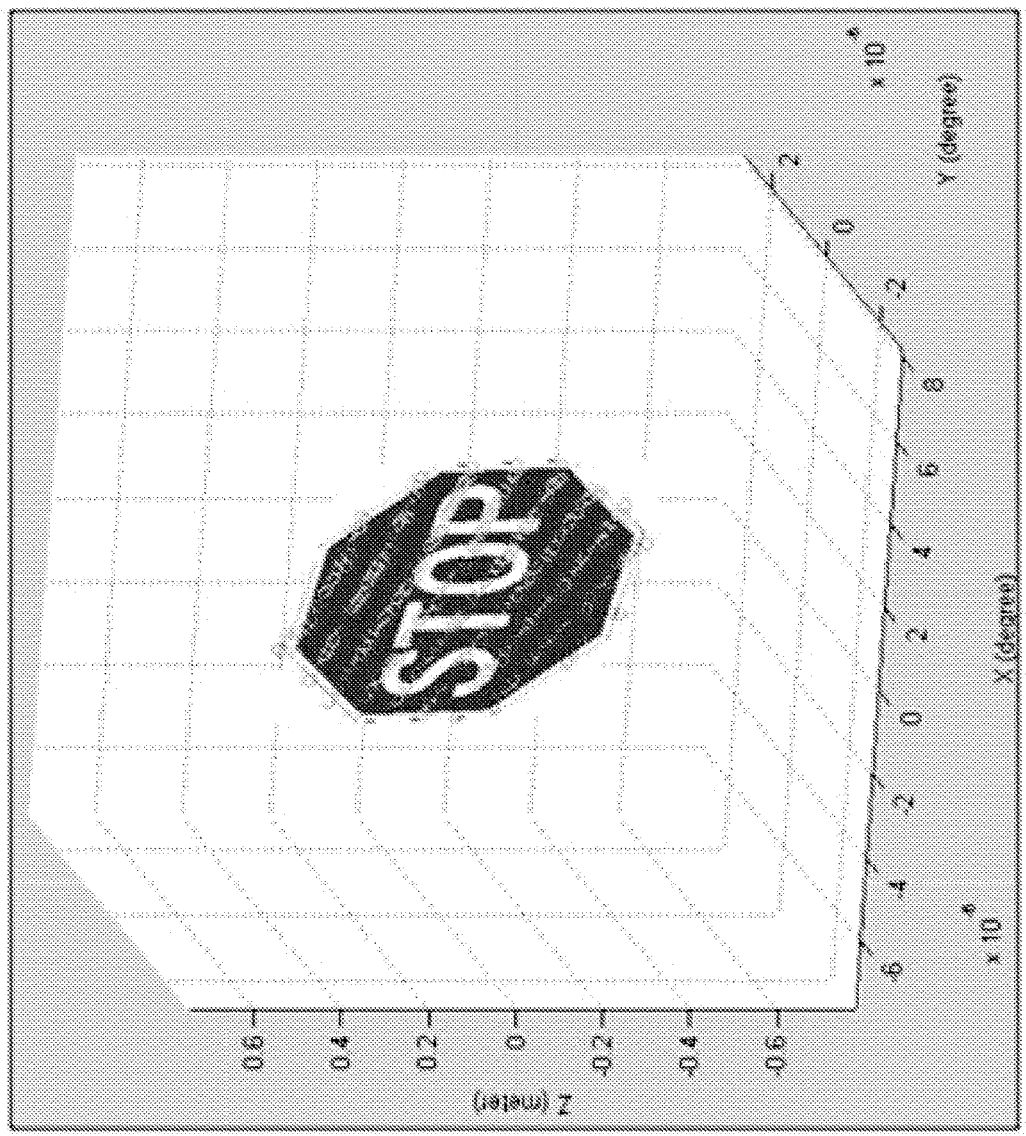
FIG. 27 depicts the result of registration of the LiDAR points on the traffic sign by a method in accordance with an embodiment.

In some embodiments, a model can be used that was developed by, for example, measuring both red and white colors in 15 Type 1 engineer grade stop signs with various retroreflectivity conditions (e.g., 5 brand new signs and 10 different in-service signs). For example, the LiDAR point clouds for each traffic sign can be collected using a mobile LiDAR system, such as a sensing van. As described above, based on the registration results, the location of each LiDAR point can be projected on to the traffic sign surface. For example, FIG. 27 shows an example of a registration result of LiDAR points on a traffic sign in 3D space. According to some embodiments of the method, at each LiDAR point location, the corresponding handheld retroreflectometer measurement can be taken. In some embodiments, at each such location, three measurements can be taken using the retroreflectometer, and the average of the three measurements can be used to represent the retroreflectivity of each point.

Figure 28:
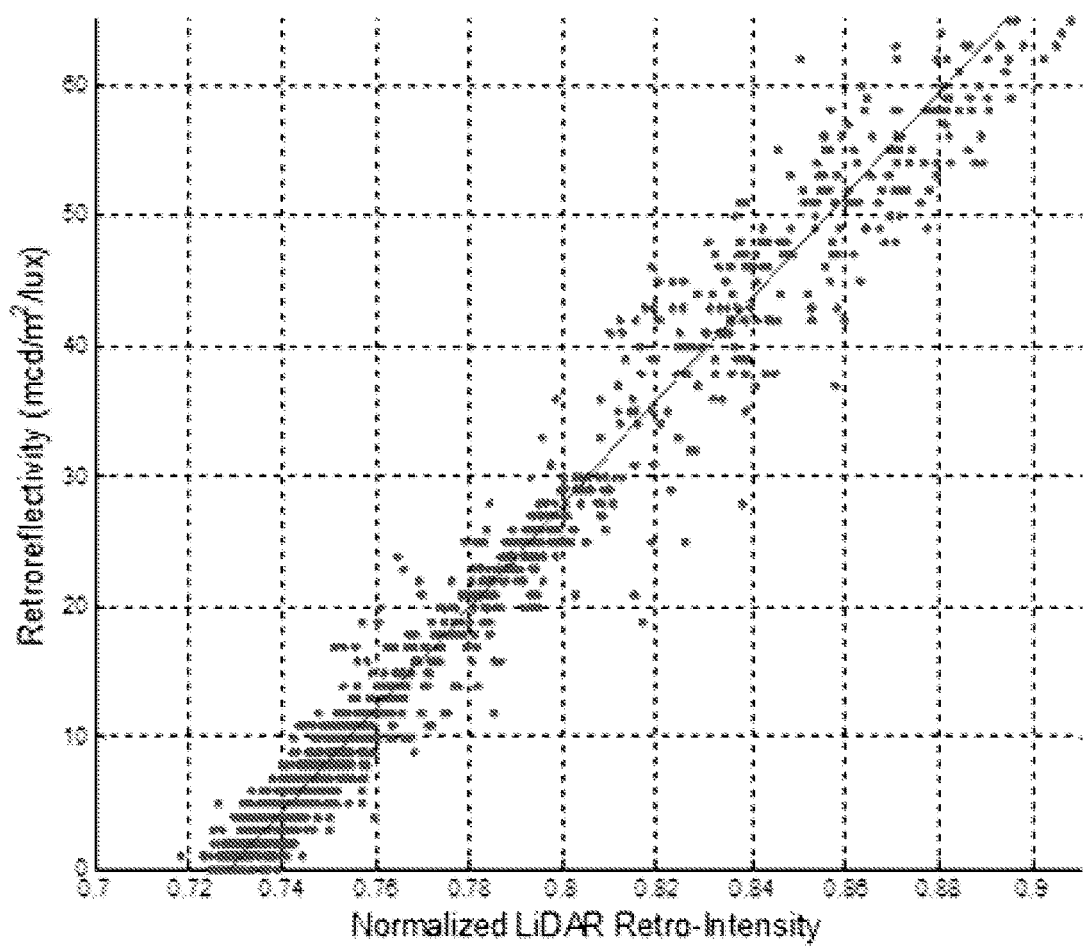
FIG. 28 is a graph showing the Correlation between the retroreflectivity and the normalized retro-intensity.

According to some embodiments, there can be a thousand or more pairs of measurements taken for each traffic sign in order to establish a correlation between the normalized retro-intensity values and the retroreflectivity values. For example, in the example data set shown in FIG. 27, the retroreflectivity values ranged between 0 mcd/m$^2$/lux and 64 mcd/m$^2$/lux, while the retroreflectivity of the typical Type 1 engineer grade sheeting is between 0 mcd/m$^2$/lux and 70 mcd/m$^2$/lux. FIG. 28 shows the correlation between the retroreflectivity and the normalized retro-intensity of this example, where the dots represent the actual paired measurements, and the line represents a linear regression of the measurements. In this specific example, the regression results can be derived from the following equation:

$$\text{Retroreflectivity}_{EST} = -285.9 + 392.3 \times \text{RetroIntensity}_{NORM} \quad (43)$$

According to some embodiments, using the linear regression equation, each normalized retro-intensity value can be estimated as the corresponding retroreflectivity value. Thus, in some embodiments, for each traffic sign, the population of the normalized retro-intensity values measured from the LiDAR can be translated into the population of the retroreflectivity values. This population of retroreflectivity values can be used to determine the retroreflectivity condition of the traffic sign. In some embodiments, the median value of the population of the estimated retroreflectivity can be used to represent the whole population (i.e. the tested color). This can eliminate the bias of any outliers and allow for a more consistent comparison. In some cases, it can be possible for the median of the estimated retroreflectivity values to be below zero following the regression result, which may not represent the true values. Thus, in some embodiments, for all the medians of the estimated retroreflectivity values that are below zero, zero values are assigned. In some embodiments, by comparing the estimated retroreflectivity of the whole population with the requirements defined in the MUTCD for different colors, "FAIL" and "PASS" conditions can be determined. In some embodiments, PASS/FAIL can be determined on a color by color basis. In some embodiments, a PASS/FAIL condition can be determined for the sign as a whole.

It should be understood that the examples provided herein to explain the methods of the disclosure are merely examples and different normalization curves, and correlation curves between the normalized LiDAR retro-intensity values and the measured retroreflectivity values can be utilized. In particular, these curves can change based on the specific LiDAR model being used (e.g., Riegl LMS-Q120i) and the type of material of the sign (e.g., Type 1 engineer grade sheeting). As such, different LiDAR models and different studied materials can introduce completely different correlations. However, the methods provided herein can be applied by one of skill in the art to a variety of different models and materials.

Experimental Results for the Proposed Traffic Sign Identification Method

A set of experimental tests was conducted to validate several methods in accordance with embodiments of the disclosed technology for traffic sign detection and traffic sign retroreflectivity condition assessment. For each method, both the individual algorithms and the complete methodology were tested using both lab and field tests.

In an experimental test for an enhanced traffic sign detection methodology, two focused tests were conducted to validate the performance of the color segmentation step and the shape detection step individually. Sample datasets were designed to include challenging cases for the two algorithms to explore the improvement of some embodiments over existing systems. Then, a general test was conducted using containing five datasets with different road functions, data collection sources, and data qualities to comprehensively validate the overall performance of a sign detection and retroreflectivity condition assessment in accordance with an embodiment.

A test was conducted to evaluate the accuracy of a lighting dependent statistical color model (LD-SCM)-based color segmentation algorithm in accordance with an embodiment. The testing dataset was collected on I-285 and SR-275 and included different lighting conditions, e.g. over-exposure, under-exposure, normal exposure, and adverse lighting conditions. To acquire these lighting conditions, different driving directions, times of the day, and weather conditions were considered. Overall, 890 signs containing eight different colors were manually extracted, and the corresponding pixels extracted from traffic signs under different lighting conditions were manually marked with the corresponding Manual of Uniform Traffic Control Devices (MUTCD) colors as the ground truth. More than 8 million pixels were collected for this focused test.

The result of the proposed LD-SCM-based color segmentation algorithm was compared with an existing color segmentation algorithm as disclosed in Tsai (2009). The pixels were processed by the existing color segmentation algorithm and the proposed LD-SCM-based color segmentation algorithm. The confusion matrices are shown in Table 1 and Table 2.

TABLE 1

CONFUSION MATRIX FOR THE
COLOR SEGMENTATION RESULTS
USING THE LD-SCM ALGORITHM

|        | White  | Black  | Green  | Blue   |
|--------|--------|--------|--------|--------|
| White  | 0.7676 | 0.1455 | 0.0003 | 0.0000 |
| Black  | 0.0878 | 0.6207 | 0.0703 | 0.0040 |
| Green  | 0.0143 | 0.1391 | 0.6128 | 0.1707 |
| Blue   | 0.0327 | 0.1505 | 0.1531 | 0.6633 |
| Red    | 0.0985 | 0.0855 | 0.0000 | 0.0000 |
| Yellow | 0.0419 | 0.0947 | 0.0030 | 0.0000 |
| Orange | 0.0007 | 0.0396 | 0.0000 | 0.0000 |
| FYG    | 0.0206 | 0.0534 | 0.0100 | 0.0003 |

|        | Red    | Yellow | Orange | FYG    |
|--------|--------|--------|--------|--------|
| White  | 0.0080 | 0.0780 | 0.0006 | 0.0000 |
| Black  | 0.0924 | 0.1082 | 0.0142 | 0.0024 |
| Green  | 0.0004 | 0.0023 | 0.0007 | 0.0597 |
| Blue   | 0.0000 | 0.0000 | 0.0000 | 0.0004 |
| Red    | 0.7084 | 0.0182 | 0.0884 | 0.0010 |
| Yellow | 0.0064 | 0.7601 | 0.0757 | 0.0182 |
| Orange | 0.1062 | 0.1542 | 0.6893 | 0.0100 |
| FYG    | 0.0081 | 0.0414 | 0.0021 | 0.8641 |

TABLE 2

CONFUSION MATRIX FOR THE
COLOR SEGMENTATION RESULTS
USING THE LD-SCM ALGORITHM

|        | White  | Black  | Green  | Blue   |
|--------|--------|--------|--------|--------|
| White  | 0.9611 | 0.0136 | 0.0060 | 0.0014 |
| Black  | 0.0109 | 0.8245 | 0.0046 | 0.0071 |
| Green  | 0.0118 | 0.0266 | 0.9491 | 0.0125 |
| Blue   | 0.0071 | 0.0400 | 0.0024 | 0.9502 |
| Red    | 0.0434 | 0.0405 | 0.0001 | 0.0006 |
| Yellow | 0.0096 | 0.0341 | 0.0001 | 0.0078 |
| Orange | 0.0000 | 0.0102 | 0.0000 | 0.0000 |
| FYG    | 0.0015 | 0.0039 | 0.0057 | 0.0053 |

|        | Red    | Yellow | Orange | FYG    |
|--------|--------|--------|--------|--------|
| White  | 0.0084 | 0.0043 | 0.0052 | 0.0000 |
| Black  | 0.0501 | 0.0906 | 0.0082 | 0.0040 |
| Green  | 0.0000 | 0.0000 | 0.0000 | 0.0000 |
| Blue   | 0.0000 | 0.0000 | 0.0000 | 0.0003 |
| Red    | 0.9007 | 0.0076 | 0.0071 | 0.0000 |
| Yellow | 0.0123 | 0.9118 | 0.0238 | 0.0005 |
| Orange | 0.0647 | 0.0648 | 0.8603 | 0.0000 |
| FYG    | 0.0000 | 0.0088 | 0.0089 | 0.9659 |

By comparing the results from both algorithms, it can be observed that the tested LD-SCM-based color segmentation algorithm dramatically improves the performance of the existing algorithm by reducing the color confusion caused by the distortion of different lighting conditions in several ways.

First, the algorithm limits distortion caused by under-exposure or adverse lighting conditions. In the existing color segmentation algorithm, 14.55% of the white pixels, 13.91% of the green pixels, and 15.05% of the blue pixels are falsely segmented as black pixels. By identifying these lighting conditions and applying the new LD-SCM, only 1.36% of the white pixels, 2.66% of the green pixels and 4% of the blue pixels are still falsely segmented as black pixels.

Second, the algorithm limits distortion caused by over-exposure condition. In the existing color segmentation algorithm, 8.78% of the black pixels and 9.85% of the red pixels are falsely segmented as white pixels. By identifying such lighting condition and applying the new LD-SCM, only 1.09% of the black pixels and 4.34% of the red pixels are still falsely segmented as white pixels (highlighted in blue in Table 5-1 and Table 5-2).

Third, the algorithm limits distortion caused by under-exposure or over-exposure conditions. In the existing color segmentation algorithm, more than 15% of the blue and the green pixels are confused with each other, while more than 25% of the orange pixels are confused with each red or yellow. By identifying these lighting conditions and applying the new LD-SCM, less than 2% of the blue or green pixels are confused with each other, and less than 13% of the orange pixels are falsely segmented as red or yellow pixels.

A test was conducted to evaluate the performance of an ordinary/partial differential equation (ODE/PDE)-based shape detection algorithm in accordance with an embodiment with discontinuous image boundaries in cluttered backgrounds. Twenty-six images with cluttered backgrounds and discontinuous boundary problems were tested by simultaneously running both the active contour and active polygon algorithms. These images could not be detected previously using the sign detection system as described by Tsai (2009) and led to large numbers of false negatives.

Figure 29A:
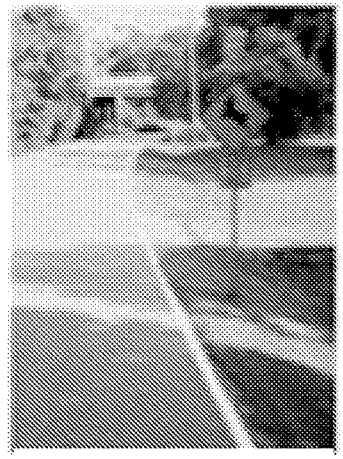
FIG. 29A is an original video log image.
Figure 29B:
FIG. 29B is the image of FIG. 29A after color segmentation
Figure 29C:
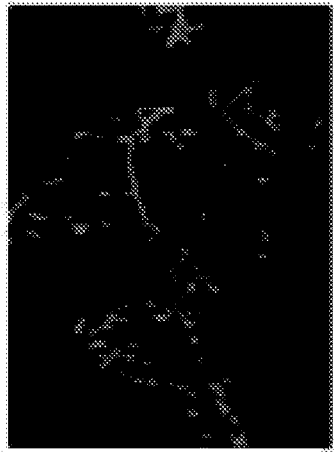
FIG. 29C is an image showing an extracted contour using a prior art system.
Figure 29D:
FIG. 29D is a detection result using an existing system, showing no sign detected.
Figure 29E:
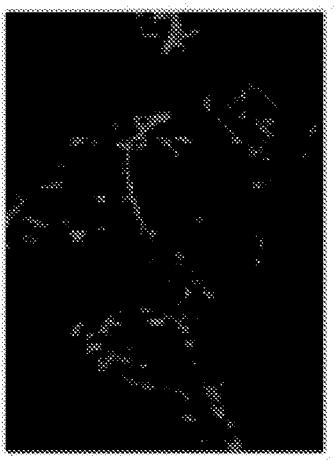
FIG. 29E is an image showing an extracted contour using an active contour algorithm in accordance with an embodiment.
Figure 29F:
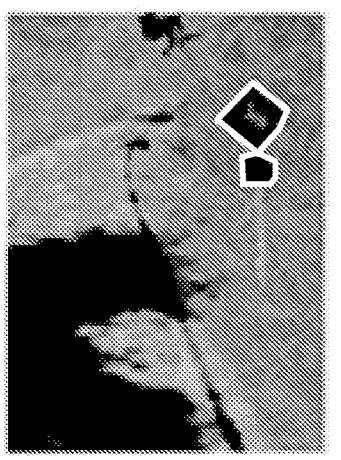
FIG. 29F is an image showing a detection result using an active contour algorithm in accordance with an embodiment.

For the active contour algorithm in accordance with an embodiment, of the 26 images, 24 images were correctly detected by the proposed active contour. FIG. 29A-F shows an example of the results. FIG. 29A shows the original image, FIG. 29B shows the color-segmented image, FIG. 29C shows the extracted contour using existing system, FIG. 29D shows the polygon detection result using the existing system, FIG. 29E shows the extracted contour using the proposed active contour algorithm, and FIG. 29F shows the polygon detection result using the enhanced system with active contour algorithm incorporated.

Figure 30A:
FIG. 30A depicts a video-log image, and a false-negative result of an active contour algorithm in accordance with an embodiment.
Figure 30A:
Figure 30B:
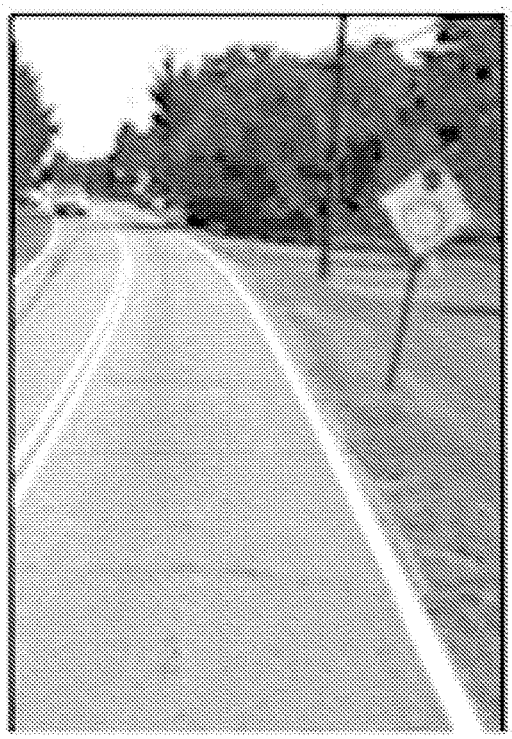
FIG. 30B depicts a video-log image, and a false-negative result of an active contour algorithm in accordance with an embodiment.
Figure 30B:
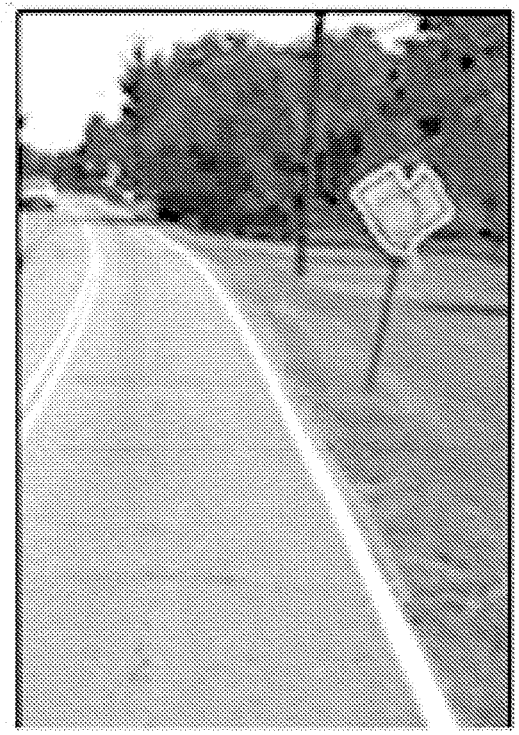

The tested active contour algorithm performs well in detecting traffic signs that have discontinuous boundary problems, although there are two cases in which some embodiments of the active contour algorithm may not detect signs correctly. FIG. 30A-B shows two cases that cannot be detected correctly using some embodiments of the active contour algorithm. In FIG. 30A, the original image has a similar foreground and background in the color space, which causes undistinguished color segmentation. When the proposed active contour algorithm is applied in that area, the contour region expands unwillingly. FIG. 30B shows that the proposed active contour algorithm extracts the traffic sign boundary, except the upper portion because the contour evolves into part of the legend area. This occurs because, after the color segmentation, the upper portion of the boundary is decomposed as a different color from the rest of the boundary.

Figure 31:
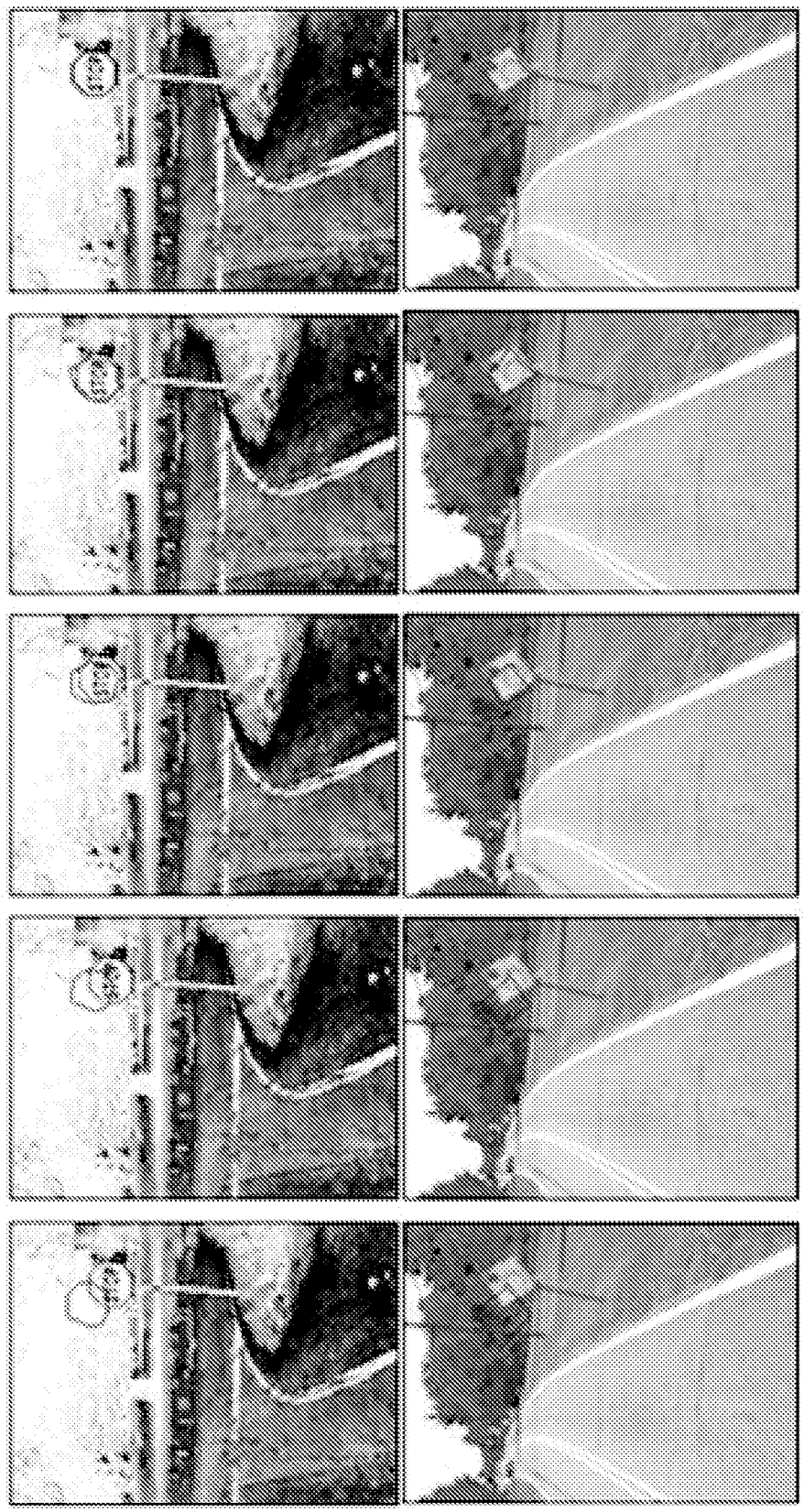
FIG. 31 depicts an evolution process and detection result for the false negative cases of FIGS. 30A and 30B as detected by an active polygon detection algorithm in accordance with an embodiment.

The tested active polygon algorithm in accordance with an embodiment correctly detected all 26 images, including the two cases that could not be detected by the active contour algorithm, as shown in FIG. 31. The results of testing both the proposed active contour algorithm and the active polygon algorithm show that the active polygon algorithm can perform well at detecting traffic signs with discontinuous boundaries. In addition, by constraining the movement only by limited number of vertices, the proposed active polygon algorithm can perform approximately twice as fast as the proposed active contour algorithm. Further, both the tested active contour and active polygon algorithms out-perform existing shape detection algorithm in detecting traffic signs containing discontinuous boundaries in cluttered backgrounds. Considering the performance and the processing speed, the active polygon-based shape detection algorithm was integrated into the final detection methodology.

The objective of the general test is to comprehensively evaluate the performance of the complete methodology by integrating the individual enhanced algorithms. Datasets for the general test were first designed and collected, followed by comprehensive testing of the complete methodology.

In the process of testing dataset selection, an effort was made to cover different aspects that could comprehensively validate the performance of the complete methodology. Table 3 shows the detailed information for the selected datasets.

Three different roadway function levels were included to cover different sign types and visual conditions, i.e. interstate, state routes, and local roads in both rural and urban areas. Three different data sources were included to cover different image qualities and configurations, i.e. Louisiana Department of Transportation and Development (LaDOTD), the city of Nashville, and the sensing van at Georgia Tech. Two identified challenging cases are included to fully assess the performance of the developed algorithm: changing lighting conditions and a cluttered background with discontinuous boundaries.

TABLE 3

LIST OF THE SELECTED DATASETS FOR GENERAL TESTING

| # | Source | Location | Image | Sign |
|---|--------|----------|-------|------|
| 1 | LaDOTD | SR-541, Westwego, LA | 1547 | 303 |
| 2 | City of Nashville | Cane Ridge Rd, Nashville, TN | 607 | 133 |
| 3 | Sensing Van | 37th Street, Savannah, GA | 933 | 475 |
| 4 | Sensing Van | SR-67, Statesboro, GA | 2216 | 392 |
| 5 | Sensing Van | I-95, Savannah, GA | 5623 | 875 |

Figure 32:
FIG. 32 is a video log image from the LaDOTD dataset.

The dataset from LaDOTD contains 1547 images collected on SR-541, Westwego, La. (LA). In the 1547 images, there are 1244 negative images (i.e. without traffic signs) and 303 positive images (i.e. with traffic signs of different sizes, colors, shapes, and conditions). As provided by LaDOTD, the image quality is very good with a resolution of 1920× 1080. The data was pre-processed by Roadware Corp, which was the contractor for the data collection. Therefore, most of the lighting condition issues had been already eliminated by the pre-processing. FIG. 32 shows a sample image in this dataset.

Figure 33:
FIG. 33 is a video log image from the Nashville dataset.

The dataset from the city of Nashville contains 607 images collected on Cane Ridge Road, Nashville, Tenn. In the 607 images, there are 474 negative images and 133 positive images. As provided by the city of Nashville, the image quality is reasonable with a resolution of 1300×1030. FIG. 33 shows a sample image in this dataset.

Figure 34:
FIG. 34 is a video log image from the 37$^{th}$ Street (Savannah, Ga.) dataset.

The dataset from 37$^{th}$ Street, Savannah, Ga., contains 933 images. In the 933 images, there are 458 negative images and 475 positive images. Because they were collected by the sensing van developed at Georgia Tech, the image quality is very good, with a resolution of 2448×2048. FIG. 34 shows a sample image in the dataset. This dataset is designed to incorporate the challenging cases of a severely cluttered background.

Figure 35:
FIG. 35 is a video log image from the SR-67 dataset.

The dataset from SR-67 contains 2216 images collected on SR-67, in Statesboro, Ga. In the 2216 images, there are 1824 negative images and 392 positive images. Using the Georgia Tech sensing vehicle, the data quality and resolution are similar for the data collected on 37$^{th}$ Street. FIG. 35 shows a sample image in the dataset. This dataset is designed to incorporate the challenging case of changing lighting conditions.

Figure 36:
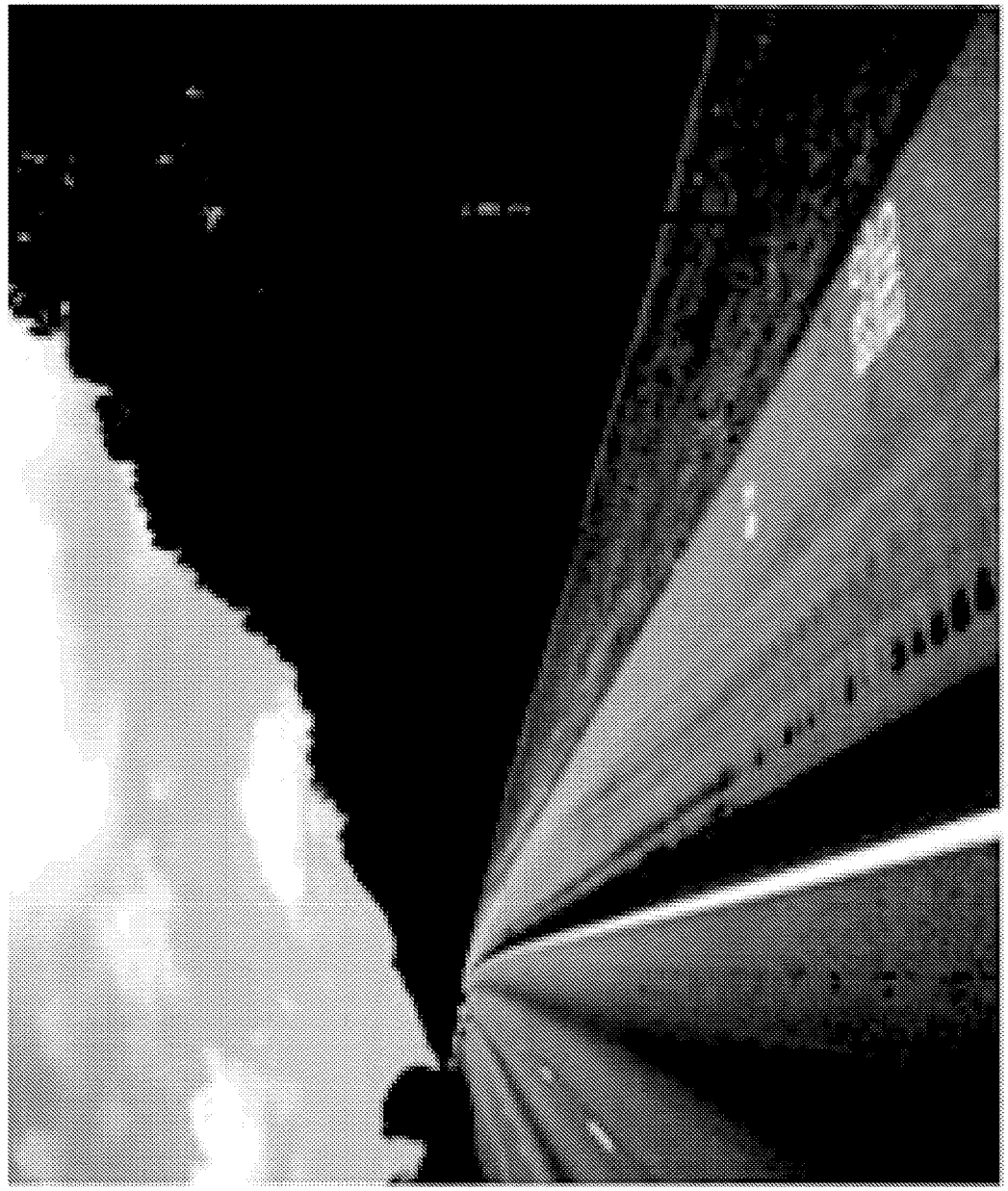
FIG. 36 is a video log image from the I-95 dataset.

The dataset from I-95 contains 5623 images collected on I-95 in Savannah, Ga. In the 5623 images, there are 4748 negative images and 875 positive images. Using the Georgia Tech sensing vehicle, the data quality and resolution are similar to the data collected on 37$^{th}$ Street. FIG. 36 shows a sample image in the dataset.

Tables 4A-E shows the overall detection results of the five selected datasets. In general, the results show that the enhanced algorithm, compared with the existing algorithm (Tsai et al., 2009), can reduce the false negative rates by 12.2%. The results also show that the enhanced algorithm, compared with the existing algorithm (Tsai et al., 2009), increases the false positive rate by only 1.7%. The detailed analysis for each individual dataset is discussed below based on the breakdown in Tables 4A-E.

TABLE 4A

OVERALL RESULTS OF ALL DATA SETS

| | True Positive | True Negative | False Positive | False Negative |
|---|---|---|---|---|
| Existing algorithm | 72.8% (1586/2178) | 87.1% (7618/8748) | 12.9% (1130/8748) | 27.2% (592/2178) |
| Enhanced algorithm | 85.0% (1852/2178) | 85.4% (7472/8748) | 14.6% (1276/8748) | 15.0% (326/2178) |

TABLE 4B

DETECTION RESULTS FROM THE LADOTD DATA SET

| | True Positive | True Negative | False Positive | False Negative |
|---|---|---|---|---|
| Existing algorithm | 82.2% (249/303) | 89.5% (1113/1244) | 10.5% (131/1244) | 17.8% (54/303) |
| Enhanced algorithm | 91.7% (278/303) | 87.9% (1094/1244) | 12.1% (150/1244) | 8.3% (25/303) |

TABLE 4C

DETECTION RESULTS FROM THE CITY OF NASHVILLE DATA SET

| | True Positive | True Negative | False Positive | False Negative |
|---|---|---|---|---|
| Existing algorithm | 78.9% (105/133) | 88.8% (421/474) | 11.2% (53/474) | 21.1% (28/133) |
| Enhanced algorithm | 88.0% (117/133) | 87.6% (415/474) | 12.4% (59/474) | 12.0% (16/133) |

TABLE 4D

DETECTION RESULTS FROM THE 37$^{TH}$ STREET DATA SET

| | True Positive | True Negative | False Positive | False Negative |
|---|---|---|---|---|
| Existing algorithm | 53.9% (256/475) | 68.1% (312/458) | 31.9% (146/458) | 46.1% (219/475) |
| Enhanced algorithm | 72.0% (342/475) | 72.9% (334/458) | 27.1% (124/458) | 28.0% (127/475) |

TABLE 4E

DETECTION RESULTS FROM THE SR-67 DATA SET

|  | True Positive | True Negative | False Positive | False Negative |
|---|---|---|---|---|
| Existing algorithm | 70.9% (278/392) | 84.1% (1534/1824) | 15.9% (290/1824) | 29.1% (58/392) |
| Enhanced algorithm | 85.7% (336/392) | 83.7% (1527/1824) | 16.3% (297/1824) | 14.3% (/392) |

TABLE 4F

DETECTION RESULTS FROM THE 1-95 DATA SET

|  | True Positive | True Negative | False Positive | False Negative |
|---|---|---|---|---|
| Existing algorithm | 79.8% (698/875) | 89.3% (4238/4748) | 10.7% (510/4748) | 20.2% (177/875) |
| Enhanced algorithm | 89.0% (779/875) | 86.4% (4102/4748) | 13.6% (646/4748) | 11.0% (125/875) |

Figure 37B:
FIG. 37B is a video log image.
Figure 37A:
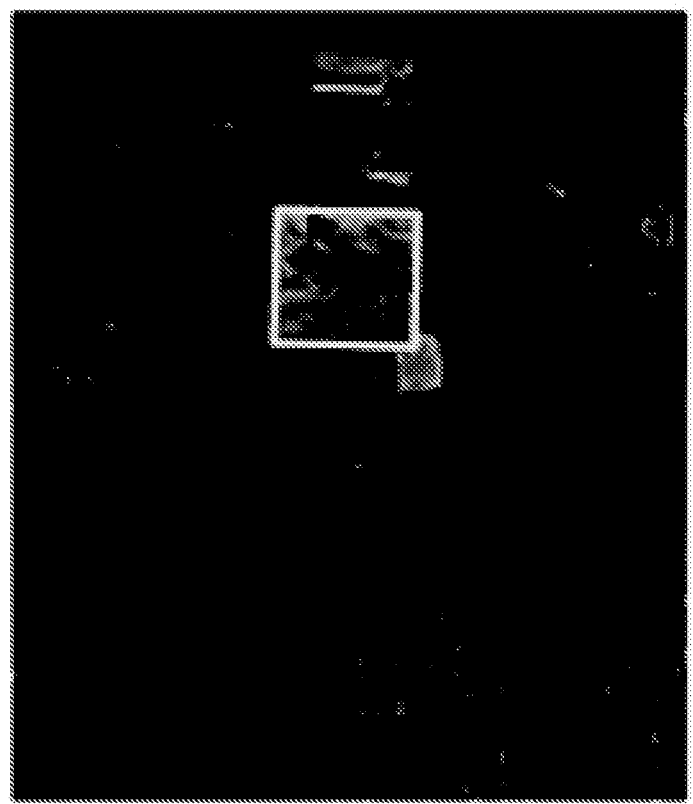
FIG. 37A is the color-segmented image of FIG. 37B that could not be detected with prior art detection systems.

The enhanced algorithm improves the most for the $37^{th}$ Street dataset in terms of reducing the false negative rate. The existing algorithm can only detect 53.9% of the signs in the $37^{th}$ Street dataset due to the discontinuous boundaries produced by the severely cluttered backgrounds, while some embodiments of the present algorithm can detect 72.0% of the signs correctly. The newly detected signs contain discontinuous boundaries produced by the tree shadows and complex backgrounds. The edge-based shape detection method in the existing algorithm produces excessive false edges within and across the boundaries of the traffic signs. Therefore, the shape approximated in the subsequent step fails to formulate a complete sign shape. On the contrary, the some embodiments of the active polygon method in the enhanced algorithm are region-based methods that dictates the average intensity changes in and out of the polygon region. Therefore, as the false edges contribute minimal changes to the average intensity, the proposed method is immune to such discontinuous boundaries. FIG. 37 shows an example that could not be detected using the existing method.

Figures 38A, 38B, 38C:
FIG. 38A is a video log image of a "Road Work Ahead" sign.
FIG. 38B is a color-segmentation result using a prior-art method.
FIG. 38C is a color-segmentation result using a lighting-dependent statistical color model in accordance with an embodiment.

The enhanced algorithm improves the SR-67 dataset, which contains lighting condition issues (i.e. adverse lighting), the most. The existing algorithm can only detect 70.9% of the signs in the dataset due to the lighting condition issues, while the enhanced algorithm can detect 85.7% of the signs. Most of the newly detected signs are in the adverse lighting condition. The existing color model tends to cluster all the dark pixels as black pixels, regardless of the subtle color information in these dark pixels. On the contrary, the new color models in the enhanced system classify different lighting conditions first and then cluster the colors within each lighting condition category. Therefore, the subtle difference in the dark pixels can be dictated more precisely. FIG. 38A-C shows an example of the segmentation results.

The enhanced algorithm can consistently improve the performance of the existing algorithm on the datasets containing different roadway function levels (i.e. different sign types and visual conditions) and data collection sources (i.e. different data qualities, resolutions, etc.). Within the selected datasets, there are more than 200 types of signs with nine shapes, eight colors, and with different visual conditions. The enhanced algorithm reduces the false negative rate in the existing algorithm by 9.0% to 18.1%. The enhanced algorithm demonstrates slightly better results on the LaDOTD dataset because of a pre-processing conducted by Roadware Corp. Further performance improvement is expected if similar pre-processing steps are applied to the rest of the datasets.

Figure 39B:
FIGS. 39A-B illustrate false positive shapes detected by a prior art method.
Figure 39A:

The enhanced algorithm does not excessively increase the false positive rate and effectively reduces the false negative rate. In some cases, the false positive rate can be reduced by the enhanced algorithm, e.g. the $37^{th}$ Street dataset. In the $37^{th}$ Street dataset, the existing algorithm falsely detected many tree shadows as traffic signs. The shape approximation step of the existing algorithm assembles the detected contours into shapes based on the extracted edges. Since many false edges were produced by the spotty tree shadows, many false shapes were formulated. FIG. 39A-B shows an example of the false shapes detected using the existing method. On the contrary, the proposed algorithm uses the generalized Hough transform (GHT) algorithm to identify the shapes. Although the edge information is still used, the neighboring edges are considered as a whole based on the shape template rather than individually, and then they are ranked by a global accumulator. Therefore, the false edges that are not associated with the polygons initialized by the GHT algorithm do not impact the final result.

From the test results on the selected datasets, the methodology demonstrates, overall, good capability to detect traffic signs under variant conditions while also showing strong capabilities to detect traffic signs that were challenging to the algorithm of Tsai et al. (2009). However, there are still some false negative cases and false positive cases that are produced by the enhanced algorithm, which can be improved by further research. Three types of false negative cases were identified in the test using the enhanced algorithm, including severe casting shadow, occlusion, and several specific signs.

Figure 40A:
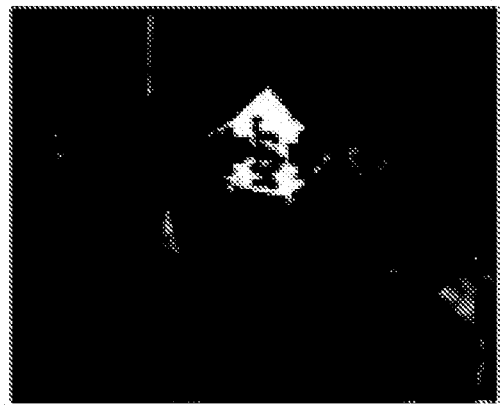
FIGS. 40A-D illustrate false negative shapes not detected by some methods in accordance with an embodiment caused by severe shadow casting.
Figure 40B:
Figure 40C:
Figure 40D:
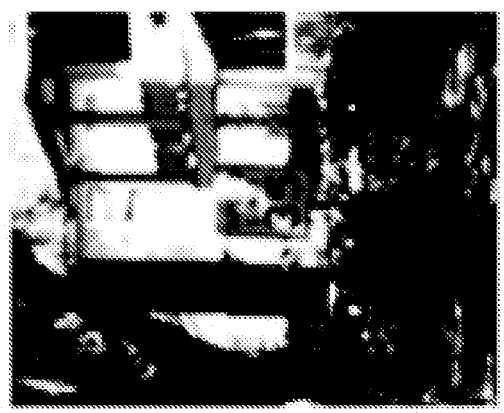
Figure 41D:
FIGS. 41A-D illustrate false negative shapes not detected by some methods in accordance with an embodiment caused by sign occlusion.
Figure 41C:
Figure 41B:
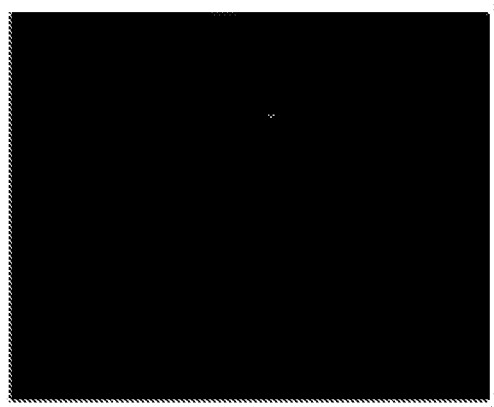
Figure 41A:
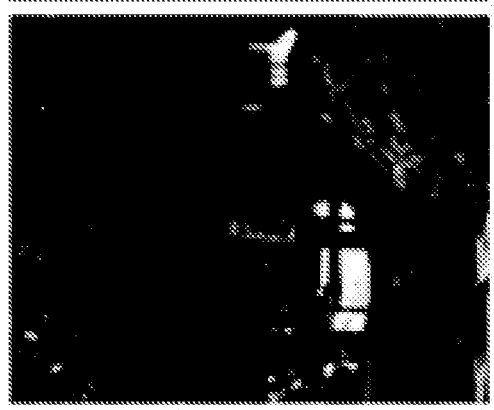
Figure 42D:
FIGS. 42A-D illustrate false negative shapes not detected by some methods in accordance with an embodiment caused by specific types of signs.
Figure 42C:
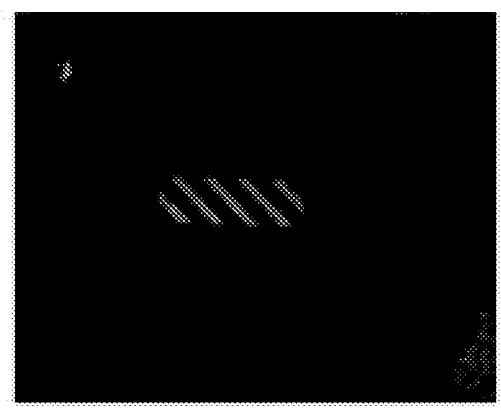
Figure 42B:
Figure 42A:
Figure 43C:
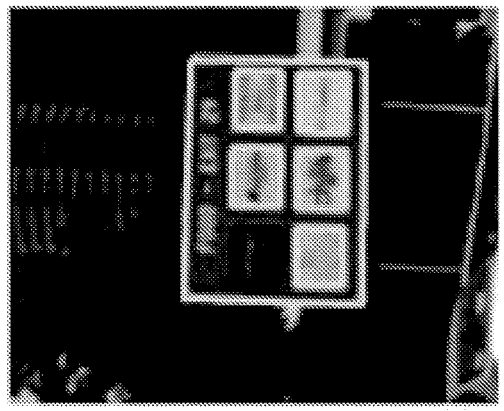
FIGS. 43A-F illustrate false positive shapes detected by some methods in accordance with an embodiment.
Figure 43F:
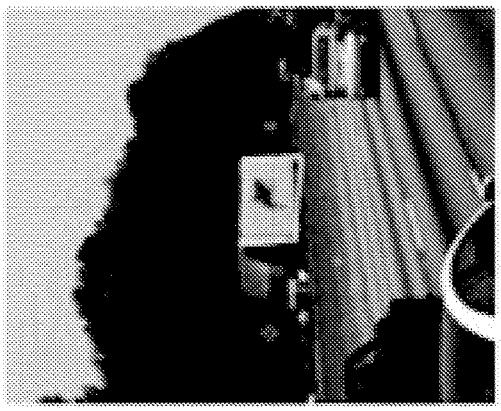
Figure 43B:
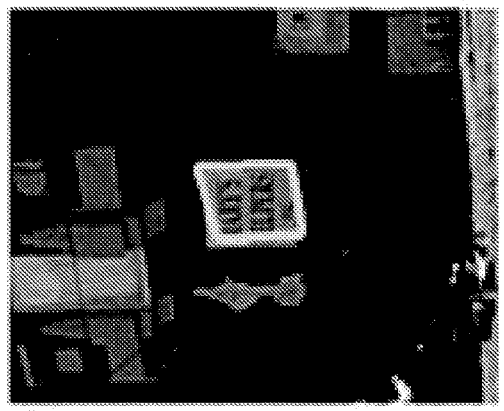
Figure 43E:
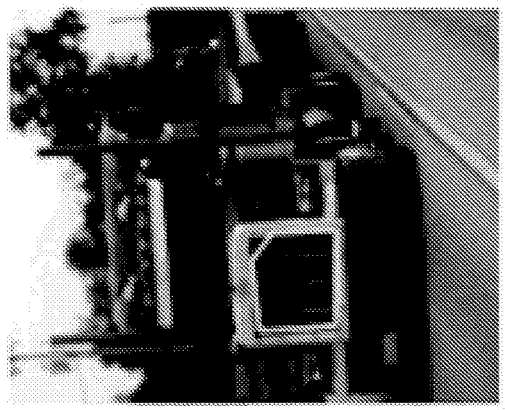
Figure 43A:
Figure 43D:
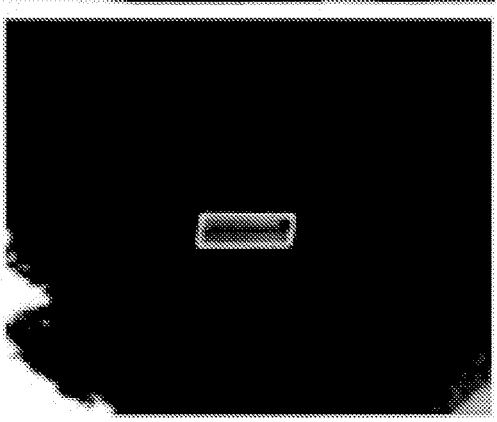

As shown in Figure FIG. 40A-C, casting shadows distort the color in part of the sign surface, which destroys the integrity of the sign in the color segmentation result. The broken pieces will be hard to be detected even using the enhanced algorithm. A severe casting shadow issue is identified as the most frequent false negative case through the experimental test. There are 56.7% of the false negative cases identified in the experimental test are due to this issue. This type of false negative case can be reduced by introducing the fuzzy color segmentation approach. Using the fuzzy logic, each pixel can be assigned with multiple MUTCD-defined colors instead of a single color according to the likelihood. By assigning multiple colors to each pixel, the color fragments broken by the casting shadows can be reunited as a complete traffic sign shape when one of the colors assigned to the fragment matches another fragment.

As shown in FIG. 41A-D, like the casting shadow cases, the integrity of the sign is destroyed by the obstruction. The unique color and shape patterns of the traffic sign will not be maintained. There are 26.5% of the false negative cases identified in the experimental test are due to this issue. This type of false negative case can be reduced by relaxing the shape constraints used in the proposed generalized Hough transform (GHT). By relaxing the shape constraints, part of the occluded sign shape can still be identified. However, the relaxation can introduce more false positive cases because more irregular shapes might still be qualified as sign shape candidates. When the occlusion is so severe that almost all of the important information for a sign is diminished, it becomes extremely hard to detect it using any advanced algorithm.

As shown in FIG. 42A-D, the no-parking sign and the object marker sign are the two types of specific signs that are frequently undetected. For the no-parking sign, the complex legend segments the sign into tiny blocks (i.e. the no-parking signs are the smallest type of signs), which can be very easily merged into background after the segmentation. For the object marker signs, the yellow-black pattern of this type of sign fragments the sign into different color blocks, and there is no clear boundary by which the sign can be defined. There are 12.1% of the false negative cases identified in the experimental test are due to this issue. These cases can be potentially minimized by applying a shape-merging algorithm to combine the individual pieces into a regular sign shape, or directly introducing specific traffic sign recognition algorithms to recognize the unique pictogram of the signs.

Several types of false positive cases are identified in the test using the methodology in accordance with some embodiments, including house windows, commercial signs, the back of signs, vehicle parts, etc. The color features and shape features are used in the methodology, in accordance with some embodiments. However, sometimes these two features are not sufficient for traffic signs to be distinguished from other objects, as there are many other objects sharing characteristics similar to the traffic signs in terms of color and shape. FIG. 43A-F shows some of the examples of the identified false positive cases. Some of the false positive cases can be rejected by identifying their locations if GPS data is available during the data collection, e.g. on the pavement, etc. By integrating different traffic sign features for each detected traffic sign candidate, e.g. color, shape, location, etc., a confidence score can be designed to represent the quality of the detection. Therefore, the false positive cases can be systematically reduced by determining a robust confidence level.

Experimental Results for the Proposed Traffic Sign Retroreflectivity Condition Assessment Method In the experimental tests, for traffic sign retroreflectivity condition assessment methods in accordance with an embodiment, a lab test with a controlled environment was first conducted to study the fundamental characteristics of light detection and ranging (LiDAR) retro-intensity measurement, including the repeatability of consecutive scans, the impact of ambient lighting, and the impact of beam distance and incidence angle. Then, field testing containing 35 Type 1 engineer grade stop signs was conducted to validate the overall performance of the proposed methodology and evaluate the feasibility of its application in state departments of transportation's (DOTs') practices. The dataset was purposely selected to include the most important traffic sign type that is related to roadway safety, and the most important traffic sign sheeting type that is the most frequent failed traffic sheeting type in service due to the retroreflectivity condition.

This section presents laboratory tests conducted in a controlled environment to study the key characteristics of the LiDAR retro-intensity measurement. These key characteristics are closely related to the feasibility of applying LiDAR retro-intensity values for traffic sign condition assessment. Repeatability of the retro-intensity measurement, the impact of ambient lighting conditions, and the impact of LiDAR beam distance and incidence angle are studied through the three designed lab tests.

Figure 44:
FIG. 44 illustrates an experimental apparatus to test repeatability of some embodiments with Type 1 sheeting.

To conduct traffic sign condition assessment with consistent results, it is important to validate the repeatability of the retro-intensity measurement on the same retro-reflective objects. Only when the measurement is consistent through successive LiDAR scans (having minimal variance) is it feasible to use LiDAR for consistent retroreflectivity condition assessment. A blank white traffic sign sample with brand new, Type 1 engineer grade sheeting was used for the test. The sample was attached to a static platform 2 ft. from the road edge, as shown in FIG. 44, while the LiDAR device was stationary at a 41 ft. distance from the surface of the sample. To study the repeatability of continuous scans and the repeatability of different scans, two scenarios were created in the test: 1) continuous scanning for ten minutes, using the first scan at the beginning of each minute for repeatability assessment; 2) discretely triggering one scan at the beginning of each minute for ten minutes with the LiDAR device remaining idle between consecutive triggers.

Table 5 shows the repeatability under the two designed scenarios. It can be observed that both the continuous scanning and discrete triggering scenarios showed good repeatability, i.e. standard deviation of the measurement among ten scans is smaller than 0.0003. As discussed in the section 4.2.4, the standard deviation of 0.0003 can potentially introduce less than $\pm 0.1$ mcd/m$^2$/lux, which is ignorable in the process of sign retroreflectivity condition assessment.

TABLE 5

REPEATABILITY RESULTS USING TWO DESIGNED SCENARIOS

| Minute # | Scenario 1 | Scenario 2 |
|---|---|---|
| 1 | 0.78304 | 0.78315 |
| 2 | 0.78250 | 0.78277 |
| 3 | 0.78305 | 0.78280 |
| 4 | 0.78296 | 0.78274 |
| 5 | 0.78321 | 0.78224 |
| 6 | 0.78296 | 0.78252 |
| 7 | 0.78262 | 0.78278 |
| 8 | 0.78263 | 0.78300 |
| 9 | 0.78253 | 0.78265 |
| 10 | 0.78297 | 0.78254 |
| Std. Dev. | 0.00025 | 0.00026 |

Figure 45B:
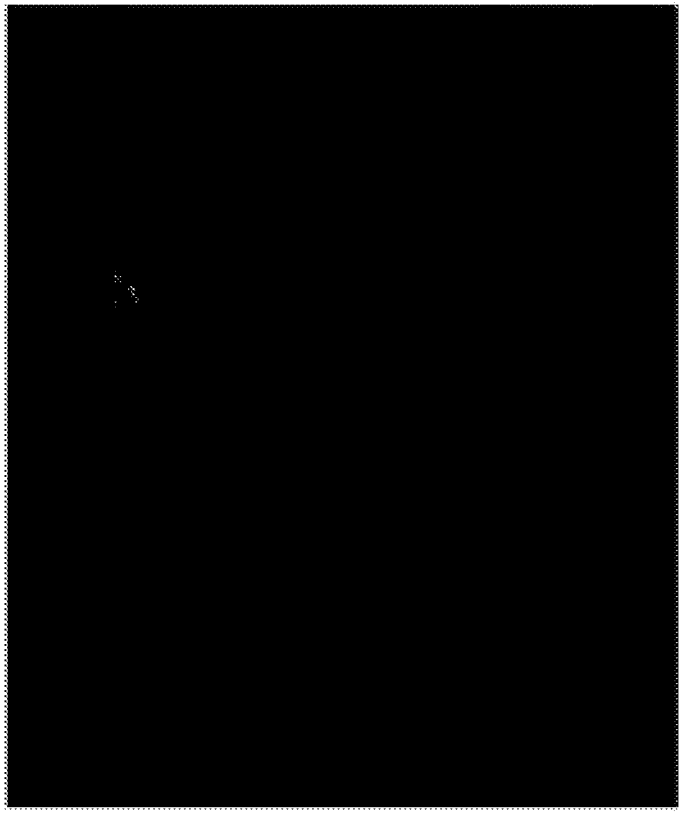
FIG. 45B depicts the experimental apparatus to test the effect of ambient lighting on some embodiments in a low lighting condition.
Figure 45A:
FIG. 45A depicts an experimental apparatus to test the effect of ambient lighting on some embodiments in a high lighting condition.
Figure 46:
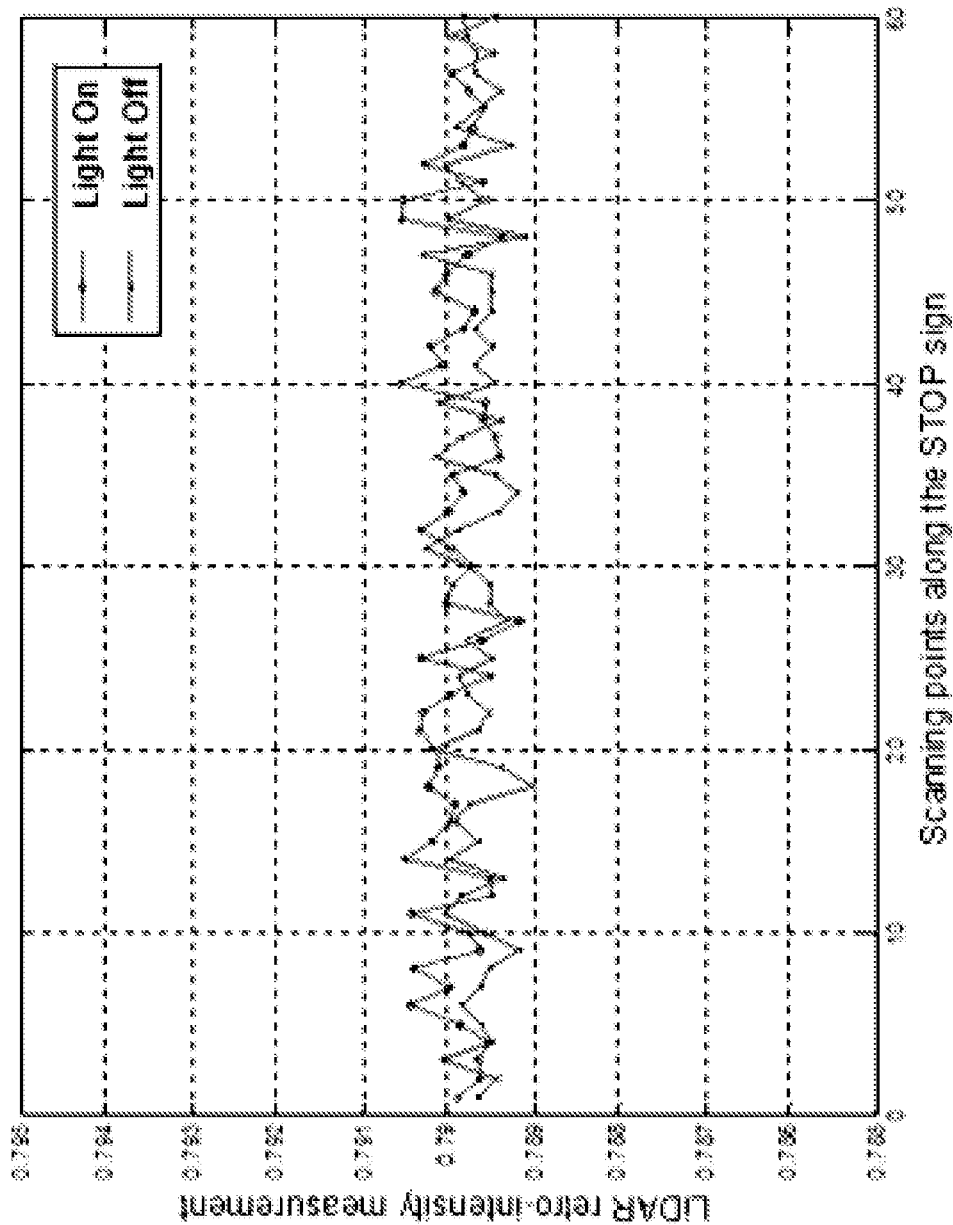
FIG. 46 is a graph of the results of the ambient lighting condition test.

As the data acquisition was completed during the daytime, it is important to quantify the impact of ambient lighting condition on the LiDAR retro-intensity measurement. Only during daytime with different ambient lighting conditions when the LiDAR retro-intensity measurement is not sensitive to the intensity of ambient lighting condition is it feasible to use LiDAR for consistent retroreflectivity condition assessment. A standard 36×36 stop sign sample with brand new Type 1 engineer grade sheeting was used for this test. The sample was attached to a static platform in the laboratory, as shown in FIGS. 45A-B, and the LiDAR device was placed so that it was stationary at a 41 ft. distance from the surface of the sample. With the current configuration, 64 points were collected within each LiDAR scan. As shown in FIGS. 45A-B, the light was switched on and off to simulate two different lighting conditions (i.e. regular ambient lighting and darkness). The first scan under each lighting condition was used to represent the corresponding scanning result.

FIG. A46 shows the results from the single scan with the light switched on and off. It is observed that the LiDAR retro-intensity measurements are very close with the light switched on and off. When the light is off, the measurements are slightly smaller than when the light is switched on at the scale of 0.0002. The standard deviation of 0.0002 can potentially introduce less than $\pm 0.08$ mcd/m$^2$/lux, which is even less than the variance of the successive scans. Therefore, the impact of the ambient lighting condition is ignorable in the process of traffic sign retroreflectivity condition assessment.

Figure 47:
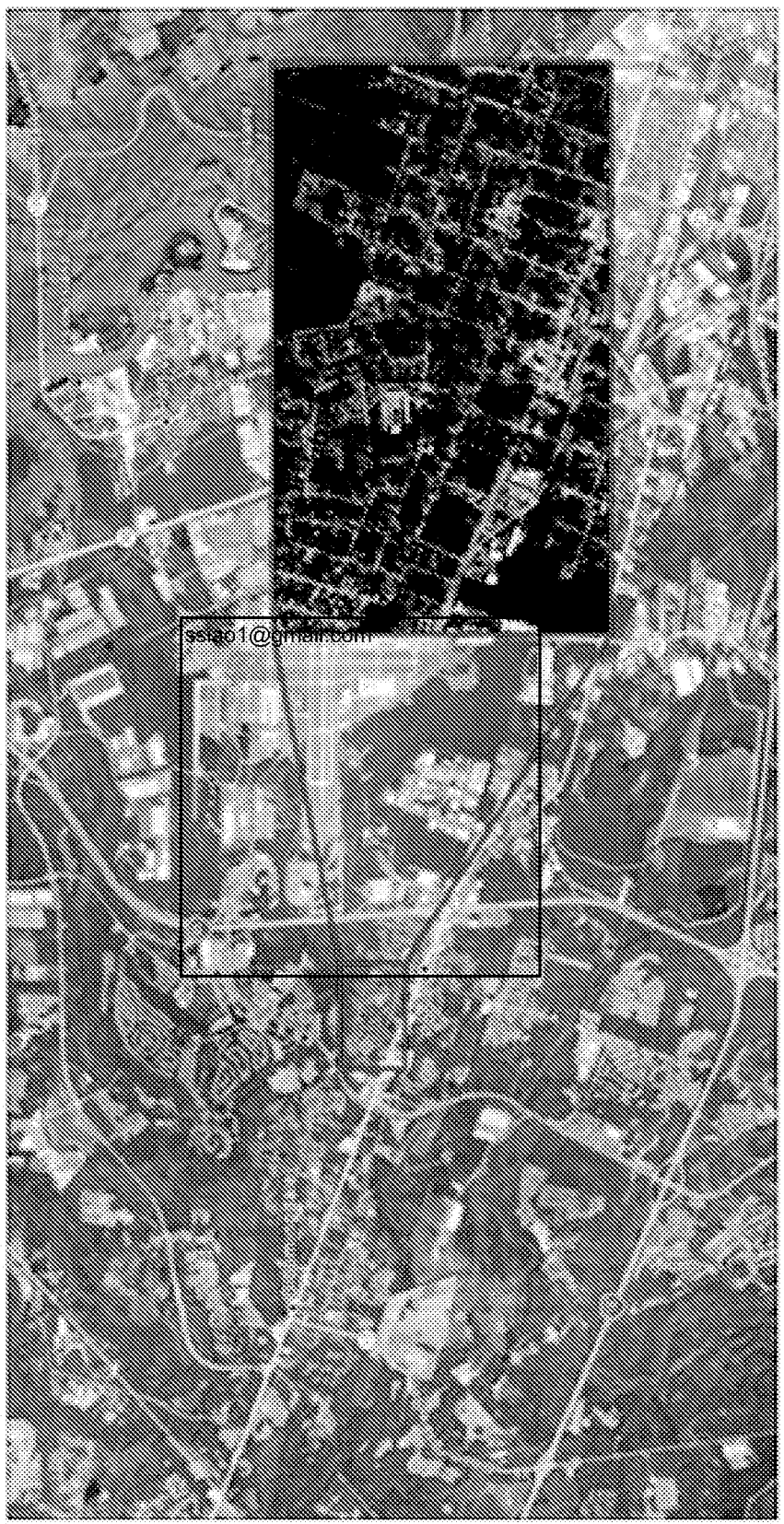
FIG. 47 is a map showing the location of several traffic signs used to test a retroreflectivity condition assessment method in accordance with an embodiment

A field test was conducted to assess the accuracy of the proposed LiDAR-based traffic sign retroreflectivity condition assessment method. Thirty-five stop signs with Type 1 engineer grade sheeting were collected in a community in a city from Georgia in support of this test. Ground truth was established using the Delta GR3 handheld retroreflectometer following the American Society for Testing and Materials (ASTM) E1709 standard (2009). Using the handheld retroreflectometer, four readings of each sign color were collected; the median of the four readings represents the retroreflectivity of the measured color. A visual inspection method following the recommendations proposed in the MUTCD was used to validate the results. FIG. 47 shows the map of the data collection site and the corresponding location of the stop signs.

Figure 48C:
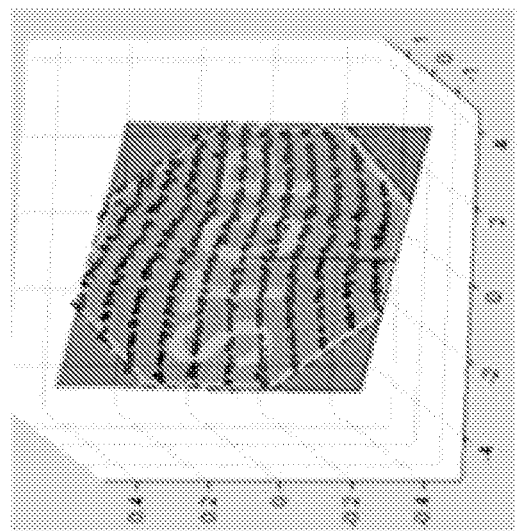
FIGS. 48A-C depict the registration results for Signs #17, #27, and #33.
Figure 48B:
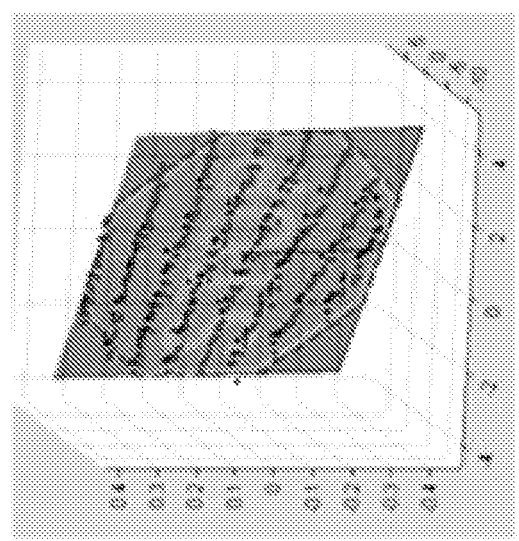
Figure 48A:
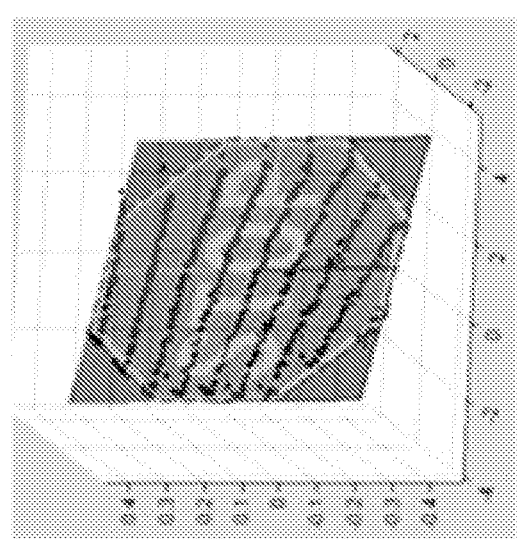

The accuracy of the proposed image-LiDAR registration algorithm was evaluated first using the collected stops signs. The bounding boxes from the LiDAR point cloud that are associated with the tested stops signs were manually digitized, each of which was represented by a 3D polygon. Using a registration method in accordance with an embodiment, each 3D polygon can be projected into the corresponding 2D image. The projected polygons were compared with the original detection results (i.e. bounding boxes derived from Step 1 and 2). FIG. 48 illustrates three example of the comparison result for Signs #17, #27 and #33. The traffic shown in the figures represents the detected results, while the red polygons represent the projected results. As shown in FIG. 48, there are very few points that could not be correctly projected due to the measurement outliers for the LiDAR sensor that could not be eliminated using coplanar validation. The result shows that the developed registration method can accurately register the 3D LiDAR point cloud with the 2D video log images.

By comparing the projected polygon and the detected traffic sign polygon in detail, the average offset is less than two pixels along the boundary's normal direction. Such pixel offset represents no more than a ½ inch geometrical offset on the tested traffic sign surfaces. To conservatively estimate the traffic sign retroreflectivity conditions for each sheeting color, all the projected LiDAR points that are close to the boundary of different colors (i.e. less than ½ inch) will be removed from the subsequent computation.

Figure 49:
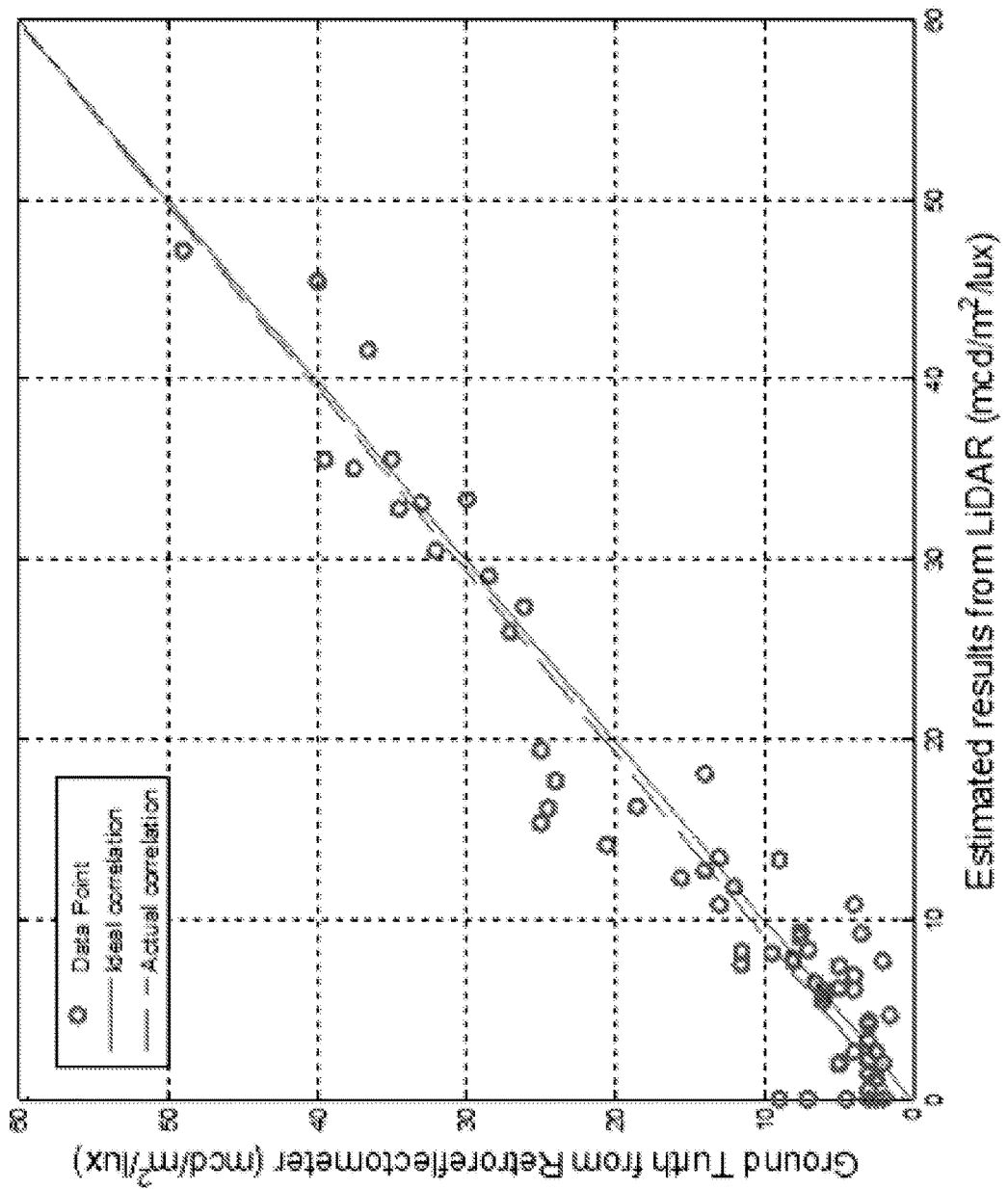
FIG. 49 illustrates the correlation between the estimated retroreflectivity and ground truth.

FIG. 49 shows the overall result for the 35 stop signs, including the assessment for both the red and white colors. The blue dots represent the actual results of the estimated retroreflectivity using LiDAR retro-intensity values vs. the ground truth values measured from the handheld retroreflectometer. The red line represents the ideal result between the estimation and the ground truth, while the blue-dashed line represents the actual correlation. It can be observed that the estimations align well with the ground truth, although some of the estimates over or under-estimate the truth retroreflectivity values as recorded in the ground truth. Nevertheless, as each ground truth only contains four measurements using the handheld retroreflectometer, measurement bias could be inherited when collecting ground truths. Therefore, further investigation for determining the traffic sign retroreflectivity condition for each color was done instead of just comparing the absolute measurement values.

Table 6 shows the detailed results for the 35 stop signs, including the condition assessment for both red and white colors. By applying the proposed minimum retroreflectivity standard defined in the MUTCD, if the retroreflectivity measurement is smaller than 7 mcd/m$^2$/lux for red and/or 35 mcd/m$^2$/lux for white, respectively, the corresponding traffic sign is in "FAIL" retroreflectivity condition, while in a "PASS" condition otherwise.

TABLE 6

TESTING RESULT FOR BOTH THE BACKGROUND AND LEGEND COLORS OF THE 35 STOP SIGN

| | Red (Background Color) | | | | | White (Legend Color) | | | | |
|---|---|---|---|---|---|---|---|---|---|---|
| | Retroreflectivity | | | Condition | | Retroreflectivity | | | Condition | |
| # | Handheld | Est. | Diff. | Handheld | Est. | Handheld | Est. | Diff. | Handheld | Est. |
| 1 | 4.0 | 2.7 | −1.3 | FAIL | FAIL | 26.0 | 27.4 | 1.4 | FAIL | FAIL |
| 2 | 3.0 | 4.2 | 1.2 | FAIL | FAIL | 4.5 | 0.0 | −4.5 | FAIL | FAIL |
| 3 | 6.0 | 5.5 | −0.5 | FAIL | FAIL | 37.5 | 35.1 | −2.4 | PASS | PASS |
| 4 | 9.5 | 8.1 | −1.4 | PASS | PASS | 78.0 | 72.4 | −5.6 | PASS | PASS |
| 5 | 3.0 | 0.6 | −2.4 | FAIL | FAIL | 20.5 | 14.2 | −6.3 | FAIL | FAIL |
| 6 | 14.0 | 12.8 | −1.2 | PASS | PASS | 70.5 | 66.4 | −4.1 | PASS | PASS |
| 7 | 8.0 | 7.7 | −0.3 | PASS | PASS | 28.5 | 29.1 | 0.6 | FAIL | FAIL |
| 8 | 6.0 | 6.1 | 0.1 | FAIL | FAIL | 33.0 | 33.2 | 0.2 | FAIL | FAIL |
| 9 | 4.0 | 6.9 | 2.9 | FAIL | FAIL | 36.5 | 41.7 | 5.2 | PASS | PASS |
| 10 | 3.0 | 2.2 | −0.8 | FAIL | FAIL | 14.0 | 18.1 | 4.1 | FAIL | FAIL |
| 11 | 7.0 | 8.3 | 1.3 | PASS | PASS | 32.0 | 30.6 | −1.4 | FAIL | FAIL |
| 12 | 3.0 | 3.3 | 0.3 | FAIL | FAIL | 18.5 | 16.3 | −2.2 | FAIL | FAIL |
| 13 | 3.0 | 0.0 | −3.0 | FAIL | FAIL | 3.5 | 9.2 | 5.7 | FAIL | FAIL |
| 14 | 3.0 | 0.0 | −3.0 | FAIL | FAIL | 1.5 | 4.7 | 3.2 | FAIL | FAIL |
| 15 | 2.5 | 2.7 | 0.2 | FAIL | FAIL | 11.5 | 8.2 | −3.3 | FAIL | FAIL |
| 16 | 13.0 | 10.9 | −2.1 | PASS | PASS | 61.0 | 65.7 | 4.7 | PASS | PASS |
| 17 | 5.0 | 7.4 | 2.4 | FAIL | PASS | 15.5 | 12.4 | −3.1 | FAIL | FAIL |
| 18 | 6.0 | 5.8 | −0.2 | FAIL | FAIL | 25.0 | 15.4 | −9.6 | FAIL | FAIL |
| 19 | 4.0 | 10.9 | 6.9 | FAIL | PASS | 24.0 | 17.7 | −6.3 | FAIL | FAIL |
| 20 | 5.0 | 6.2 | 1.2 | FAIL | FAIL | 8.0 | 7.8 | −0.2 | FAIL | FAIL |
| 21 | 2.5 | 1.2 | −1.3 | FAIL | FAIL | 7.5 | 9.0 | 1.5 | FAIL | FAIL |
| 22 | 2.0 | 7.7 | 5.7 | FAIL | PASS | 24.5 | 16.2 | −8.3 | FAIL | FAIL |
| 23 | 7.0 | 0.0 | −7.0 | PASS | FAIL | 13.0 | 13.5 | 0.5 | FAIL | FAIL |
| 24 | 2.0 | 2.1 | 0.1 | FAIL | FAIL | 5.0 | 2.0 | −3.0 | FAIL | FAIL |
| 25 | 12.0 | 11.9 | −0.1 | PASS | PASS | 63.5 | 62.9 | −0.6 | PASS | PASS |
| 26 | 2.0 | 0.0 | −2.0 | FAIL | FAIL | 34.5 | 32.9 | −1.6 | FAIL | FAIL |
| 27 | 6.5 | 6.5 | 0.0 | FAIL | FAIL | 25.0 | 19.4 | −5.6 | FAIL | FAIL |
| 28 | 3.0 | 1.5 | −1.5 | FAIL | FAIL | 9.0 | 13.4 | 4.4 | FAIL | FAIL |

TABLE 6-continued

TESTING RESULT FOR BOTH THE BACKGROUND AND LEGEND
COLORS OF THE 35 STOP SIGN

| | Red (Background Color) | | | | | White (Legend Color) | | | | |
|---|---|---|---|---|---|---|---|---|---|---|
| | Retroreflectivity | | | Condition | | Retroreflectivity | | | Condition | |
| # | Handheld | Est. | Diff. | Handheld | Est. | Handheld | Est. | Diff. | Handheld | Est. |
| 29 | 11.5 | 7.5 | −4.0 | PASS | PASS | 49.0 | 47.2 | −1.8 | PASS | PASS |
| 30 | 7.5 | 9.3 | 1.8 | PASS | PASS | 35.0 | 35.6 | 0.6 | PASS | PASS |
| 31 | 5.0 | 2.1 | −2.9 | FAIL | FAIL | 27.0 | 26.0 | −1.0 | FAIL | FAIL |
| 32 | 3.0 | 0.0 | −3.0 | FAIL | FAIL | 40.0 | 45.5 | 5.5 | PASS | PASS |
| 33 | 4.0 | 6.1 | 2.1 | FAIL | FAIL | 30.0 | 33.4 | 3.4 | FAIL | FAIL |
| 34 | 9.0 | 0.0 | −9.0 | PASS | FAIL | 39.5 | 35.6 | −3.9 | PASS | PASS |
| 35 | 2.5 | 0.0 | −2.5 | FAIL | FAIL | 3.0 | 4.4 | 1.4 | FAIL | FAIL |

A false positive case is defined as a "PASS" condition if mistakenly identified as a "FAIL" condition, while a false negative case is defined as a "FAIL" condition if mistakenly identified as a "PASS" condition. In this test, only two false positive cases and three false negative cases are identified from the testing results, all of which occur in assessing the red background color, which is typically <10 mcd/m$^2$/lux. Comparison of the results from the proposed method and the ground truth shows that most of the absolute difference is within 3.0 mcd/m$^2$/lux. Considering the data-driven theoretical-empirical normalization process for beam distance and incidence angle and the limited number of samples in establishing the correlation curve between the LiDAR retro-intensity and the actual retroreflectivity measurement in the lab, the sensitivity of the model can introduce errors and propagate them to the final condition assessment result. Such errors could result in the false negative and false positive cases in the final condition assessment, especially when the retroreflectivity is small (i.e. <10 mcd/m$^2$/lux), e.g. Sign #17.

However, the remaining false negative and false positive cases, i.e. Signs #19, #22, #23 and #34, require further investigation because the absolute differences are relatively large. For white, there is no false positive or false negative case identified. However, some of the estimates have relatively big differences from the ground truth, e.g. Signs #18 and #22. As previously pointed out, the relatively big differences could be introduced by bias in ground truth establishment using retroreflectometer, rather than the estimation error using the proposed method. Therefore, the background of Signs #19, #22, #23, and #34 and the legend of Signs #18 and #22 need further investigation. To further investigate these signs, still images were taken for these traffic signs during nighttime using the geometry and headlight setup as specified in ASTM D4956 (2011).

Signs #19 and #22—False Negative Cases for Background

Figure 50A:
FIG. 50A depicts Sign #19 in both nighttime and daylight conditions.
Figure 50B:
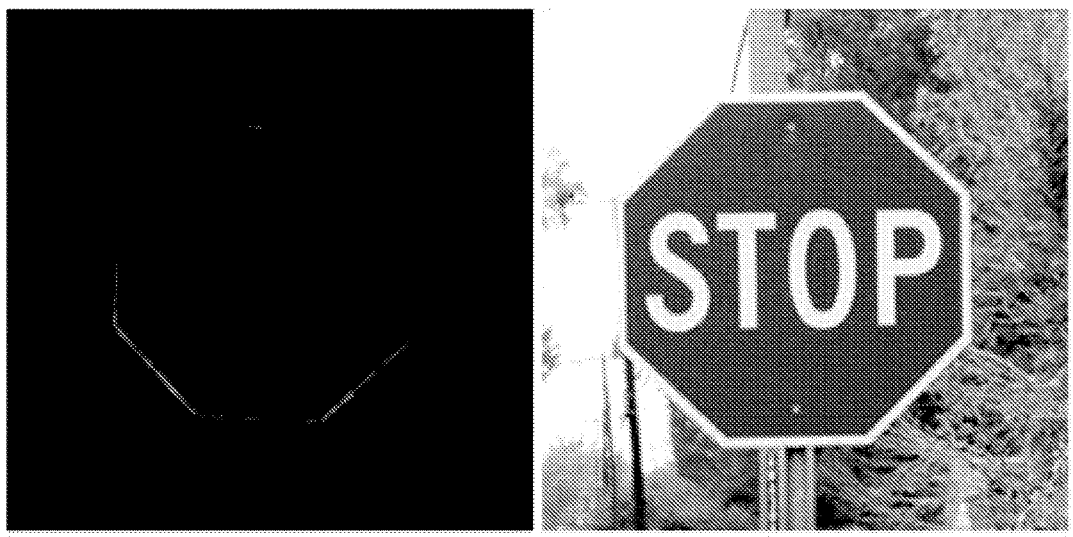
FIG. 50B depicts Sign #22 in both nighttime and daylight conditions.

A method in accordance with an embodiment overestimated the retroreflectivity for red in these signs. FIG. 50A shows the nighttime image of Sign #19. It can be observed that the background of the traffic sign is in an overall fair condition. However, three of the four quadrants (left-up, right-up and right-bottom) of the sign are deteriorated more than the rest of the sign. While measuring the retroreflectivity using the handheld retroreflectometer, retroreflectivity from each quadrant was collected. Due to the non-homogeneous deterioration of the sign, the handheld retroreflectometer just happened to be biased on the low values of the sign, while the LiDAR still collected the complete distribution of the sign. Therefore, the result from the tested method overestimated the actual retroreflectivity for red in this sign. This is the intrinsic drawback of the current ground truth establishment method because the non-homogeneous deterioration of the sign retroreflectivity cannot be seen during the ground truth data collection in daytime. Sign #22 is, also, non-homogeneously deteriorated, which causes the overestimation in the result. Figure FIG. 50B shows the nighttime and daytime images for Sign #22.

Signs #23 and #34—False Positive Cases for Background

Figure 51A:
FIG. 51A depicts Sign #23 in both nighttime and daylight conditions.
Figure 51B:
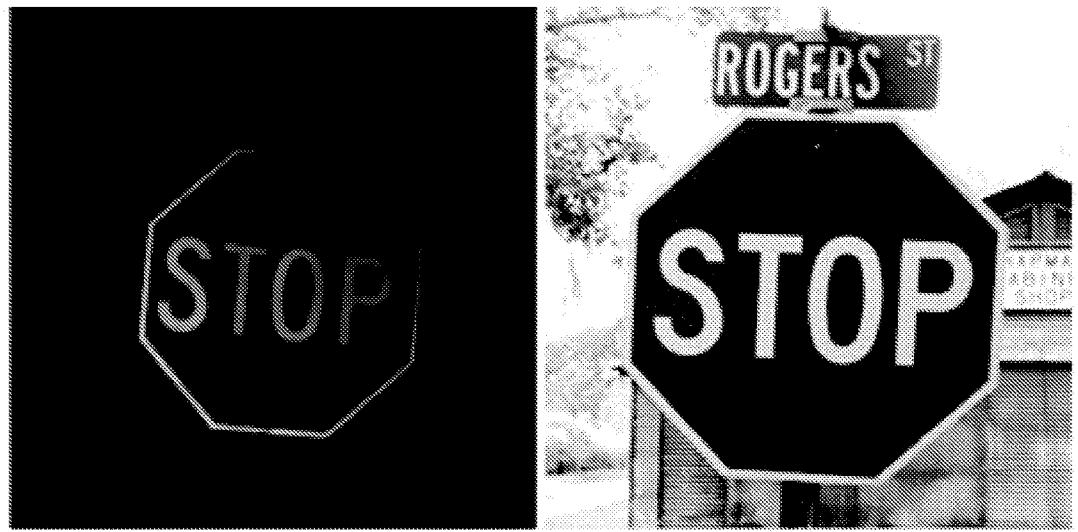
FIG. 51B depicts Sign #34 in both nighttime and daylight conditions.

A method in accordance with an embodiment underestimated the retroreflectivity for red in these signs. FIG. 51A shows the nighttime image of Sign #23. It can be observed that the background of the traffic sign is in an overall poor condition due to the water damages for the majority of the sheeting. However, some of the points in good condition were selected at the four quadrants of each sign where the retroreflectivity using the handheld retroreflectometer. Due to such non-homogeneous deterioration of the sign, the handheld retroreflectometer just happened to be biased on the high values of the sign, while the LiDAR still collected the complete distribution of the sign. Therefore, the tested method underestimated the actual retroreflectivity for red in this sign. This is the intrinsic drawback of the current ground truth establishment method because the non-homogeneous deterioration of the sign's retroreflectivity cannot be seen during the ground truth data collection in daytime, as shown in FIG. 51A. Sign #34 also non-homogeneously deteriorated, which causes the underestimation in the result. FIG. 51B shows the nighttime and daytime images for Sign #34.

Signs #18 and #22—Underestimation Cases for Legend

Figure 52:
FIG. 52 depicts the lettering of Sign #18 (left) and #22 (right) in nighttime conditions.
Figure 52:

Similar to the background, the legends of the traffic signs can, also, deteriorate in a non-homogeneous pattern. Parts of the letterings deteriorate more than the rest of the letterings. Since only four points were collected for the legend, the readings cannot cover the complete region of the legend to dictate the true distribution of their retroreflectivity condition. As shown in FIG. 52, the legends of Signs #18 and #22 are in overall poor condition. However, the ground truth just happened to be collected at the locations where the relatively high retroreflectivity is located.

Figure 53:
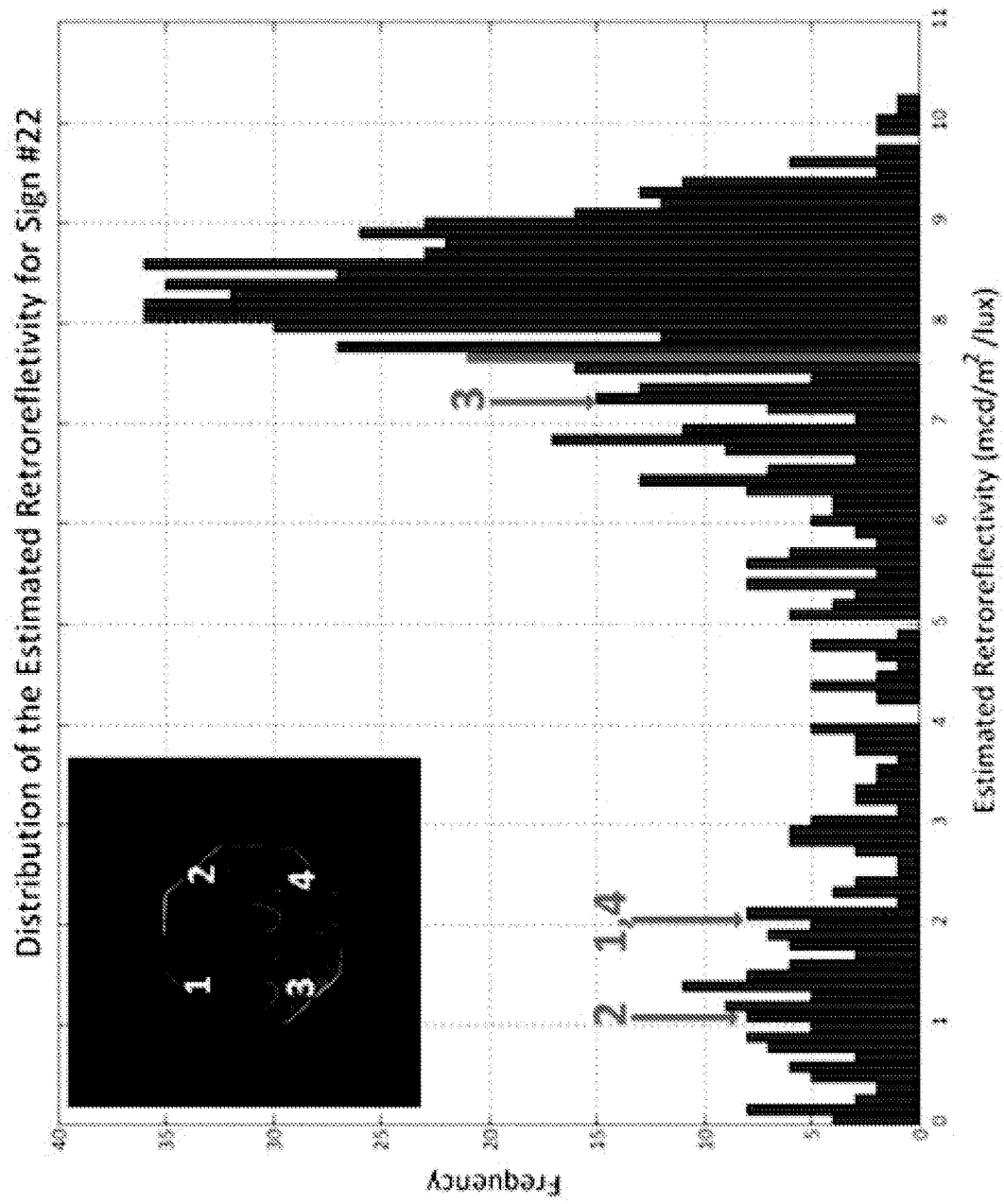
FIG. 53 is a histogram of the estimated retroreflectivity at various points across Sign #22.

A retroreflectivity condition assessment method in accordance with an embodiment can consistently determine the condition, but the ground truth measured using the handheld retroreflectometer cannot. It is also identified that the current retroreflectometer measurement using four points can not be a consistent and adequate way to define the actual retroreflectivity condition due to the limited measurement. FIG. 53 shows the populations of the estimated retroreflectivity for the red color of Sign #22. The locations of the four measurements conducted using the handheld retroreflectometer and corresponding values are marked in FIG. 53. The red bar indicates the median of the population of the estimated retroreflectivity. It can be observed that the limited number of retroreflectometer measurements cannot adequately reflect the true condition of the whole traffic sign. Nevertheless, it is not feasible to manually measure more than 100 points for each traffic sign using a retroreflectometer on field. Therefore, the tested method can serve as a better alternative to reliably reflect the true retroreflectivity condition for each sign, since the proposed method assesses the traffic sign retroreflectivity condition using the whole population of the sign-associated LiDAR points.

Currently, the median value derived from the tested method is used to represent the whole population of the traffic sign so that the value can be compared with the requirement defined in the MUTCD. Nevertheless, a retroreflectivity condition assessment using the complete population of measurements requirement can also be achieved using the tested method for practical use, which is more consistent with a human's perception during the nighttime. For example, based on the population, it is observed that the majority of the retroreflectivity values (i.e. 61.5% in this case) are still above 7 mcd/m$^2$/lux, which warrants a "PASS" condition. Therefore, by defining a conservative percentage (e.g. 50%) of the points that are above the requirement can be an adequate way to determine the overall condition of a traffic sign. It will provide a more reliable and consistent condition assessment result than the current retroreflectometer measurement.

EXAMPLE EMBODIMENTS

Figure 54:
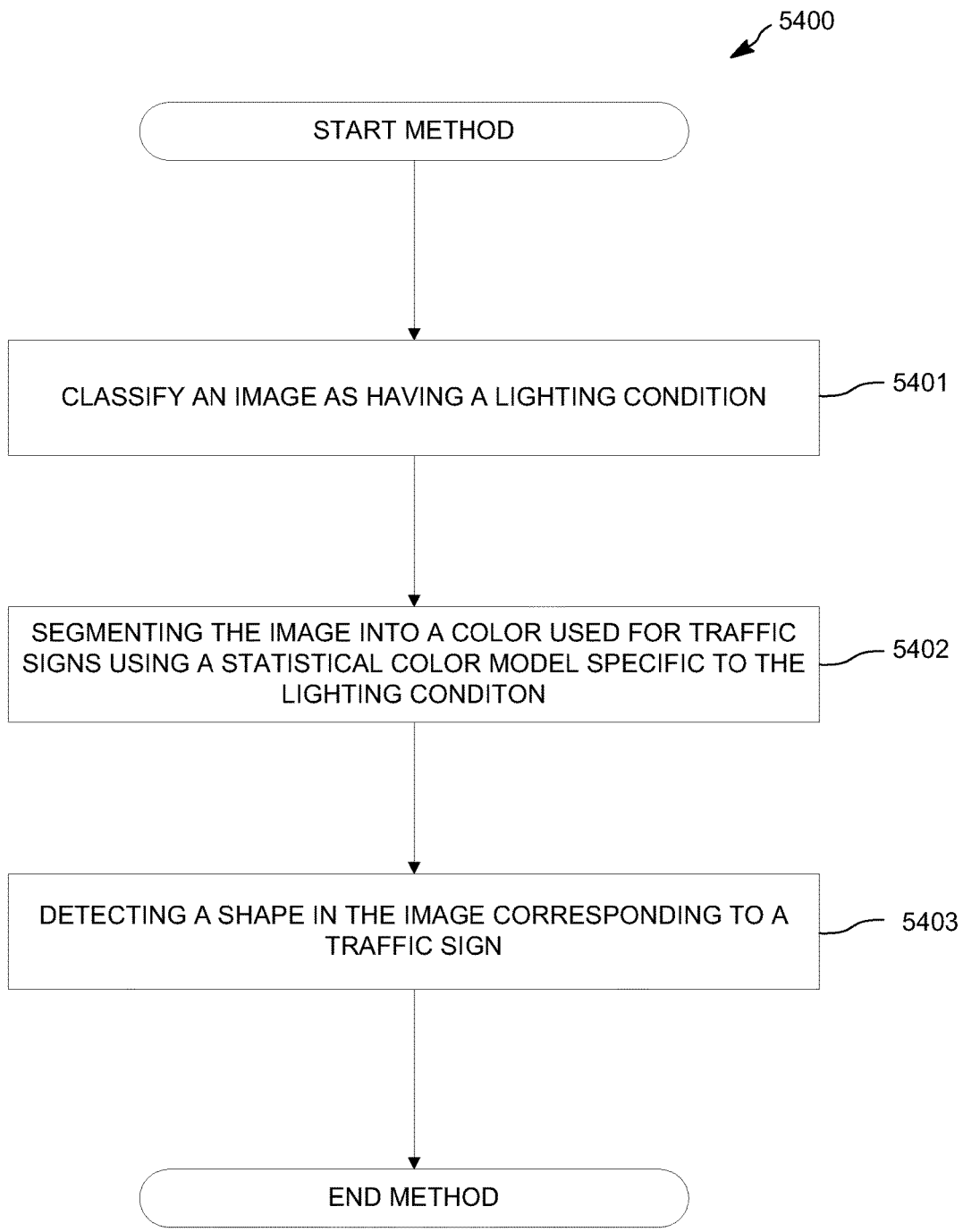
FIG. 54 is a flowchart depicting a method of identifying a traffic sign in accordance with an embodiment.

FIG. 54 is a flowchart illustrating a method for identifying a traffic sign in accordance with an embodiment 5400. In some embodiments, the method comprises a step of classifying an image as having a lighting condition 5401. In some embodiments, the method comprises a step of segmenting the image into a color used for traffic signs using a statistical color model specific to the lighting condition 5402. In some embodiments, the method comprises a step of detecting a shape in the image corresponding to a traffic sign 5403.

Figure 55:
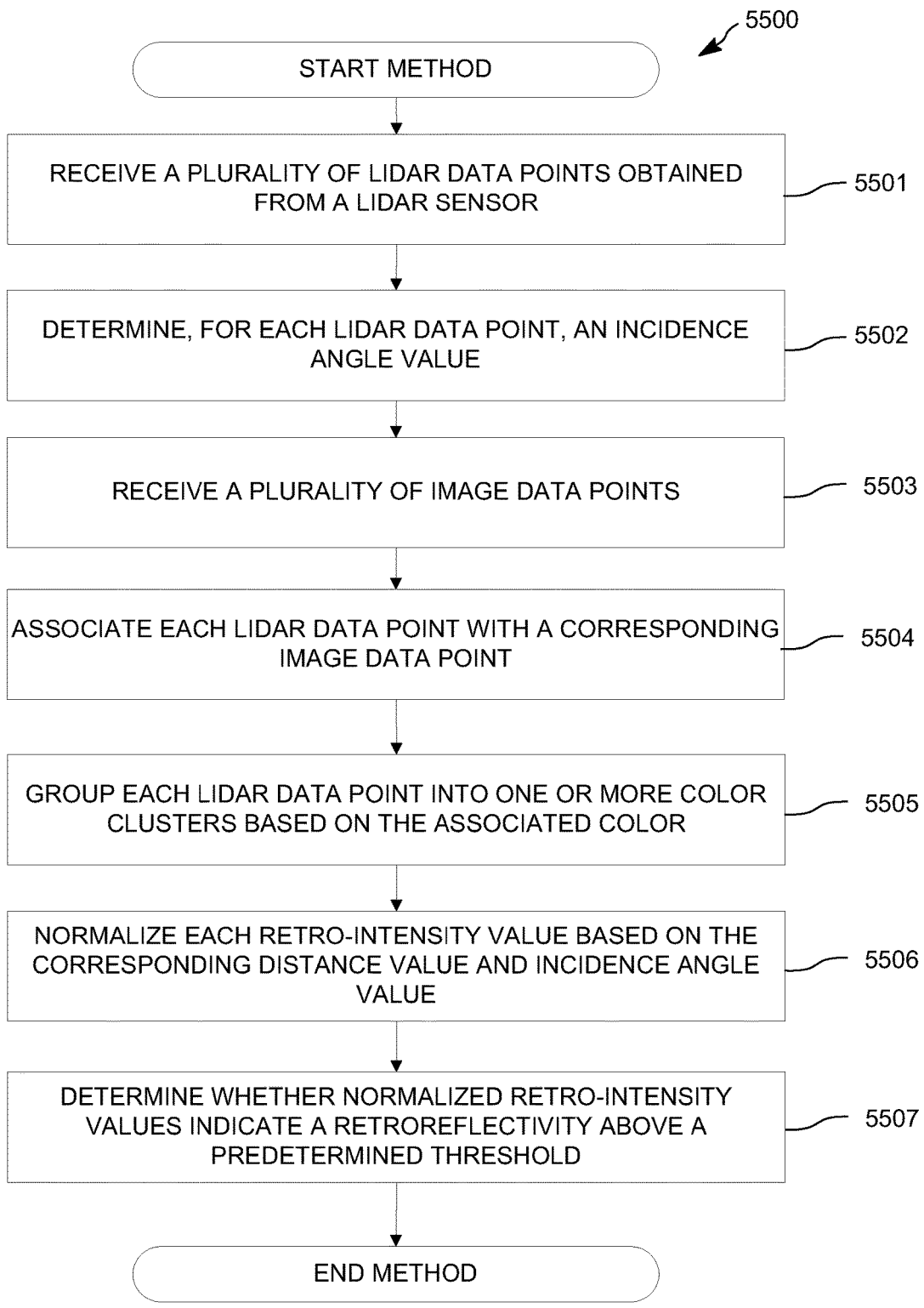
FIG. 55 is a flowchart depicting a method of assessing the retroreflectivity condition of a traffic sign, in accordance with an embodiment.

FIG. 55 is a flowchart illustrating a method for identifying assessing the retroreflectivity condition of a traffic sign in accordance with an embodiment 5500. In some embodiments, the method comprises a step of receiving a plurality of LiDAR data points obtained from a LiDAR sensor 5501. In some embodiments, each LiDAR point may comprise 3D position information and a set of retro-intensity data. According to some embodiments, each set of retro-intensity data may comprise a retro-intensity value, a distance value and an angle value. In some embodiments, the method comprises a step determining, for each LiDAR data point, an incidence angle value 5502. In some embodiments, the method comprises a step of receiving a plurality of image data points 5503. In some embodiments, image data points may comprise 2D position information, color information and sign information. In some embodiments the sign information may indicate whether the image data point is associated with a traffic sign or not, and if so, which type of sign it is. In some embodiments, the method comprises a step of associating each LiDAR data point with the image data point corresponding to a 2D location on the traffic sign 5504. In some embodiments, the method comprises a step of grouping each LiDAR data point into one or more color clusters based on the associated color 5505. In some embodiments, the method comprises a step of normalizing each retro-intensity value based on the corresponding distance value and incidence angle value 5506. In some embodiments, the method comprises a step of determining whether the normalized retro-intensity values indicate a retroreflectivity above a predetermined threshold 5507.

It will be understood that the various steps shown in FIGS. 1-55 are illustrative only, and that steps can be removed, other steps can be used, or the order of steps can be modified. Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams can not necessarily need to be performed in the order presented, or can not necessarily need to be performed at all, according to some embodiments of the disclosed technology.

These computer-executable program instructions can be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions can also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology can provide for a computer program product, comprising a computer-usable medium having a computer-readable program code or program instructions embodied therein, said computer-readable program code adapted to be executed to implement one or more functions specified in the flow diagram block or blocks. The computer program instructions can also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

REFERENCES

ASTM (2011). "ASTM D4956-11a Standard Specification for Retroreflective Sheeting for Traffic Control." West Conshohocken, Pa.

Aytac, T., and Barshan, B. (2005). "Surface Differentiation by Parametric Modeling Of Infrared Intensity Scans." *Optical Engineering*, 44(6), 067202-067202.

Chan, T. F., and Vese, L. A. (2001). "Active Contours without Edges." *Image Processing, IEEE Transactions on*, 10(2), 266-277.

Cheng, W., and Glenn, N. F. (2009). "Integrating LiDAR Intensity and Elevation Data for Terrain Characterization in a Forested Area." *Geoscience and Remote Sensing Letters, IEEE*, 6(3), 463-466.

Song Chun, Z., Yuille, A., 1996. "Region Competition: Unifying Snakes, Region Growing, and Bayes/MDL for Multiband Image Segmentation." *IEEE Transactions on Pattern Analysis and Machine Intelligence*, 18(9), 884-900.

Daniels, J., Ha, L. K., Ochotta, T., and Silva, C. T. (2007). "Robust Smooth Feature Extraction from Point Clouds." *Proc., IEEE International Conference on Shape Modeling and Applications*, 2007. SMI '07. 123-136.

Ballard, D. H. "Generalizing the Hough Transform to Detect Arbitrary Shapes", *Pattern Recognition*, Vol. 13, No. 2, p. 111-122, 1981.

Foley, J. D., Dam, A. v., Feiner, S. K., and Hughes, J. F. (1995). *Computer Graphics: Principles and Practice in C*, Addison-Wesley Professional.

Kaasalainen, S., Ahokas, E., Hyyppa, J., and Suomalainen, J. (2005). "Study Of Surface Brightness From Backscattered Laser Intensity: Calibration Of Laser Data." *Geoscience and Remote Sensing Letters, IEEE*, 2(3), 255-259.

Kamermann, G. W. (1993). *Laser Radar—Active ElectroOptical Systems, The Infrared & Electro-Optical Systems Handbook*, Optical Engineering Press, SPIE, Michigan.

Mazzarini, F., Pareschi, M. T., Favalli, M., Isola, I., Tarquini, S., and Boschi, E. (2007). "Lava Flow Identification and Aging by Means of LiDAR Intensity: Mount Etna Case." *Journal of Geophysical Research: Solid Earth*, 112(B2).

Mishra, R. K., and Zhang, Y. (2012). "A Review of Optical Imagery and Airborne LiDAR Data Registration Methods" *The Open Remote Sensing Journal*, 5, 54-63.

NGA (2009). "NGA.SIG.0004_1.0: Lighting Detection and Ranging (LiDAR) Sensor Model Supporting Precise Geopositioning." *National Center for Geospatial Intelligence Standards*.

Osher, S., and Sethian, J. A. (1988). "Fronts Propagating with Curvature-Dependent Speed: Algorithms Based on Hamilton-Jacobi Formulations." *Journal of Computational Physics*, 79(1), 12-49.

Pfeifer, N., Dorninger, P., Haring, A., and Fan, H. (2007). "Investigating Terrestrial Laser Scanning Intensity Data: Quality and Functional relations." *Proc., 8th Conference on Optical 3-D Measurement Techniques*, 328-337.

Tsai, R. (1987). "A Versatile Camera Calibration Technique for High-Accuracy 3DMachine Vision Metrology Using Off-The-Shelf TV Cameras and Lenses." *IEEE Journal of Robotics and Automation*, 3(4), 323-344.

Tsai, Y., Kim, P., and Wang, Z. (2009). "Generalized Traffic Sign Detection Model for Developing a Sign Inventory." *Journal of Computing in Civil Engineering*, 23(5), 266-276.

Unal, G.,Yezzi, A.and Krim, H. "Information-Theoretic Active Polygons for Unsupervised Texture Segmentation", *Int. Journal of Computer Vision*, vol. 62, May 2005, pp. 199-220

Voegtle, T., and Wakaluk, S. (2009). "Effects on the Measurements of the Terrestrial Laser Scanner HDS 6000 (LEICA) Caused by Different Object Material." *Laser Scanning 2009 IAPRS*, Paris, France.

Yezzi, A., Tsai, A., and Willsky, A. 2002. "A Fully Global Approach to Image Segmentation via Coupled Curve Evolution Equations." *Journal of Visual Communication and Image Representation*, 13(1):195-216.

Zhang, Z. (2000). "A Flexible New Technique for Camera Calibration." *IEEE Transactions on Pattern Analysis and Machine Intelligence*, 22(11), 1330-1334.

What is claimed is:

1. A method for identifying a traffic sign comprising:
classifying an image as having a lighting condition;
segmenting the image into a color used for traffic signs using a statistical color model specific to the lighting condition; and
detecting a shape in the image corresponding to the traffic sign.

2. The method of claim 1, wherein the color used for traffic signs is a MUTCD standard color.

3. The method of claim 1, wherein classifying the image further comprises classifying the image as underexposed where a mean pixel brightness value of the image is below an under-saturation threshold.

4. The method of claim 1, wherein classifying the image further comprises classifying the image as overexposed where a mean pixel brightness value of the image is above an over-saturation threshold.

5. The method of claim 1, wherein classifying the image further comprises classifying the image as adverse lighting if the difference between a mean pixel brightness of the image and a median pixel brightness of the image is over an adverse lighting threshold.

6. The method of claim 1, wherein classifying an image further comprises classifying the image as normal if:
a mean pixel brightness value of the image is above an under-saturation threshold;
a mean pixel brightness value of the image is below an over-saturation threshold; and
a difference between a mean pixel brightness of the image and median pixel brightness of the image is below an adverse lighting threshold.

7. The method of claim 5, wherein images having a lighting condition of adverse lighting are divided into a region having an over-exposed condition, and a region having an under-exposed condition, by:

generating a threshold surface;
comparing the threshold surface to the image to create a thresholded image;
identifying candidate regions of the image; and
applying a morphological open and close operation to the candidate regions of the image.

8. The method of claim 7, wherein generating a threshold surface is accomplished using an anti-geometric heat equation.

9. The method of claim 1, wherein segmenting an image further comprises:
calculating, for a plurality of pixels, a local pixel-level homogeneity value for one of a hue, saturation, and value;
normalizing the local pixel-level homogenity value; and
generating a probability distribution by applying an artificial neural network specific to a lighting condition, having input values of hue, saturation, value, and one or more of hue homogeneity, saturation homogeneity, and value homogeneity.

10. The method of claim 9, wherein the artificial neural network is a functional link network.

11. The method of claim 1, wherein the detecting step is performed by an differential equation based shape detection algorithm.

12. The method of claim 11, wherein the differential equation based shape detection algorithm comprises a region-based energy function.

13. The method of claim 11, wherein the differential equation based shape detection algorithm comprises an active contour algorithm.

14. The method of claim 13, wherein the active contour function comprises a probability distribution function sub-energy component that represents the probability of a sign image occurring in each pixel.

15. The method of claim 13, wherein the active contour function comprises a statistical color model sub-energy component represents the probability of a traffic sign color occurring in each pixel of the image.

16. The method of claim 13, wherein the active contour function comprises a global contour length sub-energy component with a maximum contour length.

17. The method of claim 16, wherein the maximum contour length is calculated as a function of a total perimeter of the image.

18. The method of claim 11, wherein the differential equation based shape detection algorithm comprises an active polygon algorithm.

19. The method of claim 18, wherein the active polygon contour algorithm comprises a generalized Hough transform.

20. The method of claim 19, wherein the generalized Hough transform comprises:
calculating an R-table corresponding to the shape of a traffic sign;
detecting the center where the maximum similarity is obtained compared to the R-table; and
solving the region-based energy function for the optimal value.

21. A method of assessing the retroreflectivity condition of a traffic sign comprising:
receiving, at a processor and from a LiDAR sensor, a plurality of LiDAR data points, each LiDAR data point in the plurality of LiDAR data points relating to a location on the face of the traffic sign, each LiDAR data point comprising 3D position information and a set of retro-intensity data, wherein each set of retro-intensity data comprises:
a retro-intensity value;
a distance value; and
an angle value;
determining, for each LiDAR data point, an incidence angle value;
receiving a plurality of image data points, wherein each image data point represents a portion of a traffic sign image, each image data point comprising:
color data; and
2D location data representing a location on the face of the traffic sign;
associating each of a plurality of LiDAR data points with a corresponding image data point, wherein 2D location data of a particular image data point corresponds to a location on the face of the traffic sign from which a particular LiDAR data point associated with the particular image data point relates;
grouping each LiDAR data point into one or more color clusters based on the associated color data,
normalizing, for each color cluster of LiDAR data points, each retro-intensity value based on the corresponding distance value and incidence angle value; and
determining, for each color cluster of LiDAR data points, whether the normalized retro-intensity values indicate a retroreflectivity above a predetermined threshold.

22. The method of claim 21, wherein the 3D position information comprises latitude data, longitude data and elevation data.

23. The method of claim 21, wherein each retro-intensity value represents a ratio of energy redirected from the traffic sign to the energy emitted from the LiDAR sensor.

24. The method of claim 21, wherein the distance value is a value that is representative of the distance between the traffic sign and the LiDAR sensor at the time of the measurement of the LiDAR data point.

25. The method of claim 21, wherein the angle value represents a LiDAR beam angle with respect to the level of the LiDAR sensor.

26. The method of claim 21, wherein the portion of the traffic sign image comprises a pixel.

27. The method of claim 21, wherein the color data represents the color of the portion of the traffic sign image.

28. The method of claim 21, wherein the 2D location data represents the location of the portion of the traffic sign image on a face of the traffic sign.

29. The method of claim 21, wherein determining whether the normalized retro-intensity values indicate a retroreflectivity above a predetermined threshold based on the color comprises:
determining a median value the normalized retro-intensity values for a color cluster of LiDAR data points; and
comparing the median value to a predetermined threshold associated with the color of the color cluster of the median value.

30. The method of claim 21, wherein the predetermined threshold based on the color represents the minimum acceptable level of retroreflectivity for a particular color.

31. The method of claim 30, wherein the particular color is a MUTCD color.

32. The method of claim 21 further comprising determining whether the condition of the traffic sign meets a minimum standard of retroreflectivity.

33. The method of claim 21, wherein the incidence angle value is determined from the direction of a LiDAR beam from the LiDAR sensor relative to the normal direction of a face of the traffic sign.

34. A method of evaluating a traffic sign comprising:
identifying the traffic sign by the method of claim 1; and
assessing a retroreflectivity of the traffic sign by the method of claim 21.

35. A system for identifying a traffic sign comprising:
at least one memory operatively coupled to at least one processor and configured for storing data and instructions that, when executed by the at least one processor, cause the system to:
classify an image as having a lighting condition;
segment the image into a color used for traffic signs using a statistical color model specific to the lighting condition; and
detect a shape in the image corresponding to the traffic sign.

36. The system of claim 35, wherein the color used for traffic signs is a MUTCD standard color;
wherein classifying the image further comprises classifying the image as underexposed where a mean pixel brightness value of the image is below an under-saturation threshold;
wherein classifying the image further comprises classifying the image as overexposed where a mean pixel brightness value of the image is above an over-saturation threshold;
wherein classifying the image further comprises classifying the image as adverse lighting if the difference between a mean pixel brightness of the image and a median pixel brightness of the image is over an adverse lighting threshold;
wherein classifying an image further comprises classifying the image as normal if:
a mean pixel brightness value of the image is above an under-saturation threshold;
a mean pixel brightness value of the image is below an over-saturation threshold; and
a difference between a mean pixel brightness of the image and median pixel brightness of the image is below an adverse lighting threshold;
wherein images having a lighting condition of adverse lighting are divided into a region having an overexposed condition, and a region having an underexposed condition, by:
generating a threshold surface;
comparing the threshold surface to the image to create a thresholded image;
identifying candidate regions of the image; and
applying a morphological open and close operation to the candidate regions of the image;
wherein generating a threshold surface is accomplished using an anti-geometric heat equation;
wherein segmenting an image further comprises:
calculating, for a plurality of pixels, a local pixel-level homogeneity value for one of a hue, saturation, and value;
normalizing the local pixel-level homogenity value; and
generating a probability distribution by applying an artificial neural network specific to a lighting condition, having input values of hue, saturation, value, and one or more of hue homogeneity, saturation homogeneity, and value homogeneity;
wherein the artificial neural network is a functional link network; and
wherein the detecting step is performed by an differential equation based shape detection algorithm.

37. The system of claim 36, wherein the differential equation based shape detection algorithm comprises one or more of:
a region-based energy function;
an active contour algorithm; and
an active polygon algorithm.

38. The system of claim 36, wherein the differential equation based shape detection algorithm comprises an active polygon algorithm; and
wherein the active polygon contour algorithm comprises a generalized Hough transform.

39. The system of claim 38, wherein the generalized Hough transform comprises:
calculating an R-table corresponding to the shape of a traffic sign;
detecting the center where the maximum similarity is obtained compared to the R-table; and
solving the region-based energy function for the optimal value.

40. A system for assessing the retroreflectivity condition of a traffic sign comprising:
at least one memory operatively coupled to at least one processor and configured for storing data and instructions that, when executed by the at least one process, cause the system to:
receive a plurality of LiDAR data points obtained from a LiDAR sensor, each LiDAR data point in the plurality of LiDAR data points relating to a location on the face of the traffic sign, each LiDAR data point comprising 3D position information and a set of retro-intensity data, wherein each set of retro-intensity data comprises:
a retro-intensity value;
a distance value; and
an angle value;
determine, for each LiDAR data point, an incidence angle value;
receive a plurality of image data points, wherein each image data point represents a portion of a traffic sign image, each image data point comprising:
color data; and
2D location data representing a location on the face of the traffic sign;
associate each LiDAR data point with an image data point corresponding to a 2D location on the traffic sign, wherein each 2D location represents the location on the face of the traffic sign from which each respective LiDAR point was obtained;
group each of a plurality of LiDAR data points with a corresponding image data point, wherein 2D location data of a particular image data point corresponds to a location on the face of the traffic sign from which a particular LiDAR data point associated with the particular image data point relates;
normalize for each color cluster of LiDAR data points, each retro-intensity value based on the corresponding distance value and incidence angle value; and
determine, for each color cluster of LiDAR data points, whether the normalized retro-intensity values indicate a retroreflectivity above a predetermined threshold.

41. The system of claim 40, wherein the 3D position information comprises latitude data, longitude data and elevation data.

42. The system of claim 40, wherein each retro-intensity value represents a ratio of energy redirected from the traffic sign to the energy emitted from the LiDAR sensor;

wherein the distance value is a value that is representative of the distance between the traffic sign and the LiDAR sensor at the time of the measurement of the LiDAR data point;

where the angle value represents a LiDAR beam angle with respect to the level of the LiDAR sensor;

wherein the portion of the traffic sign image comprises a pixel;

wherein the color data represents the color of the portion of the traffic sign image;

wherein the 2D location data represents the location of the portion of the traffic sign image on a face of the traffic sign;

wherein determining whether the normalized retro-intensity values indicate a retroreflectivity above a predetermined threshold based on the color comprises:

determining a median value the normalized retro-intensity values for a color cluster of LiDAR data points; and comparing the median value to a predetermined threshold associated with the color of the color cluster of the median value; and wherein the predetermined threshold based on the color represents the minimum acceptable level of retroreflectivity for a particular color.

43. The system of claim 40 further comprising determining whether the condition of the traffic sign meets a minimum standard of retroreflectivity.

44. The system of claim 40, wherein the incidence angle value is determined from the direction of a LiDAR beam from the LiDAR sensor relative to the normal direction of a face of the traffic sign.

45. A system for evaluating a traffic sign comprising:
identifying the traffic sign by the system of claim 35; and
assessing a retroreflectivity of the traffic sign by the system of claim 40.

* * * * *